United States Patent
Merg et al.

(10) Patent No.: US 11,074,768 B2
(45) Date of Patent: *Jul. 27, 2021

(54) METHOD AND SYSTEM FOR PROVIDING SCANNER JOBS ON DIAGNOSTIC TOOL

(71) Applicant: Snap-on Incorporated, Kenosha, WI (US)

(72) Inventors: Patrick S. Merg, Hollister, CA (US); Jacob G. Foreman, Hollister, CA (US); Roy S. Brozovich, Campbell, CA (US); Joseph R. Grammatico, San Jose, CA (US); Joshua C. Covington, San Juan Bautista, CA (US)

(73) Assignee: Snap-on Incorporated, Kenosha, WI (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/258,321

(22) Filed: Jan. 25, 2019

(65) Prior Publication Data

US 2020/0242860 A1 Jul. 30, 2020

(51) Int. Cl.
*G07C 5/12* (2006.01)
*G07C 5/00* (2006.01)
(Continued)

(52) U.S. Cl.
CPC .......... *G07C 5/0808* (2013.01); *G06Q 10/20* (2013.01); *G07C 5/0841* (2013.01); *G07C 5/12* (2013.01); *G06F 3/0488* (2013.01)

(58) Field of Classification Search
CPC ...... G07C 5/0808; G07C 5/0841; G07C 5/12; G07C 5/0825; G07C 5/08; G07C 2205/02;
(Continued)

(56) References Cited

U.S. PATENT DOCUMENTS 6,301,531 B1 10/2001 Pierro et al.
7,945,438 B2 5/2011 Balmelli et al.
(Continued)

OTHER PUBLICATIONS

Tomorrow's Technician Staff; Steering Angle Sensor Calibration, downloaded from the world wide web at https://www.tomorrowstechnician.com/steering-angle-sensor-calibration/; Apr. 5, 2016.

(Continued)

*Primary Examiner* — Yonel Beaulieu
(74) *Attorney, Agent, or Firm* — McDonnell Boehnen Hulbert & Berghoff LLP

(57) ABSTRACT

A diagnostic tool includes a processor, display, and memory storing instructions to perform scan tool functions (STF) including transmitting a message to a vehicle. The STF include first STF for a first system of the vehicle. Additional stored instructions are executable to display a first user-interface screen (UIS) including a first user-selectable control (USC) including an indicator of a first scanner job performable on the vehicle, and to display a second UIS instead of the first UIS in response to a selection of the first USC. The second UIS incudes: a second USC including an indicator of the first STF for the first system of the vehicle, and guidance for performing a procedure of the first scanner job. The stored instructions are executable to transmit a first vehicle data message to a component of the first system in response to a selection of the second USC.

19 Claims, 51 Drawing Sheets

(51) Int. Cl.
    *G07C 5/08* (2006.01)
    *G06Q 10/00* (2012.01)
    *G06F 3/0488* (2013.01)
(58) Field of Classification Search
    CPC ....... G06Q 10/20; G06F 3/048; G06F 3/0488; G06F 8/34; G05B 2219/2637; G05B 19/042; G01R 31/00; G01R 31/006
    See application file for complete search history.

(56) References Cited

U.S. PATENT DOCUMENTS

| | | | |
|---|---|---|---|
| 7,953,530 B1 | 5/2011 | Pederson et al. | |
| 8,437,902 B2* | 5/2013 | Shah | G06F 16/248 701/29.1 |
| 9,183,681 B2* | 11/2015 | Fish | G06F 3/00 |
| 9,363,340 B2* | 6/2016 | Brzozowski | H04L 69/167 |
| 9,418,490 B2* | 8/2016 | Gray | G07C 5/0808 |
| 10,156,960 B2* | 12/2018 | Marshall | G07C 5/0808 |
| 10,163,280 B1* | 12/2018 | Covington | G06Q 10/20 |
| 10,380,557 B2* | 8/2019 | Merg | G06Q 10/20 |
| 10,671,623 B2* | 6/2020 | Merg | G07C 5/006 |
| 10,825,268 B2* | 11/2020 | Covington | G06T 11/206 |
| 10,867,287 B2* | 12/2020 | Merg | G06Q 10/20 |
| 2002/0007289 A1 | 1/2002 | Malin et al. | |
| 2005/0065678 A1* | 3/2005 | Smith | G06Q 10/00 701/31.4 |
| 2008/0243488 A1 | 10/2008 | Balmelli et al. | |
| 2009/0259358 A1 | 10/2009 | Andreasen | |
| 2011/0225096 A1 | 9/2011 | Cho et al. | |
| 2013/0246400 A1* | 9/2013 | Shah | G07C 5/008 707/722 |
| 2014/0075356 A1* | 3/2014 | Gray | G07C 5/008 715/771 |
| 2014/0277908 A1* | 9/2014 | Fish | G07C 5/008 701/29.6 |
| 2014/0282256 A1* | 9/2014 | Fish | G06F 3/04817 715/835 |
| 2015/0121275 A1 | 4/2015 | Marshall et al. | |
| 2015/0371457 A1 | 12/2015 | Bakfan et al. | |
| 2016/0124635 A1 | 5/2016 | Covington et al. | |
| 2016/0247334 A1 | 8/2016 | Costantino | |

OTHER PUBLICATIONS

Wikipedia; OBD-II PIDs; downloaded from the world wide web at https://en.wikipedia.org/w/index_php?title=OBD-II_PIDs&oldid=877525216; Jan. 9, 2019.

U.S. Appl. No. 16/258,247, filed Jan. 25, 2019; inventors: Patrick S. Merg, Jacob G. Foreman, Roy S. Brozovich, Joseph R. Grammatico, and Joshua C. Covington.

International Searching Authority At European Patent Office; International Search Report, Written Opinion, and notification of transmittal for International Application No. PCT/US2019/062474 dated Mar. 10, 2020.

* cited by examiner

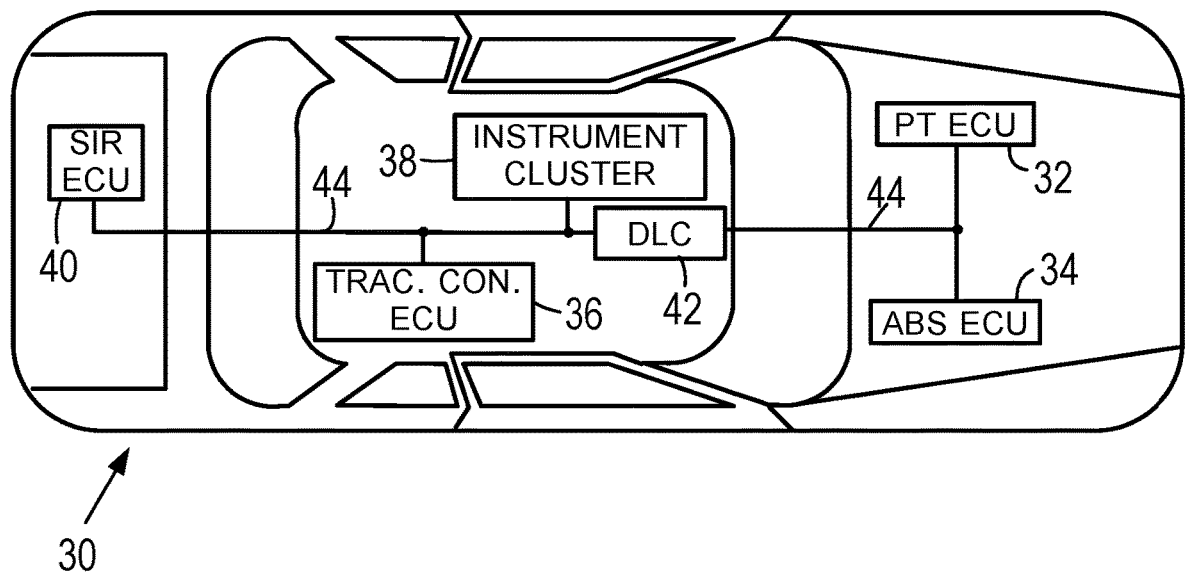
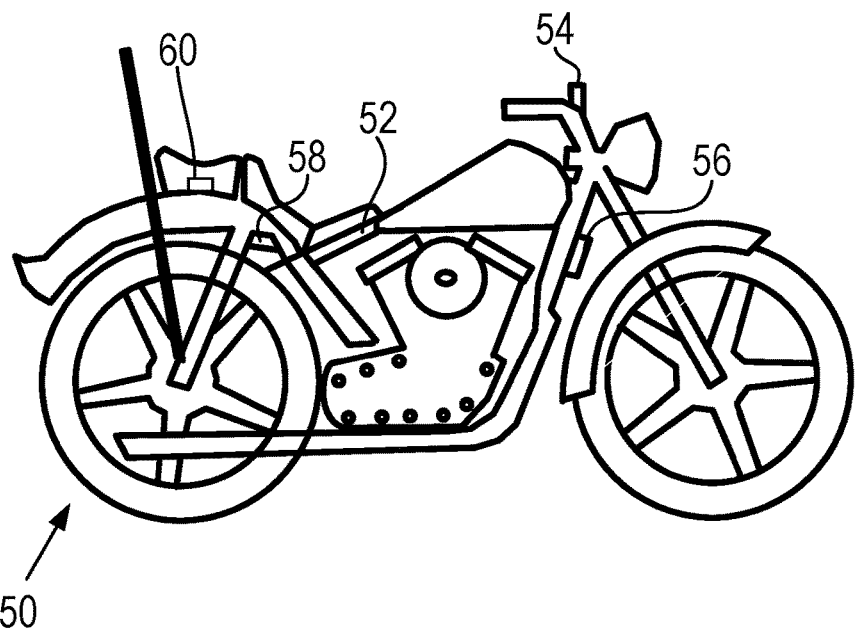
FIG. 2

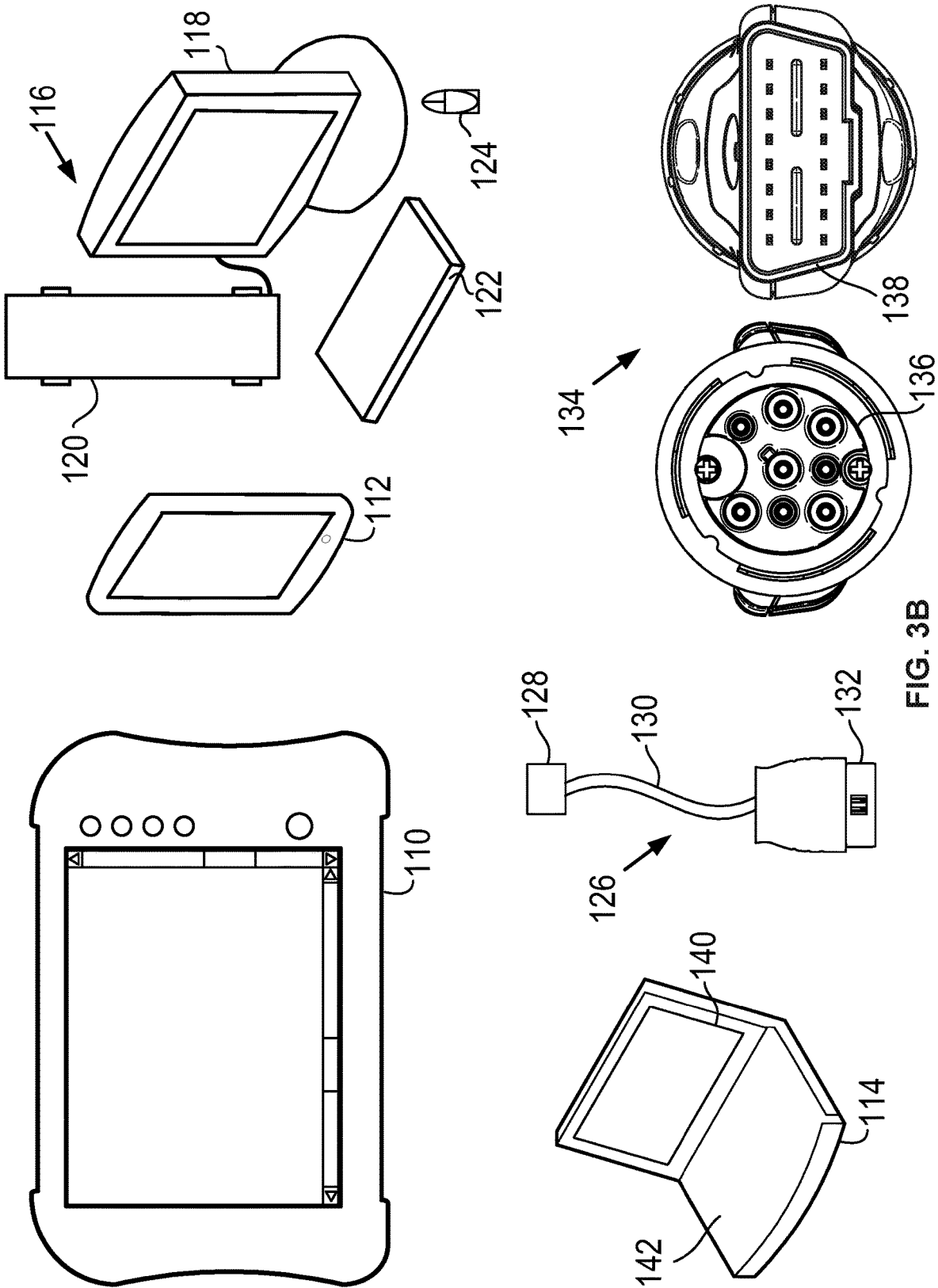

2016 Cadillac SRX 3.6L V6 DOHC (LFX)         700

Scanner Jobs Menu ← 717

Code Scan Menu ← 718    702

Clear all Codes by Code Scan Menu ← 719

Common Selections Menu ← 720

Engine

703

Codes Menu

Display Codes

Clear Codes

Freeze Frame / Failure Records

DTC Status

Data Display

Functional Tests

CKP Variation Learn [$20]

CMP Actuator Tests [$21]

Automated Injector Balance [$22]

Output Controls

A/C Compressor Clutch Relay [$23]

Compression Test [$24]

Cooling Fan 1 (On/Off) [$25]

Cooling Fans 2 & 3 (On/Off) [$26]

Cooling Fans 1, 2, & 3 (On/Off) [$27]

Depressurize Fuel System [$28]

Engine Oil Life Reset [$29]

Engine Speed [$2A]

****

Fuel Trim Enable (Yes/No) [$33]

Fuel Trim (Reset) [$34]

****

HO2S Heater Learn (Reset) [$3C]

Idle Spark (On/Off) [$3D]

Ignition Timing Retard (°) [$3E]

****

Starter Relay (On/Off) [$44]

Throttle Position (%) [$45]

Module Setup

CKP Sensor Variation Learn [$50]

Engine Idle Speed Adjustment [$51]

Idle Learn Reset [$52]

Throttle Sweep [$60]

VIN [$61]

Generic Functions

Readiness Monitors [$70]

($02) Freeze Frame [$71]

****

($09) Vehicle Identification Number [$77]

****

Tire Pressure Monitor

Oil specifications and resets

| 2016 Cadillac SRX 3.6L V6 (LFX) | | | | |
|---|---|---|---|---|
| Vehicle-Service Job ID | Target Req'd | Scan Tool Function ID | Function Category | System Service ID | Memory Address |
| Replace Brake Caliper | No | Park Brake Cable Replacement Procedure | Reset | Parking Brake Control | $01 / $E4 |
| Replace Brake Caliper | No | Park Brake Cable Service Release | Reset | Parking Brake Control | $02 / $E5 |
| Replace Brake Caliper | No | Automated Bleed | Reset | Antilock Brakes | $03 / $E6 |
| Replace Brake Caliper | No | Park Brake Cable Service Apply | Reset | Parking Brake Control | $04 / $9A |
| Replace Brake Caliper | No | Park Brake Calibration | Calibrate | Parking Brake Control | $05 / $E7 |
| Replace HVAC Actuator | No | Steering Angle Sensor Calibration | Calibrate | Antilock Brakes | $06 / $97 |
| Replace HVAC Actuator | No | Actuator Recalibration | Calibrate | HVAC | $07 / $C2 |
| Replace HVAC Actuator | No | Afterblow Configuration | Calibrate | HVAC | $08 / $C3 |
| Replace Crankshaft Position Sensor | No | CKP Sensor Variation Learn | Reset | Engine | $09 / $20 |
| Replace Brake Pedal Position Sensor | No | Brake Pedal Position Sensor Learn | Reset | Body Control | $0A / $A2 |
| Replace Throttle Body | No | Engine Idle Speed Adjustment | Reset | Engine | $0B / $51 |
| Replace Throttle Body | No | Idle Learn Reset | Reset | Engine | $0C / $52 |
| Wheel Alignment | No | Steering Angle Sensor Reset | Reset | Antilock Brakes | $0D / $98 |
| Wheel Alignment | Yes | Front Camera Calibration | Calibrate | Front Park Assist | $0E / $B4 |
| Replace Disc Brake Pads | No | Park Brake Cable Replacement Procedure | Reset | Parking Brake Control | $01 / $E8 |
| Replace Disc Brake Pads | No | Park Brake Cable Service Release | Reset | Parking Brake Control | $02 / $E9 |
| Replace Disc Brake Pads | No | Automated Bleed | Reset | Antilock Brakes | $03 / $E6 |
| Replace Disc Brake Pads | No | Park Brake Cable Service Apply | Reset | Parking Brake Control | $04 / $9A |
| Replace Disc Brake Pads | No | Park Brake Calibration | Calibrate | Parking Brake Control | $05 / $EA |
| Replace Power Window Motor | No | Power Window Motor Reset | Reset | Body Control | $0F / $A3 |
| Replace Steering Wheel Position Sensor | No | Steering Wheel Angle Sensor Reset | Reset | Steering Control | $10 / $EA |
| Replace Liftgate Actuator | No | Liftgate Actuator Reset | Reset | Door Control | $11 / $F7 |

| Year | Make | Model | Eng. | Transfer | Scanner Job ID | Target Req'd | Scan Tool Function ID | Function Category | System Service ID | Memory Address |
|---|---|---|---|---|---|---|---|---|---|---|
| 2014 | Chevrolet | Tahoe | 5.3L V8 SFI (LMG) | 4WD | Replace Brake Caliper | No | Automated Bleed | Reset | Antilock Brakes | $01 21 $01 65 |
| 2014 | Chevrolet | Tahoe | 5.3L V8 SFI (LMG) | 4WD | Replace Brake Pedal Position Sensor | No | Steering Angle Sensor Learn | Reset | Body Control | $01 22 $01 66 |
| 2014 | Chevrolet | Tahoe | 5.3L V8 SFI (LMG) | 4WD | Replace Crankshaft Position Sensor | No | Steering Position Sensor Cal. | Reset | Engine | $01 23 $01 67 |
| 2014 | Chevrolet | Tahoe | 5.3L V8 SFI (LMG) | 4WD | Replace HVAC Actuator | No | Blend Door 1 Reset | Reset | HVAC | $01 24 $01 68 |
| 2014 | Chevrolet | Tahoe | 5.3L V8 SFI (LMG) | 4WD | Replace HVAC Actuator | No | Blend Door 2 Reset | Reset | HVAC | $01 25 $01 69 |
| 2014 | Chevrolet | Tahoe | 5.3L V8 SFI (LMG) | 4WD | Replace Throttle Body | No | Idle Learn Reset | Reset | Engine | $01 26 $01 70 |

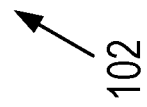

FIG. 6

| Year | Make | Model | Eng. | Transfer | Scanner Job ID | Target Req'd | Scan Tool Function ID | Function Category | System Service ID | Memory Address |
|---|---|---|---|---|---|---|---|---|---|---|
| 2014 | Chevrolet | Tahoe | 5.3L V8 SFI (LMG) | 2WD | Replace Brake Caliper | No | Automated Bleed | Reset | Antilock Brakes | $01 27 $01 71 |
| 2014 | Chevrolet | Tahoe | 5.3L V8 SFI (LMG) | 2WD | Replace Brake Pedal Position Sensor | No | Steering Angle Sensor Learn | Reset | Body Control | $01 22 $01 66 |
| 2014 | Chevrolet | Tahoe | 5.3L V8 SFI (LMG) | 2WD | Replace Crankshaft Position Sensor | No | Steering Position Sensor Cal. | Reset | Engine | $01 23 $01 67 |
| 2014 | Chevrolet | Tahoe | 5.3L V8 SFI (LMG) | 2WD | Replace HVAC Actuator | No | Blend Door 1 Reset | Reset | HVAC | $01 28 $01 72 |
| 2014 | Chevrolet | Tahoe | 5.3L V8 SFI (LMG) | 2WD | Replace HVAC Actuator | No | Blend Door 2 Reset | Reset | HVAC | $01 29 $01 73 |
| 2014 | Chevrolet | Tahoe | 5.3L V8 SFI (LMG) | 2WD | Replace Throttle Body | No | Idle Learn Reset | Reset | Engine | $01 26 $01 70 |
| 2014 | Chevrolet | Tahoe | 5.3L V8 SFI (LMG) | 2WD | Engine Oil Change | No | Null | Null | Null | $01 74 |

```
┌─────────────────────────────────────────────────────────────┐
│ DISPLAYING, ON A DISPLAY, A FIRST USER-INTERFACE SCREEN     │
│ INCLUDING A USER-SELECTABLE CONTROL INCLUDING AN INDICATOR  │
│ OF A FIRST SCANNER JOB PERFORMABLE ON AN IDENTIFIED VEHICLE │
└─────────────────────────────────────────────────────────────┘
                              │                              ╲─281
                              ▼
┌─────────────────────────────────────────────────────────────┐
│ IN RESPONSE TO A SELECTION OF THE USER-SELECTABLE CONTROL   │
│ INCLUDING THE INDICATOR OF THE FIRST SCANNER JOB,           │
│ DISPLAYING A SECOND USER-INTERFACE SCREEN INSTEAD OF THE    │
│ FIRST USER-INTERFACE SCREEN, WHEREIN THE SECOND             │
│ USER-INTERFACE SCREEN INCUDES A FIRST USER-SELECTABLE       │
│ CONTROL INCLUDING AN INDICATOR OF THE FIRST SCAN TOOL       │
│ FUNCTION FOR THE FIRST SYSTEM OF THE IDENTIFIED VEHICLE,    │
│ AND A SECOND USER-SELECTABLE CONTROL INCLUDING AN           │
│ INDICATOR OF THE SECOND SCAN TOOL FUNCTION FOR THE          │
│ SECOND SYSTEM OF THE IDENTIFIED VEHICLE                     │
└─────────────────────────────────────────────────────────────┘
                              │                              ╲─282
                              ▼
┌─────────────────────────────────────────────────────────────┐
│ IN RESPONSE TO A SELECTION OF THE FIRST USER-SELECTABLE     │
│ CONTROL FROM THE SECOND USER-INTERFACE SCREEN,              │
│ TRANSMITTING A FIRST VEHICLE DATA MESSAGE TO THE            │
│ IDENTIFIED VEHICLE, WHEREIN THE FIRST VEHICLE DATA          │
│ MESSAGE IS ADDRESSED TO A COMPONENT OF THE FIRST            │
│ SYSTEM OF THE IDENTIFIED VEHICLE                            │
└─────────────────────────────────────────────────────────────┘
                              │                              ╲─283
                              ▼
┌─────────────────────────────────────────────────────────────┐
│ IN RESPONSE TO A SELECTION OF THE SECOND USER-SELECTABLE    │
│ CONTROL FROM THE SECOND USER-INTERFACE SCREEN,              │
│ TRANSMITTING A SECOND VEHICLE DATA MESSAGE TO THE           │
│ IDENTIFIED VEHICLE, WHEREIN THE SECOND VEHICLE DATA         │
│ MESSAGE IS ADDRESSED TO A COMPONENT OF THE SECOND           │
│ SYSTEM OF THE IDENTIFIED VEHICLE                            │
└─────────────────────────────────────────────────────────────┘
                                                             ╲─284
  ↗
 280                         FIG. 9
```

Replace Liftgate Actuator —409
← Back —356 SCANNER REPAIR INFORMATION —411

Top Repairs —403

— replaced brake rotor (72)
-·-· cleaned brake caliper side pin (38)
— — replaced brake caliper (27)
—··— lubricated brake caliper (18)
— · — bled brake system (5)
·····  replaced brake caliper side pin (4)

Related to Job: Replace Liftgate Actuator

TSBs, Bulletins, Recalls and Campaigns ① —413
—405

Functional Resets and Calibrations ▶
—407

344 ↑

302 304 306 308 310 312 314 316 318
2016 Cadillac SRX
401

FIG. 18

Replace Liftgate Actuator ← 356

◉ Back  409 — [SCANNER] [REPAIR INFORMATION] — 411

Top Repairs

403 →

— replaced brake rotor (72)
–·– cleaned brake caliper side pin (38)
– – replaced brake caliper (27)
–··– lubricated brake caliper (18)
——— bled brake system (5)
········ replaced brake caliper side pin (4)

38K  76K  114K  152K

Related to Job: Replace Liftgate Actuator

405 — [ TSBs, Bulletins, Recalls and Campaigns ① ] — 413

Functional Resets and Calibrations

419 — [ Liftgate Maximum Open Position Learn ]

344 ↑

417

302 304  306  308  310 312     314  316 318

2016 Cadillac SRX

FIG. 19

REPAIR INFORMATION

← BACK | SCANNER | REPAIR INFORMATION ← 409
356                    411

| CHANGE VEHICLE | 2016 CADILLAC SRX | | Contact Us | Settings | Logout |
| --- | --- | --- | --- | --- | --- |
| | | RECALLS/CAMPAIGNS | | | |

SEARCH [LIFTGATE ACTUATOR   X | 🔍] ← 557

( HOME ) SEARCH RESULTS

SEARCH RESULTS FOR LIFTGATE ACTUATOR ⑤ ← 565 | RELATED TO LIFTGATE ACTUATOR ⓪ ← 565

LIFTGATE ACTUATOR
POWER LIFTGATE ACTUATOR ROD ← 559
LIFTGATE ACTUATOR CLUTCH
LIFTGATE ACTUATOR SWITCH
LIFTGATE ACTUATOR ROD BRACKET

NO RESULTS RETURNED FOR YOUR SEARCH ← 567

ADDITIONAL RESULTS ① ← 565

KEYWORD SEARCH – LIFTGATE ACTUATOR ← 561

🏠   📋   📋   📧   ➔   🖥   2016 Cadillac SRX   555   🔇 🔕
302  304  306  308  310  312      314                316 318

FIG. 28

REPAIR INFORMATION

| ← BACK | SCANNER | REPAIR INFORMATION |

609 — 613 CHANGE VEHICLE | 2016 CADILLAC SRX | RECALLS/CAMPAIGNS | Contact Us | Settings | Logout

▼ REMOVE & REPLACE — 611 — 617

(+) LIFTGATE ACTUATOR (1 OF 2) — 619 — 603

(−) ANTI-THEFT/LOCK SYSTEM (2 OF 2) — 605 — 615

DISARMING AN ARMED SYSTEM/SILENCING AN ALARM
VEHICLE CERTIFICATION, TIRE PLACARD, ANTI-THEFT, AND SERVICE PARTS ID LABEL
VISUAL/PHYSICAL INSPECTION

DISARMING AN ARMED SYSTEM/SILENCING AN ALARM — 607

IF SYSTEM ARMING HAS BEEN REQUESTED BY THE POWER DOOR LOCK SWITCH OR THE KEYLESS ENTRY TRANSMITTER, IT MUST BE DISARMED

IMPORTANT: USING THE POWER DOOR UNLOCK SWITCH OR MANUALLY UNLOCKING THE DOORS DOES NOT DISABLE THE CONTENT THEFT DETERRENT (CTD) ARM MODE. ALSO, DISCONNECTING THE BATTERY OR PULLING FUSES DOES NOT DISABLE THE ARM MODE, SINCE THE BCM STORES THE CTD MODE STATUS IN MEMORY.

- TO DISARM THE CTD SYSTEM IN STANDBY MODE, PERFORM ONE OF THE FOLLOWING:
- PRESS THE UNLOCK BUTTON ON THE KEYLESS ENTRY TRANSMITTER
- INSERT A VALID KEY INTO THE IGNITION AND SWITCH TO ON POSITION.

— 589 — 601 — 575

302 304 306 308 310 312 314 316 318

2016 Cadillac SRX

Repair Information
⇩ Scanner Jobs

574 — ◁ Remove & Replace
CHANGE VEHICLE | 2016 CADILLAC SRX | 578
572
RECALLS/CAMPAIGNS 584 — ⊟ Air Conditioning Actuator (1 of 2)
REMOVAL ⊗ WARNING: Disable the airbag system before attempting any steering wheel, steering column, or instrument panel component diagnosis or service. Disconnect and isolate the battery negative (ground) cable, then wait two minutes for the airbag system capacitor to discharge before performing further diagnosis or service. This is the only sure way to disable the airbag system. Failure to follow these instructions may result in accidental airbag deployment and possible serious of fatal injury.

1. Disconnect and isolate the negative battery cable.
2. Remove the steering column. Refer to COLUMN, REMOVAL.
3. Remove the pedal assembly. Refer to PEDAL(S), BRAKE AND/OR ACCELERATOR, REMOVAL.

Fig 10: Screw, Connector, Air Inlet Housing & Recirculation Door
576

582 — Settings / Logout / Contact Us / Print 580
570

302 304 306 308 310 312 — 2016 Cadillac SRX — 314 316 318

FIG. 40

METHOD AND SYSTEM FOR PROVIDING SCANNER JOBS ON DIAGNOSTIC TOOL

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., repair) any of the wide variety of mechanical components on a vehicle. While servicing a vehicle, a technician sometimes needs an electronic diagnostic tool to obtain information for diagnosing and/or repairing the vehicle, and for post-repair activities performed to the repaired vehicle.

In some instances, only one technician works on the vehicle while at the facility. In other instances, multiple technicians work on a vehicle while at the facility. In these latter instances, each of the multiple technicians may perform one or more different tasks to and/or on the vehicle. Those technicians may be called upon to perform those different jobs based on specific experience each technician may have and/or on specific training each technician may have received. An electronic diagnostic tool available to a technician may include a menu of functional tests that can be performed on a particular vehicle. To access the menu, the technician may need to identify a vehicle and a system on the particular vehicle. In many instances, the technician needs to access multiple menus of functional tests in order to be able to complete a particular job on the vehicle. Sometime, the technician needs to identify another system before being presented with another menu of functional tests.

OVERVIEW

In a first implementation, a diagnostic tool is provided. The diagnostic tool comprises: one or more processors, a display operatively connected to the one or more processors, and one or more computer-readable mediums operatively coupled to the one or more processors. The one or more computer-readable mediums have stored thereon first program instructions executable by the one or more processors to perform scan tool functions that include the one or more processors transmitting a VDM to an identified vehicle. The scan tool functions include a first scan tool function for a first system of the identified vehicle. The one or more computer-readable mediums also have stored thereon second program instructions executable by the one or more processors to cause the diagnostic tool to display, on the display, a first U/I screen including a user-selectable control including an indicator of a first scanner job performable on the identified vehicle. The second program instructions are executable to display a second U/I screen instead of the first U/I screen in response to a selection of the user-selectable control including the indicator of the first scanner job. The second U/I screen includes a first user-selectable control including an indicator of the first scan tool function for the first system of the identified vehicle, and guidance for performing a procedure of the first scanner job. The second program instructions are executable to transmit a first VDM to the identified vehicle in response to a selection of the first user-selectable control from the second U/I screen. The first VDM is addressed to a component of the first system of the identified vehicle.

In a second implementation, a method is provided. The method comprises displaying, on a display, a first U/I screen including a user-selectable control including an indicator of a first scanner job performable on an identified vehicle. The display is operatively connected to one or more processors. The one or more processors are operatively coupled to one or more computer-readable mediums having stored thereon program instructions executable by the one or more processors to perform scan tool functions that include the one or more processors transmitting a VDM to the identified vehicle. The scan tool functions include a first scan tool function for a first system of the identified vehicle. The method also includes displaying a second U/I screen instead of the first U/I screen in response to a selection of the user-selectable control including the indicator of the first scanner job. The second U/I screen includes a first user-selectable control including an indicator of the first scan tool function for the first system of the identified vehicle, and guidance for performing a procedure of the first scanner job. Furthermore, the method includes transmitting a first VDM to the identified vehicle in response to a selection of the first user-selectable control from the second U/I screen. The first VDM is addressed to a component of the first system of the identified vehicle.

In a third implementation, a computer-readable medium is provided. The computer readable medium has stored thereon first program instructions executable by one or more processors to cause a computing system to perform scan tool functions that include transmitting a VDM to an identified vehicle. The scan tool functions include a first scan tool function for a first system of the identified vehicle. The computer-readable medium also has stored thereon second program instructions executable by the one or more processors to cause the computing system to perform other functions comprising displaying, on a display, a first U/I screen including a user-selectable control including an indicator of a first scanner job performable on the identified vehicle. The other functions also include displaying a second U/I screen instead of the first U/I screen in response to a selection of the user-selectable control including the indicator of the first scanner job. The second U/I screen includes a first user-selectable control including an indicator of the first scan tool function for the first system of the identified vehicle, and guidance for performing a procedure of the first scanner job. Furthermore, the other functions include transmitting a first VDM to the identified vehicle in response to a selection of the first user-selectable control from the second U/I screen. The first VDM is addressed to a component of the first system of the identified vehicle.

Other implementations will become apparent to those of ordinary skill in the art by reading the following detailed description, with reference where appropriate to the accompanying drawings.

BRIEF DESCRIPTION OF THE DRAWINGS

FIG. 2 shows example vehicles in accordance with example implementations.

FIG. 3B shows example implementations of diagnostic tools and example implementations of portions of diagnostic tools or devices connectable to a diagnostic tool.

FIG. 4A, FIG. 4B, and FIG. 4C show an arrangement of scan tool functions for a vehicle in accordance with an example implementation.

FIG. 5, FIG. 6, and FIG. 7 show tables including example data of a scanner job.

FIG. 9 and FIG. 10 are flowcharts depicting sets of functions that can be carried out in accordance with example implementations.

FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, and FIG. 47 depict U/I screens in accordance with the example implementations.

DETAILED DESCRIPTION

I. Introduction

Figure 1:
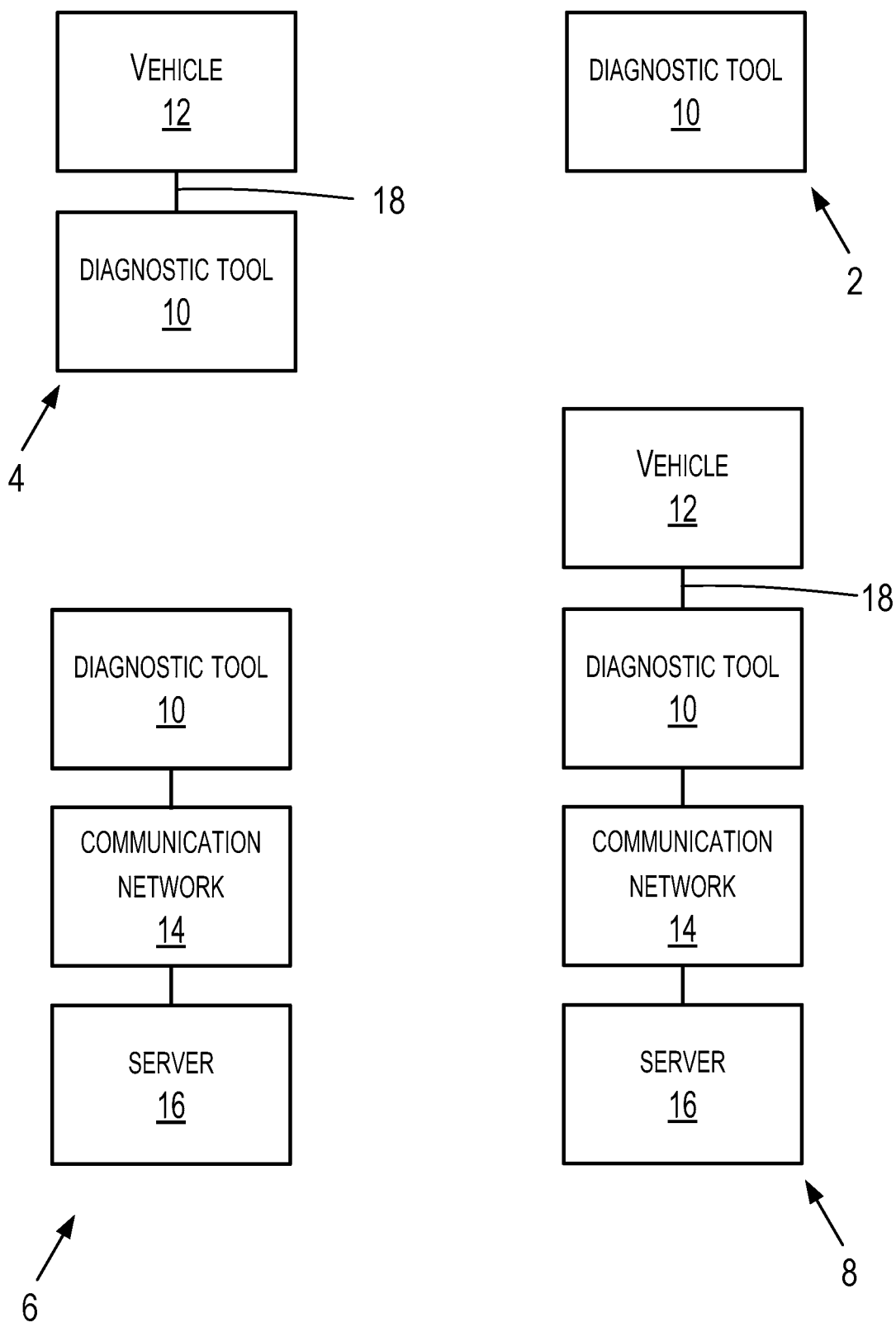
FIG. 1 shows block diagrams of system implementations including a diagnostic tool in accordance with example implementations.

This description pertains to a providing and/or performing a scanner job using a computing system, such as a diagnostic tool. A scanner job can be referred by other terms, such as a "smart job" and/or an "intelligent job." As an example, servicing a vehicle can include performing any of a variety of tasks such as diagnosing a vehicle, making a measurement, making an adjustment, testing a vehicle component, calibrating a vehicle component, programming or re-programming a vehicle component, controlling a vehicle component, performing maintenance to a vehicle, and/or removing and replacing a vehicle component, among other tasks.

The following abbreviations and/or acronyms are used throughout the description.

ABS—antilock brake system
AC—alternating current
CAN—controller area network
CRPI—computer-readable program instructions
DC—direct current
DTC—diagnostic trouble code
DLC—data link connector
ECM—engine control module
ECU—electronic control unit
EEEs—enumerated example embodiments
EEPROM—electrically erasable programmable read only memory
e.g.—for example
GUI—graphical user interface
HTML—hypertext markup language
HVAC—heating, ventilation and air conditioning
IEEE—Institute of Electrical and Electronics Engineers
ISO—International Organization for Standardization
MOST—media oriented systems transport
OBD—on-board diagnostic
OEM—original equipment manufacturer
PID—parameter identifier
PT—powertrain
PCM—powertrain control module
PWM—pulse width modulation
RAM—random access memory
SAE—Society of Automotive Engineers
SIR—supplemental inflatable restraint
TSB—technical service bulletin
TSBs—technical service bulletins
U/I—user interface
USB—universal serial bus
USC—user selectable control
USCs—user selectable controls
VCL—vehicle communication link
VCT—vehicle communication transceiver
VDM—vehicle data message
VDMs—vehicle data messages
VIN—vehicle identification number
VPW—variable pulse width
XML—extensible markup language
YMM—year, make, model
YMME—year, make, model, engine
YMMES—year, make, model, engine, system In some example implementations, a diagnostic tool displays a U/I screen with a USC for selecting a scanner job for an identified vehicle and displays a U/I screen including one or more USCs selectable to perform a scan tool function required to perform the scanner job. The diagnostic tool can transmit a VDM to the identified vehicle in response to selection of a USC to perform the scan tool function. Moreover, the diagnostic tool can display guidance regarding the scanner job when displaying a USC to perform a scan tool function. As an example, the diagnostic tool can request and receive the guidance from a server or store the guidance locally so that the diagnostic tool can provide the guidance without needing to request and receive the guidance from a server. In the foregoing example implementations, the diagnostic tool can, but need not necessarily, include an embedded processor programmed to perform scan tool functions to and/or on an identified vehicle.

Furthermore, in the example implementations described above, selecting a USC to perform a scan tool function can include displaying a U/I screen that is also displayable in response to selecting the scan tool function from a U/I screen that is not based on the scanner job, such as a U/I screen that is selectable from a menu based on a system of the identified vehicle. The diagnostic tool can store the scan tool function at a single location in a computer-readable memory, but execute the stored scan tool function in response to selecting a respective USC from different U/I screens.

Furthermore still, in at least some example implementations, performing a scanner job can include transmitting a VDM to a component of a first system of the identified vehicle and a VDM to a component of a second system of the identified vehicle. A single U/I screen displayed for the scanner job can include a first USC and a second USC selectable to cause transmission of a VDM to a component of the first system and a VDM to a component of the second system, respectively. In such implementations, performing the scanner job can be performed more efficiently since a user doesn't need to navigate to different U/I screens based on the first and second systems and/or based on the components of the first and second systems in order to cause transmission of VDM to the first and second components.

II. Example Systems with Diagnostic Tool

FIG. 1 shows block diagrams of a variety of example system implementations that include a diagnostic tool 10. A system 2 includes the diagnostic tool 10. A system 4 includes the diagnostic tool 10, a vehicle 12, and a vehicle-to-tool link 18 configured to operatively connect the diagnostic tool 10 and the vehicle 12. Each vehicle-to-tool link discussed in this description operatively connects a diagnostic tool to a vehicle. A system 6 includes the diagnostic tool 10, a communication network 14, and a server 16. The communication network 14 operatively connects the diagnostic tool 10 and the server 16. A system 8 includes the diagnostic tool 10, the vehicle 12, the communication network 14, the server 16, and the vehicle-to-tool link 18. The diagnostic tool 10 can, but need not necessarily, request the server 16 to perform a web-service for the diagnostic tool 10. In the system 6, 8, the server 16 can perform a web-service requested by the diagnostic tool 10. In the system 2, the diagnostic tool 10 can perform diagnostics, such as diagnostics regarding the vehicle 12, without being operatively connected to the vehicle 12. In the system 2, 4, the diagnostic tool 10 can perform diagnostics, such as diagnostics regarding the vehicle 12, without being operatively connected to the server 16. Other example implementations of a system including the diagnostic tool 10 are possible.

In accordance with the example implementations, the web-service requested by a diagnostic tool can include a web-service to provide a scanner job and/or guidance regarding a scanner job. In those and/or in other implementations, performing the web-service can include the diagnostic tool 10 transmitting, to the server 16, a request including a vehicle identifier and an identifier of a vehicle component, and the server 16 providing, to the diagnostic tool 10, a response including guidance based on the identified vehicle, the vehicle component, and a scan tool function to be performed as part of performing the scanner job. Any request sent to the server 16 from the diagnostic tool 10 can, but need not necessarily, include a request for a web-service and any response sent to the diagnostic tool from the server can, but need not necessarily, include a response of a web-service. Providing a scanner job and/or guidance to the diagnostic tool 10 can include providing a U/I screen and/or data to populate a U/I screen.

A vehicle, such as the vehicle 12, is a mobile machine that can be used to transport a person, people, and/or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guided at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof.

A vehicle can include an ECU, a DLC, and a vehicle communication link (e.g., the vehicle communication link 44 shown in FIG. 2) that connects the DLC to the ECU. A vehicle can include other vehicle components, some of which are connected to an ECU. For instance, the vehicle components can include a sensor connected to an ECU, and a motor or solenoid connected to an ECU. An ECU can detect a whether a malfunction exists in the vehicle and set a DTC indicative of a status of the malfunction, such as an active status if the malfunction is currently detected or a history status if the malfunction was detected previously, but not currently.

FIG. 2 shows vehicle 30, 50. The vehicle 12 shown in FIG. 1 can be arranged like the vehicle 30, the vehicle 50, or a different type of vehicle. As an example, the vehicle 30 can be arranged as an automobile and the vehicle 50 can be arranged as a motorcycle.

A vehicle manufacturer can build various quantities of vehicles each calendar year (e.g., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two or more calendar years. A vehicle manufacturer can build one vehicle model or multiple different vehicle models. Two or more different vehicle models built by a vehicle manufacturer during a particular calendar year can have the same or different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (e.g., vehicle manufacturer)), marketing names associated with vehicle (e.g., a vehicle model name, or more simply "model"), and/or features of the vehicle (e.g., an engine type and/or a system). In accordance with that example, the particular vehicle identifying information can be referred to by an abbreviation YMME, where each letter in the order shown represents a model year identifier, vehicle make identifier, vehicle model name identifier, and engine type identifier, respectively, or an abbreviation YMM, where each letter in the order shown represents a model year identifier, vehicle make identifier, and vehicle model name identifier, respectively, or an abbreviation YMMES, where each letter in the order shown represents a model year identifier, a vehicle make identifier, a vehicle model name identifier, an engine type identifier, and a vehicle system identifier. An example YMME is 2004/TOYOTA®/CAMRY®/4Cyl, in which "2004" represents the model year the vehicle was built, "TOYOTA®" represents the name of the vehicle manufacturer Toyota Motor Corporation, Aichi Japan, "CAMRY®" represents a vehicle model built by that manufacturer, and "4Cyl" represents a an engine type (e.g., a four cylinder internal combustion engine) within the vehicle. A person skilled in the art will understand that other features in addition to or as an alternative to "engine type" can be used to identify a vehicle using particular vehicle identifying information, and for some purposes, a vehicle could be identified by its make and model M/M. These other features can be identified in various manners, such as by use of a regular production option (RPO) code, such as an RPO code defined by the General Motors Company LLC, Detroit Mich. Furthermore, the vehicle identifying information can be combined and displayed as a VIN. The VIN can be displayed on a VIN label.

The diagnostic tool 10 can display one or more U/I screens on which a user can input at least a portion of a vehicle identifier. As an example, U/I screens for inputting a year, make, model, and engine can be displayed in (1) an order of year, make, model and engine, (2) an order of make, year, model, and engine, or (3) via another order. An additional U/I screen to input another characteristic of the vehicle can be displayed after the U/I screens to input the year, make, model, and engine are displayed. As an example, the additional U/I screen can allow a user to input a characteristic to further distinguish a vehicle being identified such as a characteristic indicating whether or not a particular vehicle component, such as an air pump, is present on the vehicle being identified. Other examples of the additional U/I screen are possible.

A vehicle communication link of the vehicle 12, 30, 50 can include one or more conductors (e.g., copper wire conductors) or can be wireless. As an example, the vehicle communication link in the vehicle 12, 30, 50 can include one or more conductors for carrying vehicle data messages in accordance with a VDM protocol. A VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 CAN VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, an ISO® 11898-1:2015 road vehicle—CAN—Part I: data link layer and physical signaling protocol, a MOST® Cooperation VDM protocol (such as the MOST Specification Rev. 3.0 E2, or the MOST® Dynamic Specification, Rev. 3.0.2), or some other VDM protocol defined for performing communications with or within the vehicle 12, 30, 50. Each and every VDM discussed in this description is arranged according to a VDM protocol.

An ECU in and/or on the vehicle 12, 30, 50 can control various aspects of vehicle operation or components within a vehicle. For example, the vehicle 30 can include a PT ECU 32, (such as an ECM ECU and/or a PCM ECU), an ABS ECU 34, a traction control system ECU 36, an instrument cluster ECU 38, and an SIR system ECU 40 (e.g., an air bag system). Other examples of an ECU in the vehicle 30 are possible. Each ECU in a vehicle can receive inputs (e.g., a sensor input), control output devices (e.g., a solenoid), generate a VDM, such as a VDM based on a received input or a controlled output. An ECU in a vehicle can perform a functional test or repair procedure in response to receiving a VDM requesting performance of the functional test or the repair procedure. A VDM received by an ECU can include a parameter request that includes a PID. A VDM transmitted by an ECU can include a response including the PID and a PID data value for the PID. An ECU can be connected to a non-ECU vehicle component, such as a vehicle battery, a sensor, a vehicle chassis, a solenoid, a fuel injector, a fuel pump, or some other vehicle component via a circuit.

The DLC 42 can include a connector such as an OBD I connector, an OBD II connector, or some other connector. An OBD II connector can include slots for retaining up to sixteen connector terminals, but can include a different number of slots or no slots at all. As an example, the DLC 42 can include an OBD II connector that meets the SAE® J1962 specification such as a connector 16M, part number 12110252, available from Aptiv LLC of Dublin, Ireland. The DLC 42 can include conductor terminals that connect to a conductor in the vehicle 30. For instance, the DLC 42 can include connector terminals that connect to conductors that respectively connect to positive and negative terminals of a vehicle battery. The DLC 42 can include one or more conductor terminals that connect to a conductor of the VCL 44 such that the DLC 42 is communicatively connected to the PT ECU 32, the ABS ECU 34, the traction control system ECU 36, the instrument cluster ECU 38, and the SIR system ECU 40.

In accordance with an example implementation, the vehicle 50 includes a fuel injection ECU 52, an instrument cluster ECU 54, an ABS ECU 56, an ignition ECU 58, and a DLC 60. One or more ECU on the vehicle 50 can be connected to the DLC 60 via a vehicle communication link (not shown).

III. Example Diagnostic Tool

Figure 3A:
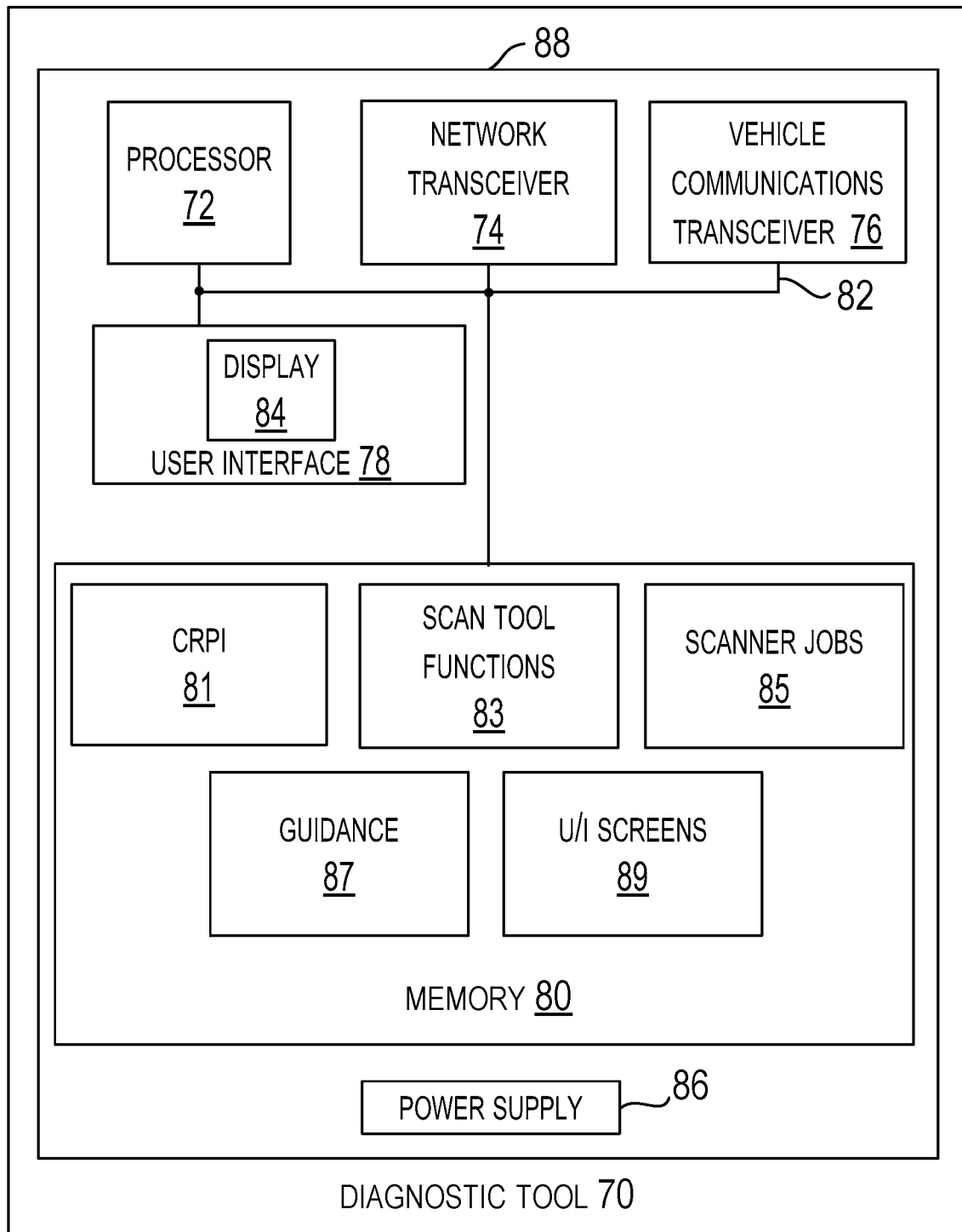
FIG. 3A is a block diagram of a diagnostic tool in accordance with example implementations.

Next, FIG. 3A is a block diagram of a diagnostic tool 70, in accordance with example implementations. Each instance of the diagnostic tool 10 shown in FIG. 1 can include and/or be configured like the diagnostic tool 70 or any portion(s) of the diagnostic tool 70. Furthermore, the diagnostic tool 70 can operate in any system shown in FIG. 1 in place of the diagnostic tool 10, or in some other system. As shown in FIG. 3A, the diagnostic tool 70 includes a processor 72, a network transceiver 74, a VCT 76, a user interface 78, and a memory 80. Two or more of those components can be operatively coupled together via a system bus, network, or other connection mechanism 82. The diagnostic tool 70 also includes a power supply 86 and a housing 88. The user interface 78 includes a display 84. The display 84 can be operatively connected to the connection mechanism 82.

A. Diagnostic tool components

1. Processor

A processor, such as the processor 72 and/or any other processor discussed in this description, can include one or more processors. A processor discussed in this description can thus also be referred to as least one processor and/or one or more processors. A processor can include a general purpose processor (e.g., an INTEL® single core microprocessor or an INTEL® multicore microprocessor), or a special purpose processor (e.g., a digital signal processor, a graphics processor, an embedded processor, or an application specific integrated circuit (ASIC) processor).

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the processor 72 can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

A processor can be configured to execute CRPI. The CRPI discussed in this disclosure, such as the CRPI 81, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. A processor can be configured to execute hard-coded functionality in addition to or as an alternative to software-coded functionality (e.g., via CRPI). The processor 72 can be programmed to perform any function or combination of functions described herein as being performed by the diagnostic tool 70.

2. Memory

A memory, such as the memory 80 and/or any other memory discussed in this description, can include one or more memories. Any memory discussed in this description can thus also be referred to as least one memory and/or one or more memories. A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor. Furthermore, some portion of the memory 80 can be used as a data buffer (which can more simply be referred to as a "buffer"). As an example, data the network transceiver 74 receives from the server 16 can be stored in the buffer. At least a portion of the buffer can operate as a cache from which the processor 72 reads stored data multiple times.

A non-transitory memory can include a volatile or non-volatile storage component, such as an optical, magnetic, organic or other memory or disc storage component. Additionally or alternatively, a non-transitory memory can include or be configured as a RAM, a read-only memory (ROM), a programmable read-only memory (PROM), an erasable programmable read-only memory (EPROM), an EEPROM, a hard drive, or a compact disk read-only memory (CD-ROM). The RAM can include static RAM or dynamic RAM.

A transitory memory can include, for example, CRPI provided over a communication link, such as the communication network 14. The communication network 14 can include a digital or analog communication link. The communication network 14 can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," and/or "one or more computer-readable medium." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the network transceiver 74, the VCT 76, and/or any other transceiver discussed in this description, can include one or more transceivers. Each transceiver includes one or more transmitters configured to transmit data or a communication onto a network, data bus, and/or communication link, such as the communication network 14 or the VCL 44. Each transceiver includes one or more receivers configured to receive data or a communication carried over a network, data bus, and/or communication link, such as the communication network 14 or the VCL 44. A transceiver, or a portion thereof, can be located within or as part of a processor (e.g., within a single integrated circuit chip). A transceiver, or a portion thereof, can be separate and distinct from a processor.

The network transceiver 74 can transmit any data or communication discussed as being transmitted, output, or provided by the diagnostic tool 70, such as a datum or communication transmitted, output or provided to the vehicle 12, the communication network 14, and/or the server 16. The network transceiver 74 can receive any data or communications discussed as being received by the diagnostic tool 70 and/or the network transceiver 74, such a datum or communication the diagnostic tool 70 and/or the network transceiver 74 receives from the vehicle 12, the communication network 14, and/or the server 16.

The VCT 76 includes a transceiver configured for transmitting a VDM to the vehicle 12, 30, 50 via a VCL and for receiving a VDM transmitted by the vehicle 12, 30, 50 via a VCL. The VCT 76 can include a transceiver (e.g., an integrated transmitter and receiver, or a distinct transmitter and a distinct receiver). In some implementations, a transmitter of the VCT 76 can transmit a VDM to the vehicle 12, 30, 50 via a VCL. The VDM transmitted to the vehicle 12, 30, 50 via a VCL can include a request for diagnostic information (such as a DTC) from an ECU in the vehicle. In those implementations, the receiver of the VCT 76 can receive a VDM transmitted by the vehicle 12, 30, 50 over the VCL. The VDM received by the receiver of the VCT 76 via the VCL can include diagnostic information transmitted by an ECU in and/or on the vehicle 12, 30, 50. A VDM can include a component identifier, such as an identifier of the ECU that transmits the VDM. The VDM can include data indicative of a DTC set by the ECU. The processor 72 can select data from within the VDM and cause the selected data to be displayed on the display 84.

The VCT 76 can include a transceiver (e.g., an integrated transmitter and receiver, or a distinct transmitter and a distinct receiver). The transmitter of the VCT 76 can be configured to transmit a VDM to a vehicle or, in particular, an ECU within the vehicle. The VDM transmitted by the VCT 76 can include a VDM with a request for a DTC set by the ECU or a VDM to request a PID parameter, or a VDM to control the ECU and/or a component operatively coupled to the ECU. The receiver of the VCT 76 can be configured to receive a VDM transmitted by an ECU over a vehicle-to-tool link. In some implementations, the VDM received by the VCT 76 can include a VDM indicative of a DTC set within the vehicle, a VDM including a PID and PID parameter, or a VDM sent in response to a VDM to control the ECU and/or the component operatively coupled to the ECU. As an example, a wired transceiver of the VCT 76 can include a transceiver such as a system basis chip with high speed CAN transceiver 33989 provided by NXP Semiconductors, Eindhoven, Netherlands.

The VDM transmitted and/or received by the VCT 76 can be arranged according to a VDM protocol for a geographic region in which the identified vehicle operates. For example, in the United States, the VDM can be arranged according to the OBD II standard. As another example, in European countries, the VDM can be arranged according the an EOBD standard in line with European Directive 98/69/EC.

In some implementations, a vehicle-to-tool link includes a wiring harness. The wiring harness can be configured to provide a wired connection between the diagnostic tool 10, 70 and the vehicle 12, 30, 50. In some implementations, the wiring harness can be removably connected to a DLC within the vehicle 12, 30, 50. The VCT 76 can include and/or connect to one or more connectors, one of which can be located at an end of the wiring harness. In some other implementations, a vehicle-to-tool link includes a wireless link between transceivers in the diagnostic tool 10, 70, and the vehicle 12, 30, 50. As an example, the transceiver in the vehicle 12, 30, 50 can be within a vehicle component. As another example, the transceiver in the vehicle 12, 30, 50 can within a vehicle-to-tool link device, such as the wireless vehicle-to-tool link device 134 shown in FIG. 3B.

The VCT 76 can include a wireless transceiver to communicate with a separate wireless transceiver within the diagnostic tool 70. A transmitter, such as a transmitter in the network transceiver 74 or in the VCT 76, or a transmitter in any other transceiver discussed in this description, can include a radio transmitter configured to transmit radio signals carrying data and/or a communication, and a receiver, such as a receiver in the network transceiver 74 or in the VCT 76, or a receiver in any other transceiver discussed in this description, can include a radio receiver configured to receive radio signals carrying data and/or a communication. A transceiver with a radio transmitter and radio receiver can include one or more antennas and can be referred to as a "radio transceiver," an "RF transceiver," and/or a "wireless transceiver."

A radio signal transmitted or received by a radio transceiver can be arranged in accordance with one or more wireless communication standards or protocols such as an IEEE standard, such as (i) an IEEE 802.11 standard for wireless local area networks (wireless LAN) (which is sometimes referred to as a Wi-Fi standard) (e.g., 802.11a, 802.11b, 802.11g, 802.11n, 802.11ac, or 802.11ax), (ii) an IEEE 802.15 standard (e.g., 802.15.1, 802.15,3, 802.15.4 (ZigBee), or 802.15.5) for wireless personal area networks (PANs), (iii) a Bluetooth version 4.1, 4.2 or 5.0 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are available.

Additionally or alternatively, a transmitter, such as a transmitter in the network transceiver 74 or in the VCT 76, can transmit a signal (e.g., one or more signals or one or more electrical waves) carrying or representing data or a communication onto a wire (e.g., one or more wires) and a receiver, such as a receiver in the network transceiver 74 or in the VCT 76, can receive via a wire a signal carrying or representing data or a communication over the wire. The wire can be part of a network, such as the communication network 14. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification maintained and/or developed by the USB Implementers Forum in Beaverton, Oreg., such as the USB 2.0 standard, the USB 3.0 standard, or the USB 3.1 standard, or some other wired communication standard.

The data or communication transmitted by a network transceiver, such as the network transceiver 74, can include a destination identifier or address of a network device to which the data or communication is to be transmitted. The data or communication transmitted by a network transceiver can include a source identifier or address of the system component including the network transceiver. The source identifier or address can be used to send a response to the network device that includes the network transceiver that sent the data or communication.

A network transceiver, such as the network transceiver 74, configured to carry out communications over a communication network, such as the communication network 14, can include one or more of the following: a modem, a network interface card, or a chip mountable on a circuit board. As an example the chip can include a CC3100 Wi-Fi® network processor available from Texas Instruments, Dallas, Tex., a CC256MODx Bluetooth® Host Controller Interface (HCI) module available from Texas instruments, or a different chip for communicating via Wi-Fi®, Bluetooth® or another communication protocol.

A device within or coupled to the communication network 14 or that communicates via the communication network 14 using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

4. User Interface

The user interface 78 includes one or more U/I components operable to input data (e.g., a user selection of a USB) to the processor 72 and one or more U/I components operable to output data (e.g., data output by the processor 72). A component of the user interface 78 can be referred to as a "user interface component" and/or a "U/I component." In some implementations, the display 84 can include a touch screen display that is configured to input data to the processor 72 and to display data output by the processor 72. In some implementations, a U/I component includes a keypad and/or a capture device.

A user interface component can, but need not necessarily, include a USC. A USC can be used by a user of the diagnostic tool 10, 70 to enter an input into the diagnostic tool 10, 70, such as an input detectable by the processor 72. In some implementations, a USC includes a USC of a U/I screen shown on the display 84. In those or in other implementations, a USC includes a hardware control, such as a key of the keypad. In one respect, a USC can be independent of the keys of the keypad. In that case, an input can be entered using the USC by use of the display 84, for example by touching the display 84 in proximity to the USC. In another respect, a USC shown on the display 84 can be associated with a key of the keypad. In that case, an input can be entered using the USC by use of the key of the keypad. The keypad can include a key that is not associated with a USC shown on the display 84.

The display 84 can, but need not necessarily, include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can be backlit, color LCD. The display 84 can include a touch screen display with the LCD. For instance, the display 84 can include a capacitive (such as a projective capacitive) touch screen display or a resistive touch screen display. Other examples of the display 84 are available.

The display 84 can display a horizontal scroll bar and/or a vertical scroll bar. The horizontal scroll bar and/or the vertical scroll bar can be used to cause the display 84 to display a non-visible portion of an image or a U/I screen output by the processor 72 to the display 84. The display 84 can display still images and/or a video. For clarity of the drawings, some of the U/I screens shown in the drawings are shown without a horizontal scroll bar and/or a vertical scroll bar.

The display 84 can show a GUI that includes graphical objects. For instance, the GUI can show USCs via which a user can enter an input pertaining to use of the diagnostic tool 10, 70. The input can represent a selection, information, a search criterion, and/or a request, such as a request for a web-service. As an example, a USC can include a graphical button, such as a rectangle surrounding text representative of a selection or information associated with the graphical button. As another example, a USC can include a pull-down menu, a check box, and/or a text box for entering textual information. The U/I screen can, for example, display any of the content shown in FIG. 11 to FIG. 47. The processor 72 can output a U/I screen to the display 84. A U/I screen output by the processor 72 can be referred to as a GUI.

A keypad can include one or more components configured for use by a user to enter a selection, information, a search criterion, and/or a request into the diagnostic tool 70. A key configured for entering a selection can be referred to as a control key. The keypad can include one or more control keys, or more simply "key". A key can include a push button, such as a press-and-hold button or a press-and-release button. In some implementations, the keypad includes a hardware keyboard with a set of numeric keys, alphanumeric keys, alphabet keys, or some other hardware keys. In some other implementations, the display 84 includes at least a portion of the keypad that includes soft keys, such as capacitive or resistive keys of a touch screen display. In still other implementations, the keypad includes one or more hardware keys, such as a power on/off key, a yes key and a no key, or four cursor keys for selecting a direction such as up, down, left or right. In still yet other implementations, the soft keys of the keypad on the touch screen display can include a power on/off key, a yes key and a no key, or four cursor keys.

A capture device can include one or more components configured to generate data based on objects in proximity to the diagnostic tool 70 and/or signals from which that data can be generated. As an example, the data generated by the captured device can include an image (e.g., an image file), content of a scanned image, and/or measurement data. In at least some implementations, the capture device includes one or more of the following: an image scanner, a barcode scanner, a visual light camera, a light source, a lens, or an image sensor. A data file representative of a captured image or content of a scanned image can be stored in the memory 80. As an example, the captured image can include one or more of the following: an image of the vehicle 12, 30, 50, or an image of some portion of the vehicle 12, 30, 50, such as a license plate attached to the vehicle or a VIN label attached to the vehicle. As another example, the captured image can include image data of a scanned barcode, such as the barcode on a VIN label attached to the vehicle 12, 30, 50. Performing a scanner job can, but need not necessarily, include capturing an image, such as an image of a bar code indicating a VIN of a vehicle, a part number, or a software identifier, so that the processor 72 can determine the identified vehicle or vehicle component being serviced.

5. Other Diagnostic Tool Components

The connection mechanism 82 can include any of a variety of conductions to carry communications or data between the components connected to the connection mechanism 82. As an example, the connection mechanism 82 can include a copper foil trace of a printed circuit board, a wire, or some other conductor.

The power supply 86 can be configured in any of a variety of configurations or combinations of the variety of configurations. As an example, the power supply 86 can include circuity to receive AC from an AC electrical supply (e.g., electrical circuits connected to an electrical wall outlet) and convert the AC to a DC for supplying to one or more of the components within the diagnostic tool 10, 70. As another example, the power supply 86 can include a battery and/or be battery operated. As yet another example, the power supply 86 can include a solar cell and/or be solar operated. The power supply 86 can include electrical circuits to distribute electrical current throughout the diagnostic tool 10, 70. Other examples of the power supply 86 are available.

The housing 88 can surround at least a portion of one or more of following: the processor 72, the network transceiver 74, the VCT 76, the user interface 78, the memory 80, the connection mechanism 82, the display 84, and/or the power supply 86. The housing 88 can be referred to as an enclosure. The housing 88 can support a substrate. At least a portion of one or more of the following can be mounted on and/or connect to the substrate: the processor 72, the network transceiver 74, the VCT 76, the user interface 78, the memory 80, the connection mechanism 82, and/or the display 84. The housing 88 can be made from various materials. For example, the housing 88 can be made from a plastic material (e.g., acrylonitrile butadiene styrene (ABS)) and a thermoplastic elastomer used to form a grip on the housing 88.

6. Memory Content

The memory 80 contains computer-readable data. In an example implementation, the computer-readable data contained in the memory 80 can include data from among: the CRPI 81, scan tool functions 83, scanner jobs 85, guidance 87, and/or U/I screens 89.

The scan tool functions 83 include computer-readable data the processor 72 uses to perform a scan tool function that includes transmitting one or more VDMs. In an example implementation, the data to perform a scan tool function includes VDM data (e.g., the data to be transmitted as the VDM). For instance, the VDM data according to the ISO 11898 VDM protocol can include a start-of-frame bit, a multi-bit control field, a zero to eight byte data field, a multi-bit cyclic redundancy check field, an acknowledgement slot bit, an acknowledgment delimiter bit, and a multi-bit end-of-frame field. Alternatively a VDM according to the CAN VDM protocol can include a VDM to request a PID, where that VDM includes a first byte indicating the VDM includes two more bytes, a second byte indicating $01 if current PID data is being requested or $02 if freeze frame data is being requested, and a third byte indicating a hexadecimal representation of the PID. Examples of VDM data for other VDM protocols to perform a scan tool function are possible.

In another example implementation, the data to perform a scan tool function includes VDM data and data from among: a scan tool function identifier, a VCT identifier indicating which VCT of two or more VCT is to be used to transmit the VDM, vehicle identification indicating which vehicle(s) are associated with the scan tool function, and a scan tool function category. Each VDM transmitted by the processor 72 to perform a scan tool function is directed to one or more components in a vehicle. In some implementations, the component includes an ECU or a sensor connected to an ECU. The VDM can include data that the component responsively uses to perform some function in the vehicle.

The scan tool functions 83 can also include CRPI to cause the display 84 to display data pertaining to the scan tool function. As an example, a scan tool function can include data for determining a VDM transmitted by the vehicle is a response to a VDM transmitted by the diagnostic tool 10, 70 to perform the scan tool function. In some implementations, a scan tool function is associated with a memory address for use as a pointer to the scan tool function. A benefit of associating a scan tool function with a pointer is that the processor 72 can execute the same scan tool function stored in the scan tool functions 83 in different operating states of the diagnostic tool 10, 70, such as a first operating state in which the diagnostic tool 10, 70 allows for selections of scan tool functions based on an identified system of an identified vehicle, and a second operating state in which the diagnostic tool 10, 70 allows for selections of scan tool functions based on a scanner job selected for an identified vehicle.

As an example, the processor 72 can execute CRPI to determine a meaning of a VDM received from a vehicle, such as a VDM including a PID and PID parameter value. For instance, a VDM received in response a VDM requesting a PID according to the CAN VDM protocol can include a VDM including a first byte indicating a representing how many more bytes are contained in the response (e.g., three to six more bytes), a second byte indicating $41 if current PID data is contained in the response VDM or $42 if freeze frame data is contained in the response VDM, a third byte indicating a hexadecimal representation of the PID, and one to four bytes representing the PID parameter value.

Each scan tool function can, but need not necessarily, be associated with a scan tool function category. A benefit of associating a scan tool function with a scan tool function category is that the processor 72 can determine a label associated with the category to include in a USC to initiate performance of the scan tool function. Another benefit of associating a scan tool function with a scan tool function category is that the processor 72 can output a U/I screen with scan tool functions associated with a scanner job grouped together based on respective scan tool function categories.

In an example implementation, the scan tool function categories available to associate with a scan tool function include one or more from among: a calibrate category, a control category, a program category, or a reset category. Other names could be used to refer to one or more of the aforementioned categories.

A scan tool function associated with the calibrate category can include a scan tool function configured to calibrate a vehicle component within the identified vehicle. In some implementations, the vehicle component to be calibrated includes a first vehicle component to which the VCT 76 transmits a VDM with a calibrate instruction. In some implementations, the first vehicle component to be calibrated works cooperatively with a second vehicle component on which the calibration is based. For example, the first vehicle component can include a tire pressure monitoring system module and the second component can include a new tire pressure monitor sensor (TPMS) attached to a wheel. As another example, the first vehicle component can include a module that determines speed of a vehicle, such as a PCM ECU, and the second component can include new tires and/or wheels installed onto the vehicle, such as tires and/or wheels that are different in size than the tires and/or wheels replaced by the new tires and/or wheels. As still yet another example, the first vehicle component can include a headlight motor configured to reposition a headlight, the second vehicle component can include a body control module, and the VDM sent to the body control module can include a VDM including parameters to aim the headlight.

In other implementations, a first vehicle component to be calibrated is operatively connected to a second vehicle component to which the VCT 76 transmits a VDM with a calibrate instruction. As an example, the first component can include a new valve or solenoid installed into the vehicle and the second component can include a PCM ECU. As yet another example, the first component can include a power window switch, the second component can include a body control module, and the VDM sent to the body control module can include a VDM having data indicating upper and lower travel limits of a power window and/or power window motor connected to the power window switch. As still yet another example, the first component can include a fuel system throttle plate, the second component can include a PCM ECU, and the VDM sent to the PCM ECU can include a data value indicating a throttle position. Accordingly, a vehicle component can be calibrated by setting limits for the vehicle component.

A scan tool function associated with the control category can include a scan tool function configured to control a vehicle component within the identified vehicle. As an example, controlling a vehicle component can include the VCT 76 sending the vehicle component a VDM with a control instruction to turn on or turn off another vehicle component, such as sending a body control module a VDM including a control instruction to turn a horn on or off, sending an instrument panel cluster (IPC) a VDM including a control instruction to turn a malfunction indicator lamp on or off, sending an engine control module a VDM including a control instruction to turn a fuel injector off, or sending an engine control module a VDM including a control instruction to turn a fuel pump on, such as may be performed in order to prime a fuel system on the vehicle. As another example, controlling a vehicle component can include the VCT 76 sending a vehicle component a VDM with a control instruction to set the component to operate at a particular value, such as sending an IPC a VDM including a control instruction indicating a fuel level to be indicated by a fuel gauge should be set to a particular fuel level, such as 0%, 25%, 50%, 75% or 100%. As yet another example, controlling a vehicle component for a scanner job including replacing a fuel pump on the identified vehicle can include the VCT 76 sending a vehicle component a VDM with a control instruction to release the fuel pressure in a fuel line in the identified vehicle. As still yet another example, controlling a vehicle component for a scanner job including servicing the electronic parking brake of the vehicle can include the VCT 76 sending a vehicle component a VDM with a control instruction to release the brake caliper(s) on the identified vehicle.

As still yet another example, controlling a vehicle component can include sending a vehicle component a VDM with a control instruction to initialize a software program in the vehicle component. For instance, the software program can include a software program for performing an OBD II vehicle monitor. The control instruction can include a parameter identifier, and a parameter value that initializes the software program. For example, the parameter identifier can identify a timer for a particular vehicle system, such as an evaporative emission control system, and the parameter value can be a value that indicates a timer for testing a vehicle monitor regarding the evaporative emission control system is at an end value at which the vehicle monitor begins its monitoring of the evaporative emission control system. Use of this control instruction can increase efficiency of the technician because the technician does not have to wait for the timer to count from a starting value to the end value.

As still yet another example, controlling a vehicle component can include sending the vehicle component a VDM as part of a test script that causes the VCT 76 to transmit multiple VDM to one or more vehicle components. As an example, the multiple VDM can include VDM to control multiple fuel injectors in a particular sequence. As another example, the multiple VDM can include VDM to turn exterior lights of the vehicle on and off for performing at least a portion of a vehicle inspection. Execution of a test script that includes sending multiple VDM allows a technician to send the multiple VDM without having to select a USC for each of the multiple VDM to be sent. Accordingly, in accordance with this implementation, the diagnostic tool can be operated to send multiple VDM using fewer USC selections.

A scan tool function associated with the program category can include a scan tool function configured to program a vehicle component within the identified vehicle. Programming a vehicle component can include adding a computer program into a memory of the vehicle component. In many instances, programming the vehicle component includes replacing an existing computer program currently stored in the memory of the vehicle component with a different (e.g., new) computer program. Programming the vehicle by replacing an existing computer program is sometimes referred to as "reprogramming" the vehicle.

In an example implementation, a scan tool function to program a vehicle can include performing a block transfer of data from the diagnostic tool 70 to the vehicle component. For instance, according to the SAE® J2910 specification for enhanced E/E diagnostic test modes, the programming function can include transmitting a block transfer request message followed by one or more block transfer messages. The block transfer request message can include a message format byte, a target address of a vehicle component, an address of the diagnostic tool 70, a message identifier (e.g., $36 indicating a block transfer), a transfer type byte (e.g., a transfer to RAM, a transfer to EEPROM, a calibration), multiple bytes indicating a length of the block transfer, multiple bytes of a starting address at which the block transfer storage is to begin, and a checksum byte(s). Each block transfer message can include a header byte(s), a transfer type byte, a block transfer message length, a multi-byte address, multiple bytes of data to be transferred to memory of the vehicle component starting at the multi-byte address, and a checksum. In another example implementation, a scan tool function to program a vehicle can include generating an application programming interface (API) configured for programming a vehicle component, such as a PCM ECU, according to the SAE® J2534 interface standard.

A scan tool function associated with the reset category can include a scan tool function configured to reset a vehicle component within the identified vehicle. A function configured to reset a vehicle component can include a function to set a value in the memory of a component for the first time. The scan tool function to reset a vehicle component can include the VCT 76 transmitting a VDM to the vehicle component to cause the vehicle component to reset a value in the memory of that component. As an example, resetting the value in the memory can include a default reset value, an OEM factory value, a baseline value, a prior value programmed into a vehicle component being replaced, or some other value.

In a particular example, the value reset by a scan tool function can include a value of a block learn multiplier in an ECM, such that the block learn multiplier is a mid-point between $00 and $FF, such as $80. In another particular example, the value reset by a scan tool function can include an engine oil life value, such that an engine oil life value can be reset to 100% after an engine oil change has been performed. In an example implementation, a scan tool function in the reset category can include sending a VDM to request a vehicle component reset, such as a VDM configured as an SAE® J2190 mode $11 (request module reset) VDM.

The scanner jobs 85 include data regarding scanner jobs that can be performed to the identified vehicle. As an example, performing a scanner job can include performing a scan tool function among the scan tool functions 83. As another example, performing a scanner job can include performing a non-scan tool function, but does not require performing a scan tool function. As yet another example, performing a scanner job can include performing a scan tool function and a non-scan tool function. A scanner job stored in the memory 80 can include one or more of the following: a vehicle identifier, a scanner job identifier (or more simply "job identifier"), a scan tool function identifier (or more simply "function identifier"), a system service identifier, a target tag, and/or a scan tool function category (or more simply "function category"). A system service identifier can include data indicating a system on the identified vehicle that is to be serviced via an associated scan tool function. A target tag can include data indicating whether a target, such as an alignment target, is required to perform the scanner job.

A scanner job identifier includes data indicative of a scanner job. As an example, a scanner job identifier can include a descriptive textual name (e.g., replace brake caliper) for displaying on a display. For instance, the processor 72 can populate a USC of a U/I screen with the descriptive textual name of the scanner job. As another example, a scanner job identifier can include a non-descriptive identifier of the scanner job (e.g., a memory address) for accessing the scanner job from the memory 80. Any memory address discussed in this description can, but need not necessarily, include a hexadecimal memory address. The descriptive textual name of a scanner job can be associated with the non-descriptive identifier of the scanner job. A search of the memory 80 based on a descriptive textual name can be used to determine the memory address for accessing the scanner job from the memory 80.

A scan tool function identifier can include data indicative of a scan tool function within the scan tool functions 83. As an example, a scan tool function identifier can include a descriptive textual name (e.g., park brake cable service release) for displaying on a display. For instance, the processor 72 can populate a USC of a U/I screen with the descriptive textual name of the scan tool function. As another example, a scan tool function identifier can include a non-descriptive identifier of the scan tool function (e.g., a memory address) for accessing the scan tool function from the memory 80. The descriptive textual name of a scan tool function can be associated with the non-descriptive identifier of the scan tool function. A search of the memory 80 based on a descriptive textual name can be used to determine the memory address for accessing the scan tool function from the memory 80.

A system service identifier can include data indicative of a vehicle system and/or a vehicle component. As an example, a system service identifier can include a descriptive textual name (e.g., parking brake control system or parking brake control module) for displaying on a display. For instance, the processor 72 can populate a U/I screen with the descriptive textual name of the vehicle system and/or a vehicle component. The descriptive textual name of a vehicle system and/or a vehicle component can be associated with the non-descriptive identifier of the scanner job. A search of the memory 80 based on a descriptive textual name of the vehicle system and/or the vehicle component can be used to determine the memory address for accessing the scanner job from the memory 80. A web-service and/or content provided as part of performing a web-service provided by the server 16 can include a descriptive and/or non-descriptive identifier of the scanner job. The processor 72 can locate the scanner job referenced in and/or by performing the web-service within the scanner jobs 85.

For a scanner job requiring performance of multiple scan tool functions, the scanner job can include data indicative of an order in which the multiple scan tool functions are to be performed starting with an initial scan tool function to be performed and a final scan tool function to be performed. The data can further indicate an order of scan tool functions to be performed after the initial scan tool function but prior to the final scan tool function.

The guidance 87 can include guidance (regarding a vehicle) stored in the memory 80 prior to the vehicle being identified using the diagnostic tool. 70. Alternatively, the guidance 87 can include guidance (regarding the vehicle) the diagnostic tool 70 requests and receives from the server 16 after the vehicle is identified using the diagnostic tool 70.

The guidance 87 can include guidance regarding an identified vehicle and a scanner job. The guidance regarding the scanner job can include guidance regarding a scan tool function. As an example, the scanner job can be for calibrating a camera of a park assist system. The guidance regarding that scanner job can include information regarding placement of targets for calibrating the camera and/or information on interpreting data the diagnostic tool 70 determines from VDM transmitted by the vehicle regarding calibrating the camera. As an example, the guidance 87 can include information indicating top repairs made to other vehicles that are the same type of vehicle as the identified vehicle. The top repair information can include a graph showing commonly replaced parts. As another example, the guidance 87 can include repair information, such as removal and replacement procedure information regarding a component on the vehicle.

The guidance 87 can include different forms of content. For example, the guidance 87 can include guidance stored as textual file, such as an XML file including textual guidance. As another example, the guidance 87 can include an image file. As yet another example, the guidance 87 can include a video file. As yet another example, the guidance 87 can include a link, such as a uniform resource locator identifying a location on the World Wide Web, to other guidance that can be retrieved from a device associated with the link.

The guidance 87 can include OEM content (e.g., content prepared by and/or on behalf of a manufacturer of the identified vehicle or a vehicle component) and/or aftermarket content (e.g., content prepared by and/or on behalf of person or entity other than a vehicle manufacturer or a vehicle component manufacturer). As an example, OEM guidance can include a TSB from a manufacturer of the identified vehicle.

The U/I screens 89 include data for outputting a U/I screen on the display 84. In an example implementation, the U/I screens 89 include a static web page received form the server 16. In another example implementation, the U/I screens 89 include a dynamic web page generated by the server 16 and/or the processor 72. As an example, the dynamic web page may include a web page updated to include revised guidance, such a new set of top repairs and/or a new set of TSBs. In accordance with some implementations, a U/I screen includes an HTML file.

In yet another example implementation, the U/I screens 89 can include a template for the processor 72 to use to generate a U/I screen displayable on the display 84. As an example, a template for generating a U/I screen can include a quantity of USCs, such as one, two, three, four, five or some other number of USCs. The processor 72 can populate some USC(s) with data indicative of a respective scan tool function to be associated with the USC(s). The processor 72 can populate other USCs with data indicative selections to be communicated to the server 16 in response to the processor 72 determining the USCs have been selected. As another example, a template for generating a U/I screen can include a number of display cards the processor 72 can populate with data indicative of guidance and/or USCs information. The templates can include data indicating locations on the display where to display the USCs. The processor 72 can use the location data to determine which USC is selected when the touch screen display is touched.

In general, the CRPI 81 can include program instructions to perform functions described in this description as being performed by the diagnostic tool 10, 70 or a component of the diagnostic tool 10, 70. For example, the CRPI 81 can include program instructions to perform one or more or all of the functions of the set of functions 280 shown in FIG. 9 and/or one or more or all of the functions of the set of functions 290 shown in FIG. 10. As another example, the CRPI 81 can include program instructions to receive a U/I screen from the server 16, display the U/I screen on the display 84, determine a USC displayed as part of the display screen is selected, and transmit to the server 16 a communication indicating which USC of the U/I screen was selected.

In at least some implementations, the CRPI 81 can include program instructions executable by the processor 72 to determine a USC has been selected and a function to perform in response to the USC being selected. In at least some of those implementations, the processor 72 can determine a particular portion of the display 84, configured as a touch screen display, is being touched and refer to the U/I screens 89 to determine a USC that is displayed on the particular portion of the display 84. Moreover, the processor 72 can determine from the U/I screens 89 the function to perform in response the display 84 being touched at the particular portion of the display 84. Furthermore, in at least some implementations, the function to be performed can include a scan tool function and the processor 72 can determine a pointer to that scan tool function within the scan tool functions 83 and execute program instructions to execute the scan tool function pointed to by that pointer.

Figure 4B:
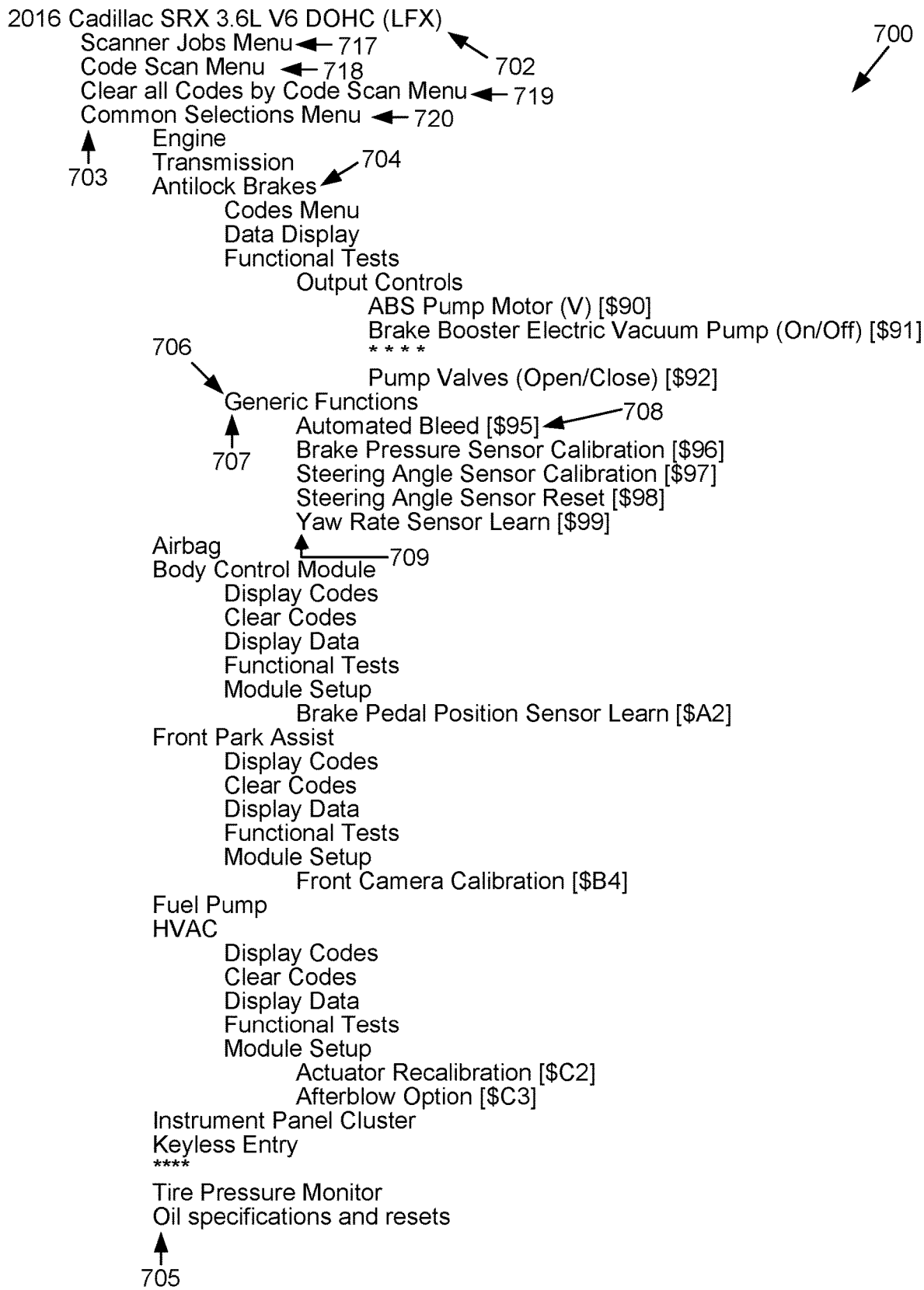
Figure 4C:
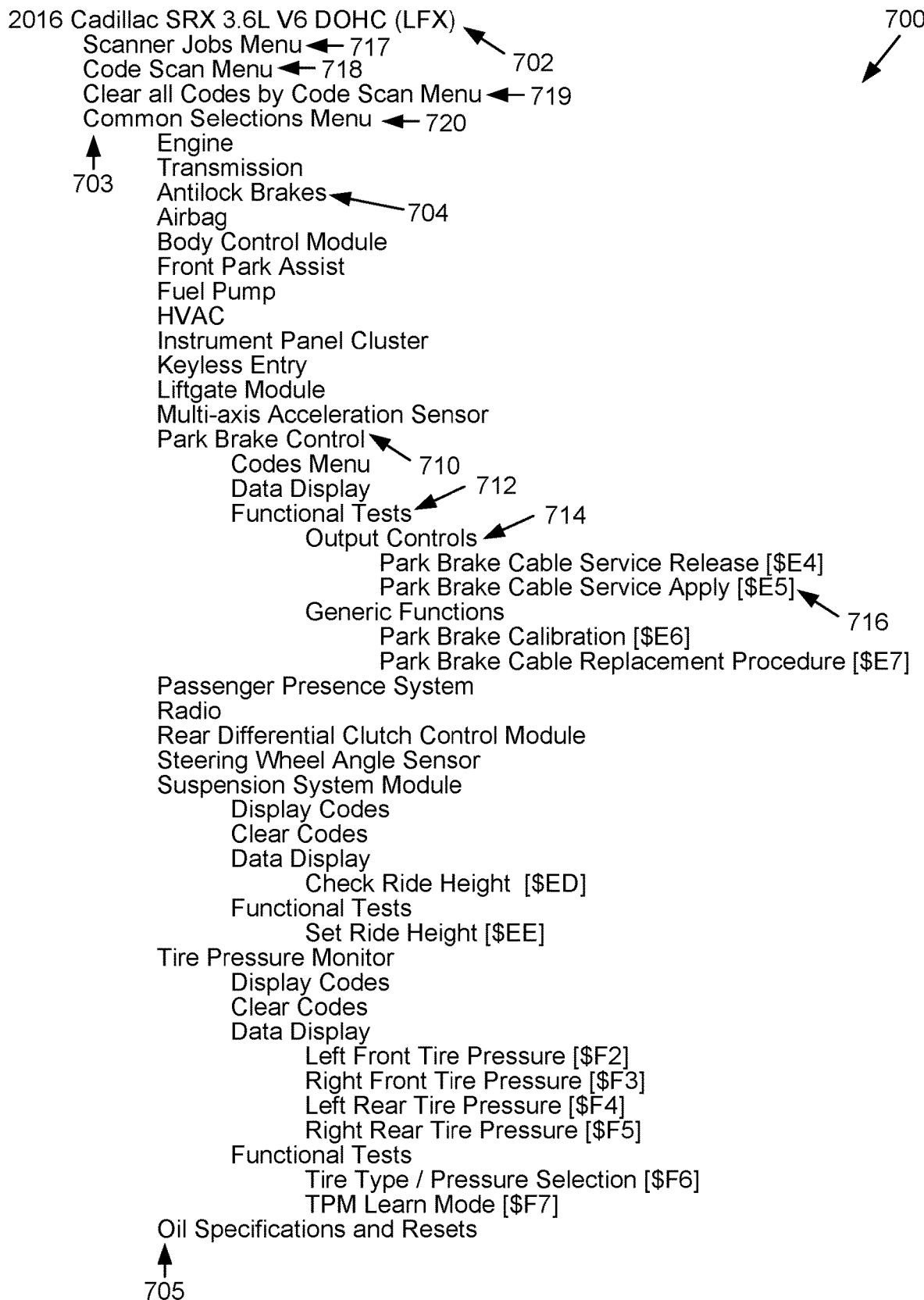

Next, FIG. 4A, FIG. 4B, and FIG. 4C show a menu arrangement 700 including multiple menus and multiple levels of menus. The processor 72 can output display U/I screens including a menu based on the menu arrangement 700. Some of the menus include USCs and/or are associated with scan tool function(s) for the identified vehicle represented by a vehicle identifier 702. Indentation is used to illustrate different levels of the menus. The symbols "* * * *" within FIG. 4A and FIG. 4B indicate that other one or more other menu items can be within the menu level including those symbols. The menu arrangement 700 is for a vehicle indicated by the vehicle indicator 314 shown in FIG. 16. A menu arrangement for a different identified vehicle can be identical to the menu arrangement 700, include at least one menu similar to a menu in then menu arrangement 700, and/or include at least one menu different from the menus in the menu arrangement 700.

The menu arrangement 700 includes a top level menu 703 including a scanner jobs menu 717, a code scan menu 718, a clear all codes by code scan 719, and a common selections menu 720. The common selections menu 720 include a menu level 705 from which a system of the identified vehicle can be selected. As shown in FIG. 4A to FIG. 4C, the menu level 705 can include common selections such as: engine, transmission, antilock brakes, airbag, body control module, front park assist, fuel pump, HVAC, instrument panel cluster, keyless entry, liftgate module, multi-axis acceleration sensor, park brake control, passenger presence system, radio, rear differential clutch control module, steering wheel angle sensor, tire pressure monitor, and oil specifications and resets. The scanner jobs menu 717 can include USCs for the ten scanner jobs shown in FIG. 5.

FIG. 4A to FIG. 4C show scan tool functions that can be selected from the menus of the menu arrangement 700. The hexadecimal numbers within square brackets represent example memory addresses associated with the scan tool function. For simplicity those memory addresses are shown as two byte addresses, some of which are sequential. A person skilled in the art will understand that the memory addresses associated with a scan tool function within the menu arrangement 700 can be more than two bytes and/or not sequential. In an example implementation, a memory address associated with a scan tool function can indicate a memory address from which the scan tool function can be called or a pointer to the memory address from which the scan tool function can be called.

Based on the menu arrangement 700, a person having ordinary skill in the art will understand that in order to select the scan tool functions Automated Bleed scan tool function (shown in FIG. 4B) at memory address $95 followed by the Park Brake Cable Service Apply scan tool function (shown in FIG. 4C) at memory address $E5, after identifying the vehicle identified by the vehicle identifier 702, would include: (1) selecting an Antilock Brake system selection 704 within the menu level 705, (2) selecting a Generic Functions selection 706 within a menu level 707 showing selections for a codes menu, data display, functional tests, and generic functions, (3) selecting an Automated Bleed selection 708 from a menu level 709 including selections for scan tool functions associated with memory addresses $95 to $99, (4) exiting the Automated Bleed selection 708 to return to the menu level 707, (5) exiting the menu level 707 to return to the menu level 705 including the Antilock Brake system selection 704 and the Park Brake Control system selection 710, (6) selecting the Park Brake Control system selection 710, (7) selecting the functional tests selection 712, (8) selecting the output controls selection 714, and (9) selecting the Park Brake Cable Service Apply scan tool function selection 716.

In many instances, technicians are not aware of which menu and/or menu level includes a USC for a particular scan tool function. In those instances, the technician may need to navigate the menu arrangement 700 using one or more selections to enter and exit a menu level not including the USC for the particular scan tool function before locating the menu and menu level including a USC for the particular scan tool function selector when searching for the particular scan tool function selector based on vehicle systems.

FIG. 5 shows a table 100 of example data that can part of the scanner jobs 85. The table 100 includes data regarding ten different scanner jobs for an example vehicle referred to as a 2016 CADILLAC® SRX having a 3.6 L V6 engine. Based on table 100, the vehicle identifier includes year, make, model, and engine identifiers. The scanner jobs in the table 100 are distinguished in part by having different scanner job identifiers. The table 100 indicates whether each scanner job is associated with a scan tool function and whether a target is required to perform the scanner job. The table 100 further indicates two memory addresses in each row. As an example, the memory addresses in each row can include an address that is a non-descriptive identifier of a respective scan tool function and an address associated with guidance pertaining to that scan tool function.

The processor 72 can identify a vehicle and then refer to the scanner jobs 85 to determine which scanner jobs are associated with the identified vehicle, such as the vehicle identified in the table 100. The processor 72 can output a U/I screen (such as a U/I screen 440 shown in FIG. 17) showing USCs for selecting a scanner job to be performed.

Table 100 shows that a scanner job, such as the replace brake caliper job, can include scan tool functions for multiple systems (e.g., the parking brake control system and the antilock brake system). Table 100 also shows that a scanner job, such as a replace throttle body job, can include scan tool functions for a single system (e.g., an engine system). Table 100 also shows that two scanner jobs, such as replace brake caliper and replace disc brakes can include identical scan tool function, but refer to different memory addresses for guidance pertaining to a common scan tool function.

FIG. 6 shows a table 102 of example data that can part of the scanner jobs 85. The table 102 includes data regarding five different scanner jobs for an example vehicle referred to as a 2014 Chevrolet Tahoe having a 5.3 L V8 engine and four-wheel drive (4WD) power transfer capability. The scanner jobs in the table 102 are distinguished in part by having different scanner job identifiers. The table 102 indicates whether each scanner job is associated with a scan tool function and whether a target is required to perform the scanner job. The table 102 further indicates two memory addresses in each row. As an example, the memory addresses in each row can include an address that is a non-descriptive identifier of a respective scan tool function and an address associated with guidance pertaining to that scan tool function.

FIG. 7 shows a table 104 of example data that can part of the scanner jobs 85. The table 104 includes data regarding six different scanner jobs for an example vehicle referred to as a 2014 Chevrolet Tahoe having a 5.3 L V8 engine and two-wheel drive (2WD) power transfer capability. The scanner jobs in the table 104 are distinguished in part by having different scanner job identifiers. The table 104 indicates whether each scanner job is associated with a scan tool function and whether a target is required to perform the scanner job. The table 104 further indicates one or more memory addresses in each row. As an example, the memory addresses in each row having two addresses can include an address that is a non-descriptive identifier of a respective scan tool function and an address associated with guidance pertaining to that scan tool function.

The bottom row in the table 104 shows an engine oil change scanner job that does not require a scan tool function. For this job, the table 104 shows a single memory address which can indicate an address in the memory where guidance for that scanner job can be obtained.

The vehicles listed in the tables 102, 104 are the same year, make, model, and engine, but have different power transfer capabilities as the vehicle listed in the table 102 has 4WD which includes 2WD, whereas the vehicle listed in the table 104 has only 2WD power transfer capability. Referring to the tables 102, 104, the addresses associated with the replace brake caliper, the replace brake pedal position sensor, the replace crankshaft position sensor, and the replace throttle body scanner jobs are the same to indicate the same scanner job can be used for different types of identified vehicles. A scanner job can include a non-descriptive identifier and/or a descriptive identifier for each scan tool function associated with the scanner job, and a scanner job can be associated with one or more scan tool functions.

7. Example Implementations

In accordance with the example implementations, the diagnostic tool 70 shown in FIG. 3A can be arranged as an integrated diagnostic tool or a distributed diagnostic tool. As an example, an integrated diagnostic tool can include a single housing to enclose and/or support all other components of the diagnostic tool, such as all other components shown in FIG. 3A. As another example, a distributed diagnostic tool can include multiple housings where each housing encloses and/or supports some but not all other components of the diagnostic tool, such as some but not all other components shown in FIG. 3A.

FIG. 3B shows example implementations of the diagnostic tool 70. As an example, the diagnostic tool 70 can include and/or be arranged as a tablet device 110. The tablet device 110 can, but need not necessarily, include an IPAD® tablet device from Apple Inc. of Cupertino, Calif. or a SAMSUNG GALAXY TAB tablet device from Samsung Electronics Co., Ltd. of Maetan-Dong, Yeongtong-Gu Suwon-Si, Gyeonggi-Do, Republic of Korea. As another example, the diagnostic tool 70 can include and/or be arranged as a smartphone 112 (e.g., an IPHONE® smartphone from Apple Inc., or a GALAXY S® smartphone from Samsung Electronics Co., Ltd.). In accordance with the foregoing example implementations, at least a portion of the computer-readable data stored in the memory can be include computer-readable data downloaded to the network transceiver 74 from the APP STORE® online retail store, from the GOOGLE PLAY® online retail store, or another source of the applications or computer-readable data. In accordance with at least some of the foregoing implementations, the tablet device or smart phone can be programmed to include one or more applications for executing a CRPI to perform a function described in this description and/or to display a U/I screen in accordance with the example implementations described in this description.

As another example, the diagnostic tool 70 can include and/or be arranged as a laptop computing system 114, such as the Dell® Chromebook 3380 laptop computing system available from the Dell Computer Corporation, Austin, Tex., or some other laptop computing system. The laptop computing system 114 can include a display 140 to display a U/I screen, such as an example U/I screen described in this description. The laptop computing system 114 can include a keyboard 142, such as a QWERTY keyboard, to enter search criteria and/or a selection of a USC displayed on the display 140.

As yet another example, the diagnostic tool 70 can include and/or be arranged as a desktop computing system 116, such as the an OptiPlex® 9020 Mini Tower desktop computing system available from the Dell Computer Corporation, or some other desktop computing system. The desktop computing system 116 can include a display 118 to display a U/I screen, such as an example U/I screen described in this description. The desktop computing system 116 can include a keyboard 122, such as a QWERTY keyboard, to enter search criteria and/or a selection of a USC displayed on the display 118. The desktop computing system 116 can include a pointing device 124, such as a wired or wireless computer mouse.

FIG. 3B also shows example implementations of portions of a diagnostic tool and/or a device connectable to a diagnostic tool. For example, FIG. 3B shows vehicle-to-tool link 126 and vehicle-to-tool link device 134. The vehicle-to-tool link 18 shown in FIG. 1 can be arranged and/or include one of the vehicle-to-tool link 126 or the wireless vehicle-to-tool link device 134.

The vehicle-to-tool link 126 includes a connector 128, a harness 130, and a DLC 132. The connector 128 can include a USB connector configured to connector to a USB port, a DB9 connectable to a port, such as a serial port arranged according to the EIA/TIA 232 serial interface standard, or some other connector. In some implementations, the tablet device 110, the smartphone 112, the laptop computing system 114, and/or the desktop computing system 116 can include a port arranged to connect to the connector 128.

The vehicle-to-tool link device 134 includes a network transceiver to communicate wirelessly with the network transceiver 74. The vehicle-to-tool link device 134 can include a connector that meets the SAE® J1939_13 standard and/or that is configured to connect to a J1939 vehicle connector of a DLC. The vehicle-to-tool link device 134 can include a connector that meets the SAE® J1962 standard and/or that is configured to connect to vehicle connector of a DLC in compliance with the SAE® J1962 standard. In some implementations, the tablet device 110, the smartphone 112, the laptop computing system 114, and/or the desktop computing system 116 can include the network transceiver 74 in a configuration for communicating wirelessly with a network transceiver of the vehicle-to-tool link device 134.

Figure 3C:
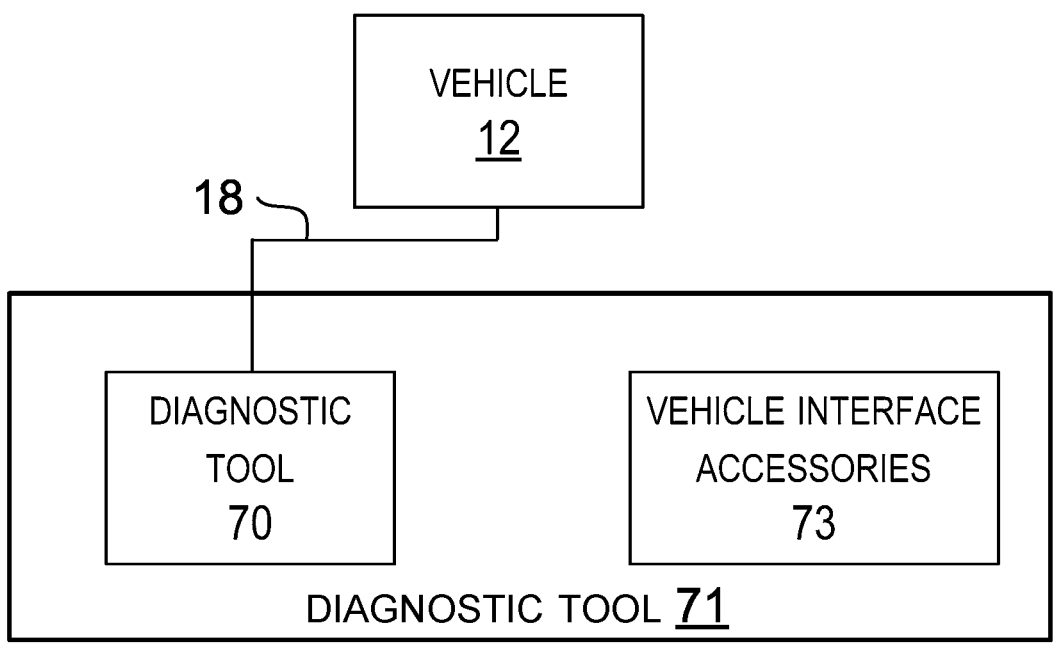
FIG. 3C is a block diagram of a diagnostic tool in accordance with example implementations.

Next, FIG. 3C shows a diagnostic tool 71 that includes the diagnostic tool 70 and vehicle interface accessories 73. According to an example implementation, the diagnostic tool 71 includes the vehicle interface accessories 73 and one or more of: the processor 72, the network transceiver 74, the VCT 76, the user interface 78, the memory 80, the display 84, and/or the power supply 86. The vehicle interface accessories 73 include one or more vehicle interface accessories. The vehicle interface accessories 73 can include a display configured to display a U/I screen, such as a U/I screen including one or more USCs selectable to perform a scan tool function using the diagnostic tool 70. The components of the diagnostic tool 70 that form a portion of the diagnostic tool 71 can be arranged as a distributed diagnostic tool or an integrated diagnostic tool.

In a first particular example implementation, the diagnostic tool 71 is arranged as a wheel alignment machine arranged to make measurements for guiding a technician while performing a wheel alignment scanner job to the vehicle 12 or more simply, a wheel alignment. In accordance with this implementation, the vehicle interface accessories 73 can include detectors, clamps with alignment sensors, rotating plates, cameras, a steering wheel holder, and/or a brake pedal depressor. A display of the diagnostic tool 71 can be configured to display a U/I screen, such as U/I screen having USCs selectable to cause the diagnostic tool 70 to perform a scan tool function pertaining to the wheel alignment. As an example, the scan tool function can include a scan tool function to check the air pressure in a tire or to set a ride-height of the vehicle 12.

In a second particular example implementation, the diagnostic tool 71 is arranged as an air conditioning refrigerant recovery, recycling, and recharging machine for guiding a technician while performing an air conditioning system scanner job on the vehicle 12. In accordance with this implementation, the vehicle interface accessories 73 can include a vacuum pump, a scale, gauges, a compressor, a refrigerant tank, air conditioning system hoses and fittings, a refrigerant leak detector, and/or a refrigerant oil tank. A display of the diagnostic tool 71 can be configured to display a U/I screen, such as U/I screen having USCs selectable to cause the diagnostic tool 70 to perform a scan tool function pertaining to the air conditioning system scanner job. As an example, the scan tool function can include a scan tool function to request and display PID parameter values indicative of a pressure within an air conditioning system, such as a high-side pressure and/or a low-side pressure, or a scan tool function to control a compressor within the air conditioning system on or off.

In a third particular example implementation, the diagnostic tool 71 is arranged as a battery charger and/or a battery tester. The battery charger and/or tester can be used to perform a scanner job that includes testing and/or charging a vehicle battery. In accordance with this implementation, the vehicle interface accessories 73 can include cables and cable ends configured for connecting to terminals of a vehicle battery. As an example, the cable ends can include clamps. Furthermore, the vehicle interface accessories 73 can include a display to display a U/I screen having USCs selectable to cause the diagnostic tool 70 to perform a scan tool function pertaining to the vehicle battery, such as a scan tool function to register a new battery, reset a vehicle battery, display a history of the vehicle battery, and/or display PID parameter values pertaining to the vehicle battery, such as a parameter value associated with a battery voltage and/or a parameter value associated with a battery temperature.

Returning to FIG. 1, as indicated above, the diagnostic tool 70 can operate in any system shown in FIG. 1 in place of the diagnostic tool 10. Accordingly, the diagnostic tool 70 can operate in the systems 2, 4 without a server and in the systems 6, 8 with a server. In at least some of the implementations in which the diagnostic tool 70 operates in a system without a server or within a system including a server, the memory 80 can contain the U/I screens and guidance described in this description and perform a scan tool function of a scanner job without needing a server to perform a web-service to provide any portion of the U/I screen, the guidance, and/or the scan tool function. In at least some of the implementations in which the diagnostic tool operates in a system with a server, such as the server 16, 150, the processor 72 can request, from the server, at least a portion of the U/I screen and/or the guidance pertaining to a scan tool function needed to perform a scanner job. The server 16, 150 can execute CRPI 151 to perform a web-service that includes transmitting to the diagnostic tool 70 at least the portion of the U/I screen and/or the guidance needed to perform a scanner job. The diagnostic tool 70 can contain at least the portion of the U/I screen and/or the guidance needed to perform a scanner job in a buffer of the memory 80.

8. Additional Features

In an example implementation, the CRPI 81 can include instructions executable by the processor 72 to determine a USC pertaining to a scanner job that has been selected, transmit a VDM to the identified vehicle to solicit a response from a component of a system in the identified vehicle, and make a determination that the diagnostic tool received, in response to the VDM, a response from the component of the system in the identified vehicle. Displaying a user-interface screen including a USC to select a scanner job and/or a scan tool function pertaining to the component of the system can be conditioned on the processor 72 making the determination that the diagnostic tool received the response from the component of the system in the identified vehicle. For purposes of this description, these program instructions are referred to as first example CRPI.

In some cases, the vehicles represented by a vehicle identifier can include vehicles having different combinations of vehicle components (e.g., different combinations of ECU). As an example and with reference to a system service ID column in FIG. 5, a first combination of vehicle components in a first subset of the vehicles identified as a 2016 CADILLAC® SRX 3.6 L V6 (LFX) can include a parking brake control module, an antilock brake module, an HVAC module, a body control module, an engine control module, a front park assist module, and a steering control module. In contrast, a second combination of vehicle components in a second subset (different than the first subset) of the vehicles identified as a 2016 CADILLAC® SRX 3.6 L V6 (LFX) can include all of the aforementioned components in the first subset except for the HVAC module.

Figure 15:
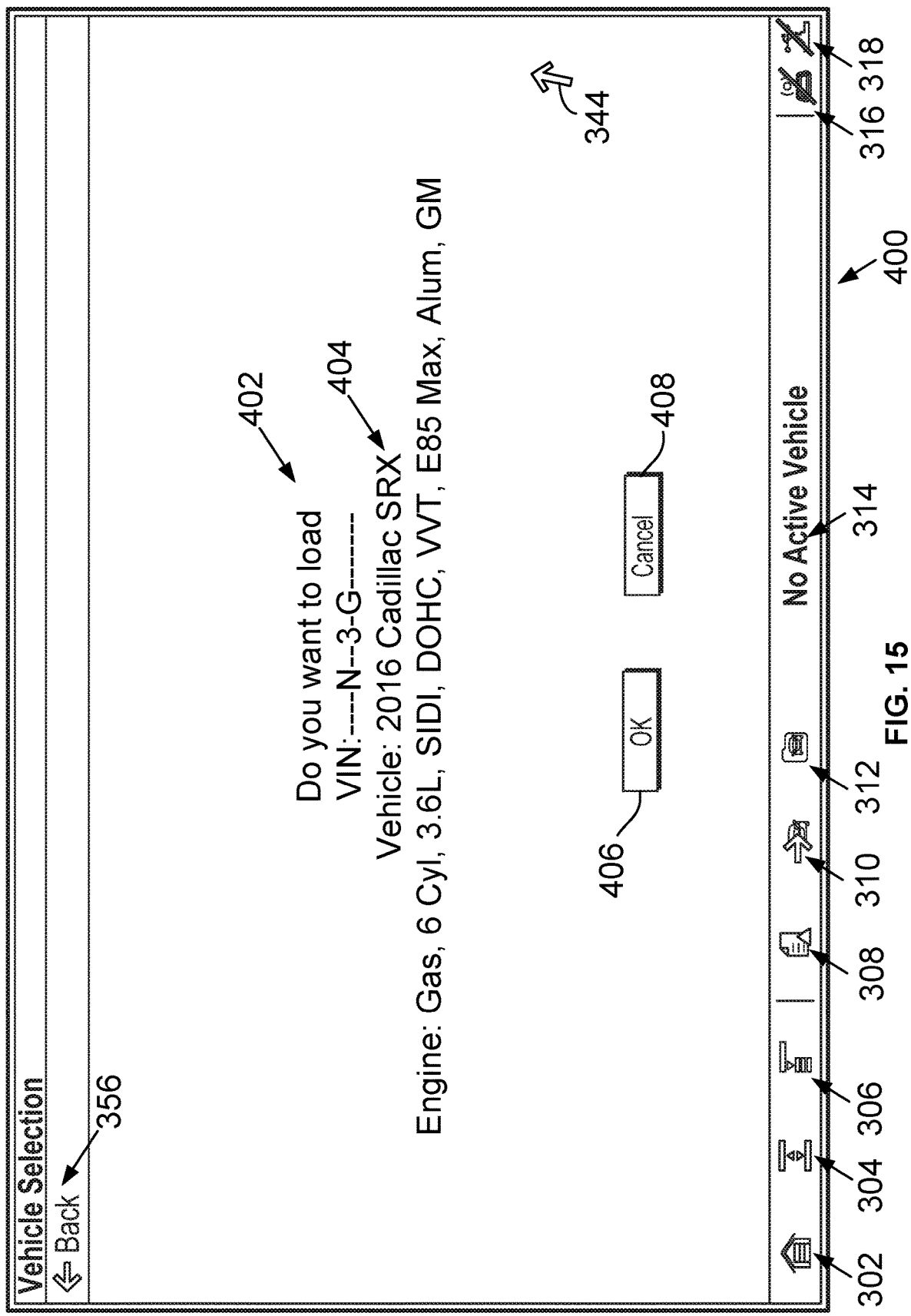

In an example implementation, the processor 72 can execute the first example CRPI in response to and/or after determining a continue USC 406 was selected from the U/I screen 400 (shown in FIG. 15). Regardless of whether the identified vehicle connected to the diagnostic tool 70 is a vehicle in the first or second subset of vehicles identified as a 2016 CADILLAC® SRX 3.6 L V6 (LFX), the processor 72 can transmit one or more VDMs including a request to solicit a response from the parking brake control module, the antilock brake module, the HVAC module, the body control module, the engine control module, the front park assist module, and the steering control module.

Assuming all components of the first or second combination of vehicle components in the identified vehicle responds to the one or more VDMs, the processor 72 can determine that a vehicle of the second subset of vehicles is connected to the diagnostic tool 70 does not include an HVAC module. Since the processor 72 determines the identifier vehicle does not include an HVAC module, the processor 72 can determine that the quantity of scanner jobs available to perform on the identified vehicle is nine rather than ten as shown by the scanner job quantity indicator 426 in FIG. 16. In accordance with this example implementation, a U/I screen showing USCs for each scanner job in the identified vehicle can include the scanner job USC 444, 446, 448, 450, 454, 456, 458, 460, and 462, as shown in FIG. 17, without showing the scanner job USC 452 for replacing HVAC actuator since the processor 72 determined the identified vehicle does not include an HVAC module for performing the scan tool function for replacing the HVAC actuator. In a different implementation, the processor 72 can output the U/I screen showing the scanner job USC 452, but the scanner job USC 452 is not selectable if the identified vehicle does not include an HVAC module. In yet another implementation, the identified vehicle includes a module pertaining to a scanner job, but the module is inoperative with respect to responding to a message including a request soliciting a response from the module. In this implementation, the processor 72 can determine to omit a scanner job and/or scan tool function from a scanner job U/I screen since that scanner job and/or scan tool function cannot be performed if the module is not communicating with the diagnostic tool 70.

The first example CRPI can, but need not necessarily, determine whether or not the identified vehicle includes an HVAC module. The first example CRPI, and thus the CRPI 81, can include program instructions to determine whether an identified vehicle includes an operating vehicle component pertaining to a scanner job associated with the identified vehicle, determine a quantity of scanner jobs are available to be performed on the identified vehicle, determine which of the available scanner jobs are to be selectable via a USC on a U/I screen, and cause the display 84 to display a U/I screen with the USCs for the available scanner jobs. The quantity of available scanner jobs can include one or more scanner jobs. If none of the scanner jobs associated with the identified vehicle are available to be performed (e.g., because the identified vehicle does not include an operative vehicle component associated with the associated scanner jobs), the processor 72 can cause the display 84 to display a U/I screen showing that none of the associated scanner jobs are available to be performed on the identified vehicle.

IV. Example Server

Figure 8:
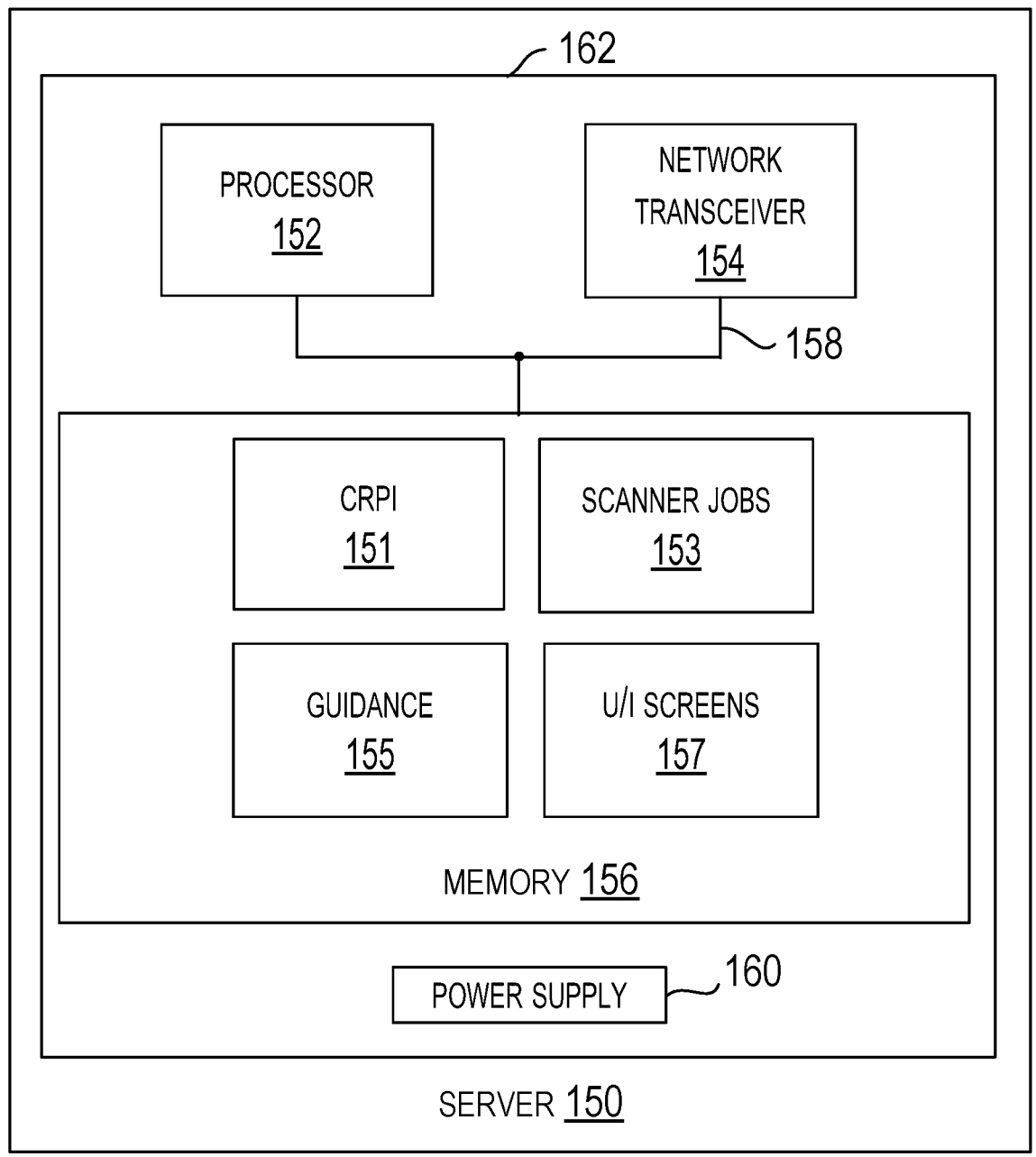
FIG. 8 is a block diagram of a server in accordance with example implementations.

FIG. 8 is a block diagram of a server 150, in accordance with an example implementation. Each instance of the server 16 shown in FIG. 1 can include and/or be configured like the server 150 or any portion(s) of the server 150. Furthermore, the server 150 can operate in any system shown in FIG. 1 showing the server 16 or some other system. As shown in FIG. 8, the server 150 includes a processor 152, a network transceiver 154, and a memory 156. Two or more of those components can be operatively coupled together via a system bus, network, or other connection mechanism 158. The server 150 also includes a power supply 160 and a housing 162.

The processor 152 can include one or more processors. The examples of a processor described above in the description with respect to the processor 72 are applicable to the processor 152. The processor 152 can be programmed to perform any function or combination of functions described herein as being performed by the server 16, 150.

The network transceiver 154 can include one or more transceivers. The examples of a transceiver described above in the description with respect to the network transceiver 74 are applicable to the network transceiver 154. The network transceiver 154 can transmit any data or communication discussed as being transmitted, output, or provided by the server 16, 150, such as a datum, web-service, and/or communication transmitted, output or provided to the diagnostic tool 10, 70. The network transceiver 154 can receive any data or communications discussed as being received by the server 16, 150, such a datum, web-service request, and/or communication the server 16, 150 and/or the network transceiver 154 receives from the communication network 14 and/or the diagnostic tool 10, 70.

The memory 156 can include one or more memories. The examples of a memory described above in the description with respect to the memory 80 are applicable to the memory 156. In that description, one of example memories is a hard drive. As an example, a hard drive of a server equipped with a hard drive can, but need not necessarily, include an IDE drive, an ATA drive, an SCSI hard drive, or a SATA hard drive.

The connection mechanism 158 can include any of a variety of conductions to carry communications or data between the components connected to the connection mechanism 158. As an example, the connection mechanism 158 can include a copper foil trace of a printed circuit board, a wire, or some other conductor.

The power supply 160 can be configured in any of a variety of configurations or combinations of the variety of configurations. As an example, the power supply 160 can include circuity to receive AC from an AC electrical supply and convert the AC to a DC for supplying to one or more of the components within the server 16, 150. As another example, the power supply 160 can include a battery or be battery operated. As yet another example, the power supply 160 can include a solar cell or be solar operated. The power supply 160 can include electrical circuits to distribute electrical current throughout the server 16, 150. Other examples of the power supply 160 are available.

The housing 162 can surround at least a portion of one or more of the processor 152, the network transceiver 154, the memory 156, the connection mechanism 158, and/or the power supply 160. The housing 162 can be referred to as an enclosure. The housing 162 can support a substrate. At least a portion of the processor 152, the network transceiver 154, the memory 156, and/or the connection mechanism 158 can be mounted on and/or connect to the substrate.

The memory 156 stores computer-readable data. As an example, the memory 156 contains one or more of the following: the CRPI 151, scanner jobs 153, guidance 155, and/or U/I screens 157.

In general, the CRPI 151 can include program instructions to perform functions described in this description as being performed by the server 16, 150 or a component of the server 16, 150.

The scanner jobs 153 include data regarding scanner jobs that can be performed on and/or to a vehicle. In some cases, a scanner job requires performance of a scan tool function. In some other cases, a scanner job requires performance of a non-scan tool function, but does not require performance of a scan tool function. In still other cases, a scanner job requires performance of a scan tool function and a non-scan tool function. A scanner job can include one or more of the following: a vehicle identifier, a scanner job identifier, a scan tool function identifier, a functional test system identifier, a target required tag, and/or a functional test label. A target required tag can indicate whether a target, such as an alignment target, is required to perform the scanner job. A functional test label can indicate a category of functional tests into which a scan tool function is categorized. As an example, a functional test label can indicate a reset category, a calibrate category, a control category, or a program category.

The CRPI 151 can include program instructions executable to receive, from the diagnostic tool 10, 70, a request including a vehicle identifier, determine one or more scanner jobs associated with the vehicle identifier, and provide to the diagnostic tool 10, 70, in response to the request, job identifier(s) indicative of the one or more scanner jobs. The response to the request can include any other content (associated with the identified vehicle) described as being part of a scanner job. In at least some implementations, the processor 152 can execute the CRPI 151 to determine the one or more scanner jobs by referring to data that maps scanner jobs to vehicle identifiers, such as the data shown in Table 100 in FIG. 5.

The guidance 155 can include OEM content (e.g., content prepared by and/or on behalf of a manufacturer of the identified vehicle or a vehicle component) and/or aftermarket content (e.g., content prepared by and/or on behalf of person or entity other than a vehicle manufacturer or a vehicle component manufacturer). Any examples of guidance discussed in this description can be contained in the guidance 155.

The guidance 155 can include guidance associated with a vehicle, a scanner job, and/or a scan tool function. The guidance associated with a vehicle identifier can, but need not necessarily, include a vehicle identifier associated with the vehicle. The guidance associated with a scanner job can, but need not necessarily, include a job identifier that identifies the scanner job. The guidance associated with the scan tool function, can but need not necessarily, include a function identifier that identifies a scan tool function.

The CRPI 151 can include program instructions executable to receive, from the diagnostic tool 10, 70, a request including a vehicle identifier, a job identifier, and/or a function identifier, determine guidance associated with the vehicle identifier, the job identifier, and/or the function identifier contained in the request, and provide, in response to the request, the guidance associated with the vehicle identifier, the job identifier, and/or the function identifier contained in the request.

The U/I screens 157 can include any U/I screen discussed in this description. The CRPI 151 can include program instructions executable to receive, from the diagnostic tool 10, 70, a request indicating a USC selected via a U/I screen displayed on the diagnostic tool 10, 70 and provide in response to the request a U/I screen based on the a USC indicated by the request. In at least some implementations, the U/I screens 157 include one or more files for outputting a U/I screen, such as any U/I screen shown in the figures. As an example, those one or more files can include an HTML file. In at least some implementations, the U/I screens 157 can include data indicating a U/I screen template and/or an indicator of a U/I screen template. In accordance with those implementations, the server 150 can output an indicator of a U/I screen template and data to populate a template associated with the indicator at the diagnostic tool 70.

V. Example Operation

1. First Example Operation

FIG. 9 shows a flowchart depicting a set of functions 280 (or more simply "the set 280") that can be carried out in accordance with the example implementations described in this description. The set 280 includes the functions shown in blocks labeled with whole numbers 281 through 284. The following description of the set 280 includes references to elements shown in other figures described in this description, but the functions of the set 280 are not limited to being carried out only by the referenced elements. A variety of methods can be performed using all of the functions shown in the set 280 or any proper subset of the functions shown in the set 280. Any of those methods can be performed with other functions such as one or more of the other functions described in this description. A processor can perform or cause a function of the set 280 to be performed. That processor can include one or more processors. The processor can include the processor 72.

At block 281, the method includes displaying, on a display, a first U/I screen including a USC including an indicator of a first scanner job performable on an identified vehicle. In at least some implementations, the display is operatively connected to one or more processors, and the one or more processors are operatively coupled to one or more computer-readable mediums. The computer-readable medium has stored thereon program instructions executable by the one or more processors to perform scan tool functions that include the one or more processors transmitting a VDM to an identified vehicle. The scan tool functions include a first scan tool function for a first system of the identified vehicle and a second scan tool function for a second system of the identified vehicle. The first system is different than the second system.

As an example, the first U/I screen can include and/or be arranged like the U/I screens 440, 490, 550, 640 shown in FIG. 17, FIG. 32, FIG. 38, FIG. 41, respectively. In some example implementations, the first U/I screen includes diagnostic information regarding the identified vehicle or other guidance, such as the U/I screens 670, 800 shown in FIG. 42, FIG. 43 that include guidance 674, 804, respectively.

At block 282, the method includes displaying a second U/I screen instead of the first U/I screen. This occurs in response to a selection of the USC including the indicator of the first scanner job. The second U/I screen includes a first USC including an indicator of the first scan tool function for the first system of the identified vehicle, and a second USC including an indicator of the second scan tool function for the second system of the identified vehicle.

In at least some example implementations, the first scanner job is associated with a search term. The method can include the one or more processors: (1) transmitting, to a server, a request for guidance regarding the first scanner job, (2) receiving, in response to the request, guidance regarding the first scanner job, and (3) displaying, on the display, the guidance regarding the first scanner job. The request can include the search term. As an example, the search term can include a vehicle identifier, a scanner job identifier, a scan tool function identifier, a functional test system identifier, a target required tag, and/or a functional test label.

In at least some example implementations, the second U/I screen includes guidance for performing a procedure of the first scanner job. The guidance can be stored in the memory 80. In one respect, the guidance can be stored locally in the memory 80 before the identified vehicle is identified. In another respect, the guidance can be stored locally in the memory 80 after receiving a response to a request for guidance, such as described in the preceding paragraph. In yet another respect, the guidance can be received as part of a web page including the second U/I screen.

At block 283, the method includes transmitting a first VDM to the identified vehicle, wherein the first VDM is addressed to a component of the first system of the identified vehicle. This occurs in response to a selection of the first USC from the second U/I screen.

At block 284, the method includes transmitting a second VDM to the identified vehicle, wherein the second VDM is addressed to a component of the second system of the identified vehicle. This occurs in response to a selection of the second USC from the second U/I screen.

In any of the example implementations based on the set 280, the scan tool functions can include a vehicle component reset function, a vehicle component calibration function, a vehicle component programming function, a vehicle component read DTC function, and/or a vehicle component clear DTC function.

In any of the example implementations based on the set 280, the display can include a touch screen display. The selection of a USC displayed on the display, such as the first USC and the second USC, respectively, can include a user contact of the touch screen display at or in proximity to that USC, such as the first USC and the second USC, respectively. The processor 72 can determine the occurrence of each selection of a USC.

In further example implementations based on the set 280, the method can also include displaying a third U/I screen. The follow six paragraphs describe such further example implementations.

Figure 20:
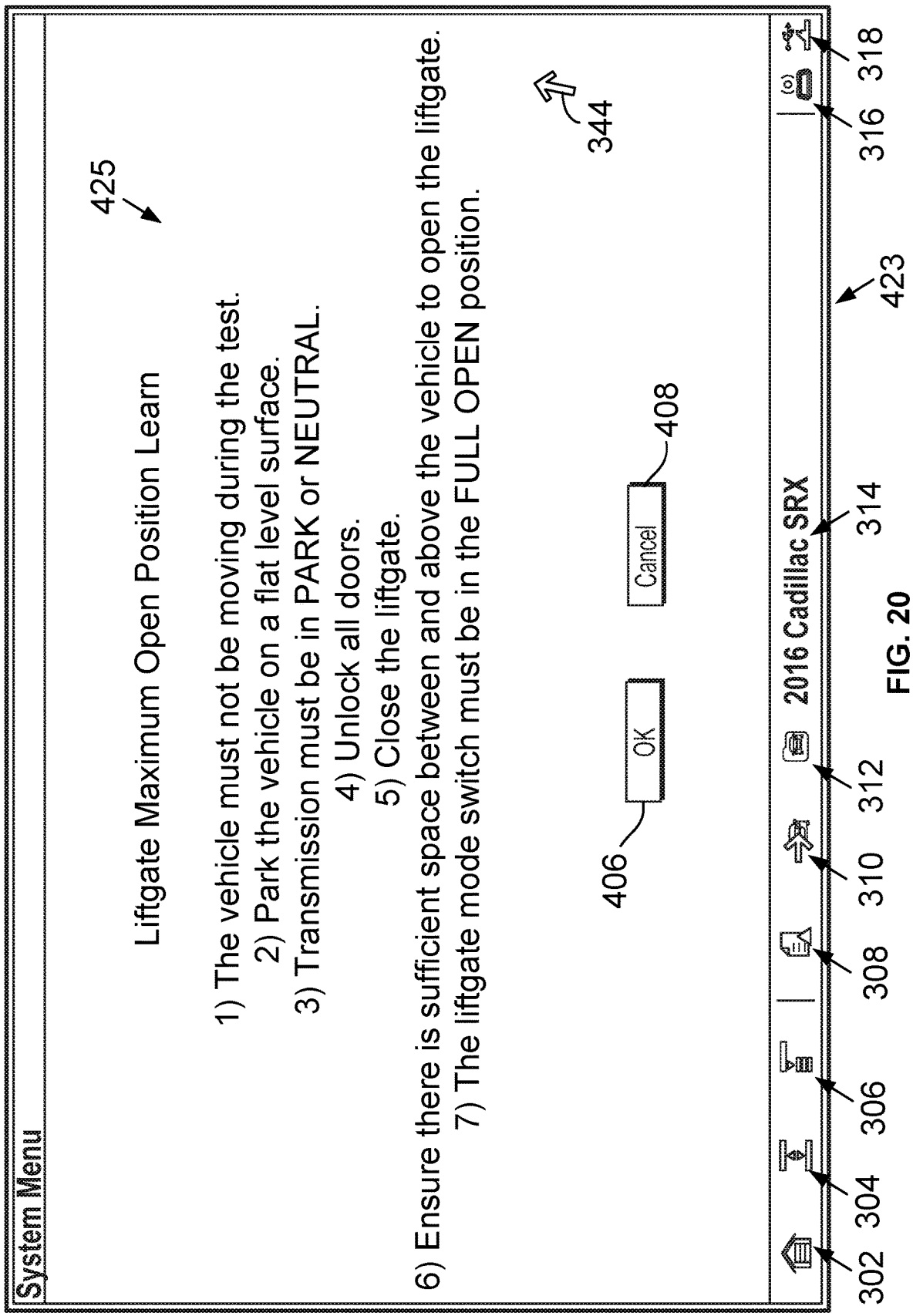
Figure 21:
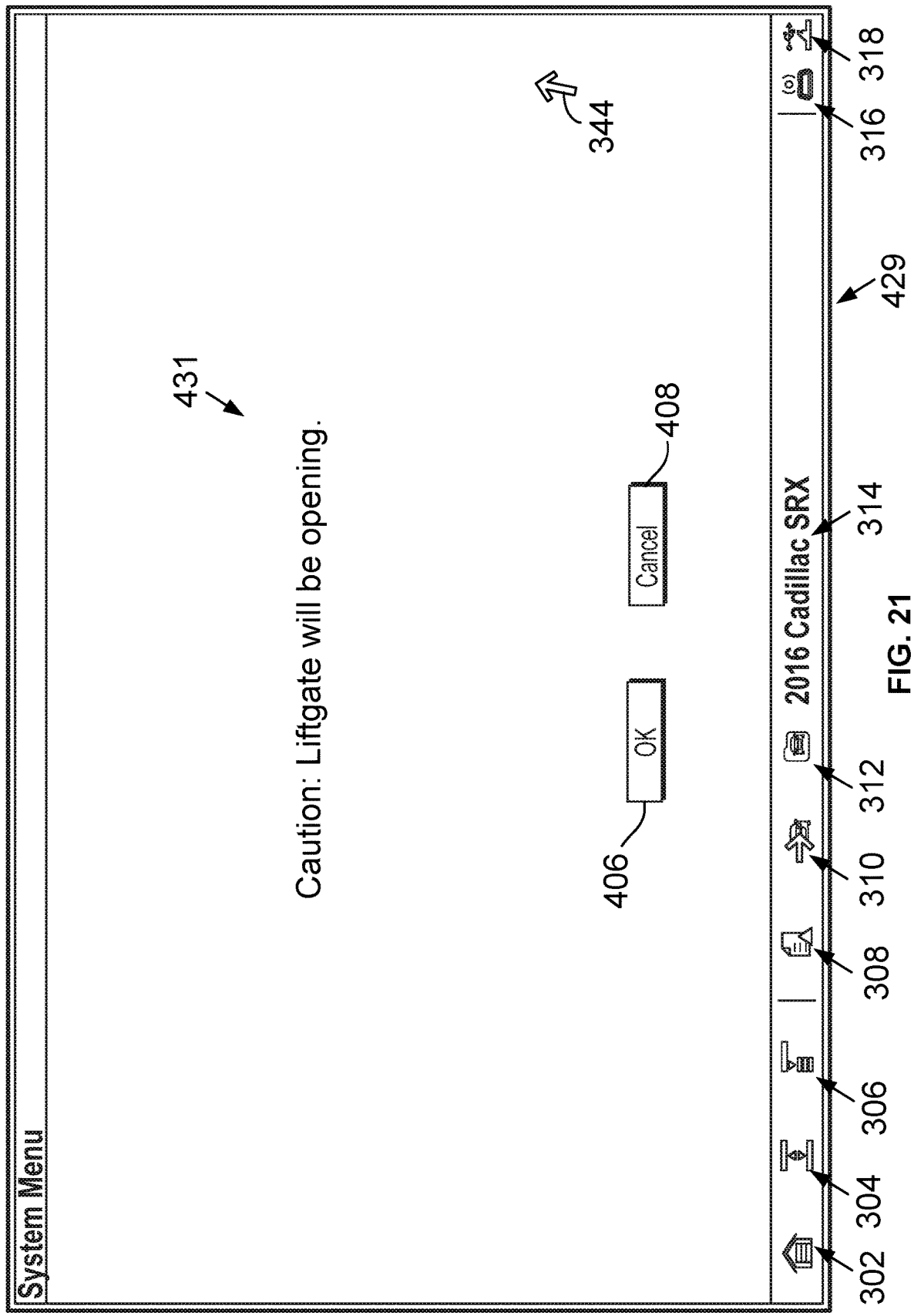
Figure 33:
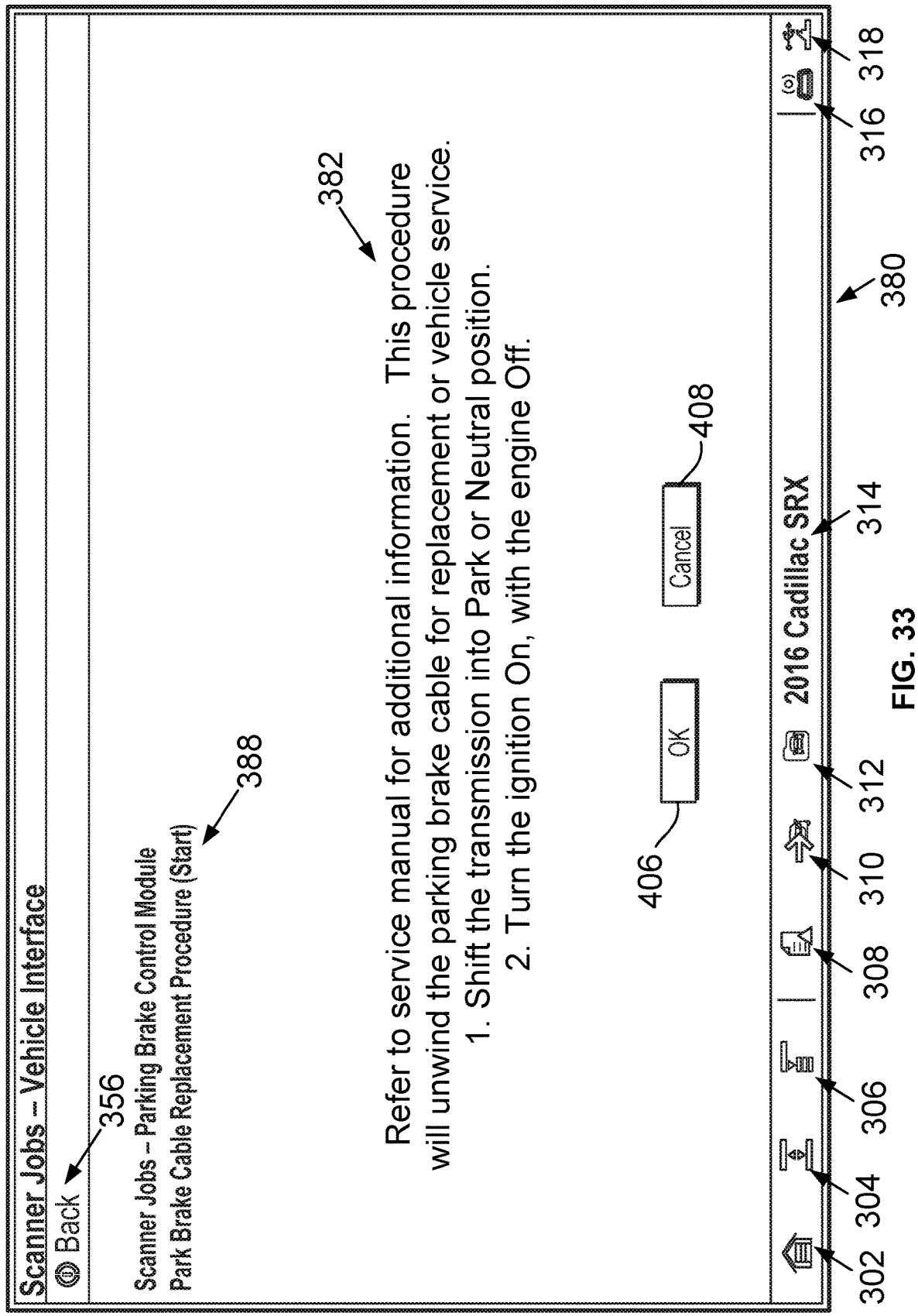

For instance, in a first further example implementation based on the set 280, the method of any of the preceding example implementations also includes displaying a third U/I screen instead of the second U/I screen in response to the selection of the first USC from the second U/I screen. The third U/I screen includes a USC including an indicator to proceed with performing the first scan tool function. Transmission of the first VDM in response to selection of the second USC is conditioned on the USC including the indicator to proceed with performing the first scan tool function being selected from the third U/I screen. Examples of the third U/I screen for this implementation are shown in FIG. 20, FIG. 21, and FIG. 33.

In accordance with the first further example implementation based on the set 280, the method can include determining, while the third U/I screen is being displayed, a status of performing the first scan tool function, and displaying, within the third U/I screen, an indication of the status of performing the first scan tool function. Furthermore and in accordance with the first further example implementation based on the set 280, the method can include switching from displaying the third U/I screen on the display to displaying the second U/I screen on the display in response to a selection of the USC selectable to switch back to a prior U/I screen from the third U/I screen. The third U/I screen includes a USC selectable to switch back to a prior U/I screen.

In a second further example implementation based on the set 280, the method can further include: (1) displaying, on the display, a U/I screen including a USC including an indicator of the first system of the identified vehicle and a USC including an indicator of the second system of the identified vehicle, and (2) displaying a third U/I screen instead of the U/I screen including the USC including the indicator of the first system of the identified vehicle and the USC including the indicator of the second system of the identified vehicle in response to a selection of the USC indicating the indicator of the first system of the identified vehicle. The third U/I screen includes a USC including an indicator of the first scan tool function for the first system of the identified vehicle and does not include any USC for selecting a scan tool function for a system of the identified vehicle other than the first system of the identified vehicle. Further, the method includes displaying a fourth U/I screen instead of the U/I screen including the USC including the indicator of the first system of the identified vehicle and the USC including the indicator of the second system of the identified vehicle in response to a selection of the USC indicating the indicator of the second system of the identified vehicle. The fourth U/I screen includes a USC including an indicator of the second scan tool function for the second system of the identified vehicle and does not include any USC for selecting a scan tool function for a system of the identified vehicle other than the second system of the identified vehicle.

Figure 40:
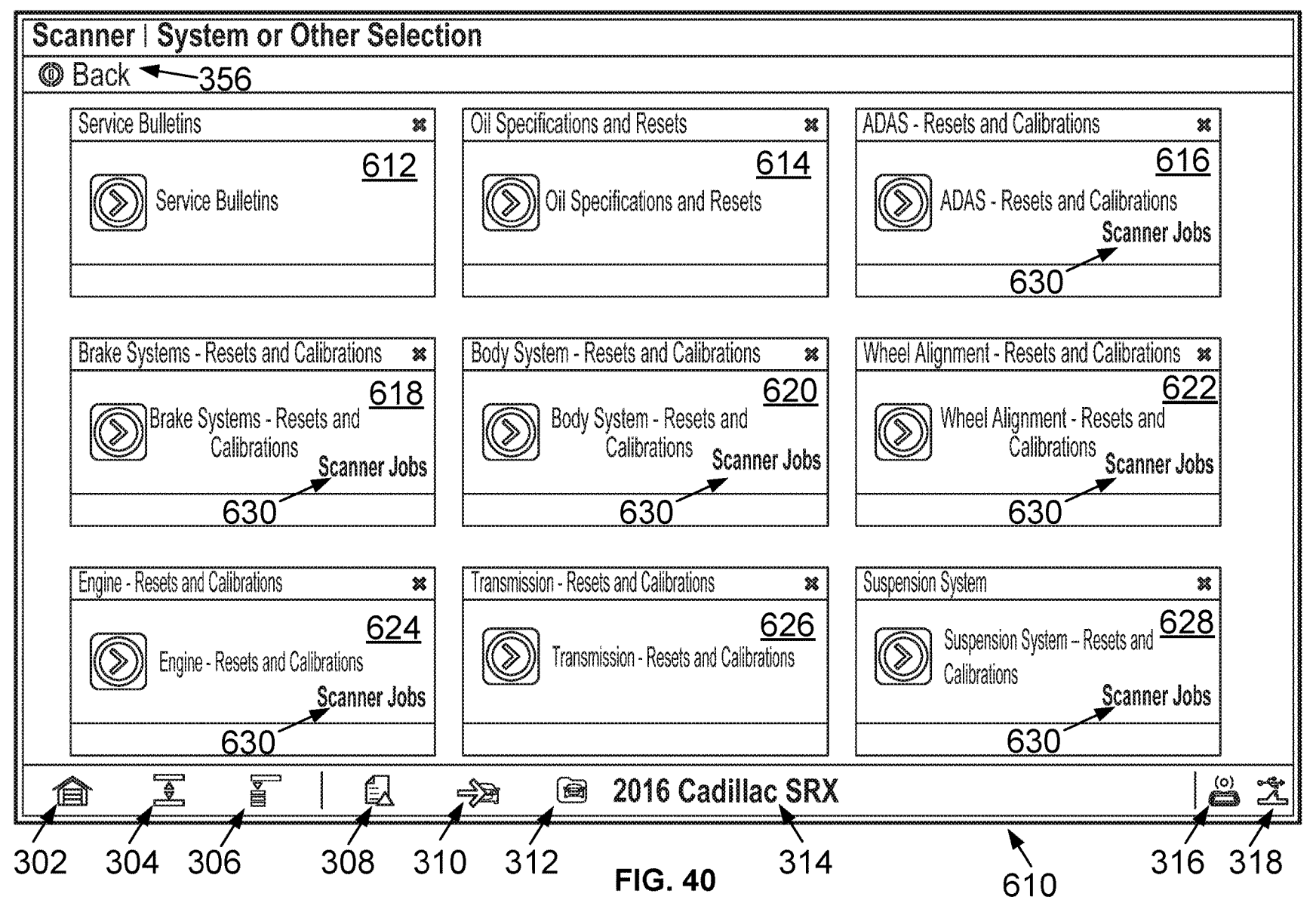

In a third further example implementation based on the set 280, the method further includes displaying, on the display, a third U/I screen including one or more USCs. Each of the one or more USCs includes an indicator of a respective system of the identified vehicle. In this implementation, the first U/I screen including the USC including the indicator of the first scanner job performable on the identified vehicle is displayed in response to a selection of a USC among the one or more USCs. The USC among the one or more USCs can include an indicator of a scanner job being available upon selection of the USC among the one or more USCs. An example of the third U/I screen for this implementation is shown in FIG. 40.

In a fourth further example implementation based on the set 280, the method further includes displaying, on the display, a third U/I screen including multiple USCs. Each of the multiple USCs includes an indicator of a respective scanner job performable on the identified vehicle. One of the multiple USCs includes a USC including an indicator of the first scanner job. The first U/I screen including the USC including the indicator of the first scanner job performable on the identified vehicle is displayed in response to a selection of the USC including the indicator of the first scanner job.

In a fifth further example implementation based on the set 280, the first U/I screen includes a USC including an indicator of a second scanner job performable on the identified vehicle. The method of this implementation includes displaying a third U/I screen instead of the first U/I screen in response to a selection of the USC including the indicator of the second scanner job. The third U/I screen includes guidance for performing the second scanner job. As an example, the second scanner job can include a change engine oil job and the guidance for performing the second scanner job can include guidance on how to reset an engine oil life setting within an ECU in the identified vehicle without using the diagnostic tool to send a VDM to the ECU.

2. Second Example Operation

Figure 10:
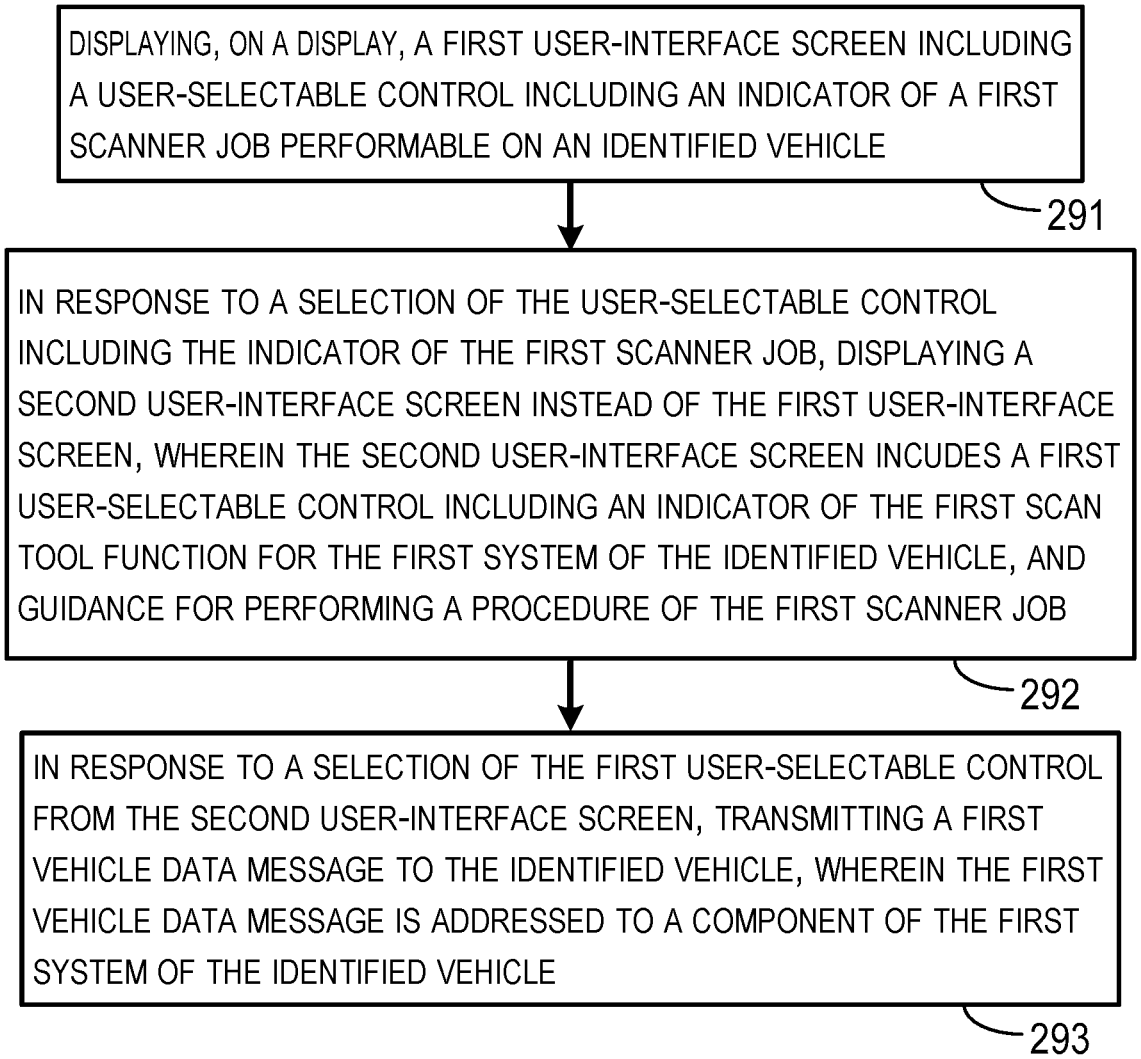

Next, FIG. 10 shows a flowchart depicting a set of functions 290 (or more simply "the set 290") that can be carried out in accordance with the example implementations described in this description. The set 290 includes the functions shown in blocks labeled with whole numbers 291 through 293. The following description of the set 290 includes references to elements shown in other figures described in this description, but the functions of the set 290 are not limited to being carried out only by the referenced elements. A variety of methods can be performed using all of the functions shown in the set 290 or any proper subset of the functions shown in the set 290. Any of those methods can be performed with other functions such as one or more of the other functions described in this description. A processor can perform or cause a function of the set 290 to be performed. That processor can include one or more processors. The processor can include the processor 72.

At block 291, the method includes displaying, on a display, a first U/I screen including a USC including an indicator of a first scanner job performable on an identified vehicle. In at least some implementations, the display is operatively connected to one or more processors, and the one or more processors are operatively coupled to one or more computer-readable mediums. The computer-readable medium has stored thereon program instructions executable by the one or more processors to perform scan tool functions that include the one or more processors transmitting a VDM to an identified vehicle. The scan tool functions include a first scan tool function for a first system of the identified vehicle.

As an example, the first U/I screen can include and/or be arranged like the U/I screens 440, 490, 550, 640 shown in FIG. 17, FIG. 32, FIG. 38, FIG. 41, respectively. In some example implementations, the first U/I screen includes diagnostic information regarding the identified vehicle or other guidance, such as the U/I screens 670, 800 shown in FIG. 42, FIG. 43 that include guidance 674, 804, respectively.

At block 292, the method includes displaying a second U/I screen instead of the first U/I screen. This occurs in response to a selection of the USC including the indicator of the first scanner job. The second U/I screen includes a first USC including an indicator of the first scan tool function for the first system of the identified vehicle, and guidance for performing a procedure of the first scanner job.

In at least some example implementations based on the set 290, the first scanner job for the set 290 is associated with a search term. The method can include the one or more processors: (1) transmitting, to a server, a request for guidance regarding the first scanner job, and (2) receiving, in response to the request, guidance regarding the first scanner job. The request can include the search term. As an example, the search term can include a vehicle identifier, a scanner job identifier, a scan tool function identifier, a functional test system identifier, a target required tag, and/or a functional test label.

In at least some example implementations based on the set 290, the second U/I screen includes guidance for performing a procedure of the first scanner job. The guidance for performing a procedure of the first scanner job can be stored in the memory 80. In one respect, the guidance can be stored locally in the memory 80 before the identified vehicle is identified. In another respect, the guidance can be stored locally in the memory 80 after receiving a response to a request for guidance, such as described in the preceding paragraph. In yet another respect, the guidance can be received as part of a web page including the second U/I screen.

At block 293, the method includes transmitting a first VDM to the identified vehicle, wherein the first VDM is addressed to a component of the first system of the identified vehicle. This occurs in response to a selection of the first USC from the second U/I screen.

In any of the example implementations based on the set 290, the scan tool functions can include a vehicle component reset function, a vehicle component calibration function, a vehicle component programming function, a vehicle component read DTC function, and/or a vehicle component clear DTC function.

In any of the example implementations based on the set 290, the display can include a touch screen display. The selection of a USC displayed on the display, such as the first USC, can include a user contact of the touch screen display at or in proximity to the first USC. The processor 72 can determine the selection occurred.

In any of the example implementations based on the set 290, the first U/I screen can include diagnostic information or other guidance regarding the identified vehicle.

In any of the example implementations based on the set 290, the scan tool function can include a second scan tool function for the first system of the identified vehicle. In this implementation(s), the second U/I screen includes a second USC including an indicator of the second scan tool function for the first system of the identified vehicle. A method according to these implementation(s) includes transmitting a second VDM to the identified vehicle in response to a selection of the second USC from the second U/I screen. The second VDM is addressed to a component of the first system of the identified vehicle.

In any of the example implementations based on the set 290, the method can also include displaying a third U/I screen. The follow six paragraphs describe such further example implementations.

For instance, in a first further example implementation based on the set 290, the method also includes displaying a third U/I screen instead of the second U/I screen in response to the selection of the first USC from the second U/I screen. The third U/I screen includes a USC including an indicator to proceed with performing the first scan tool function. Transmission of the first VDM in response to selection of the second USC is conditioned on the USC including the indicator to proceed with performing the first scan tool function being selected from the third U/I screen.

In accordance with the first further example implementation based on the set 290, the method can include determining, while the third U/I screen is being displayed, a status of performing the first scan tool function, and displaying, within the third U/I screen, an indication of the status of performing the first scan tool function. Furthermore and in accordance with the first further example implementation based on the set 290, the method can include switching from displaying the third U/I screen on the display to displaying the second U/I screen on the display in response to a selection of the USC selectable to switch back to a prior U/I screen from the third U/I screen. The third U/I screen includes a USC selectable to switch back to a prior U/I screen.

In a second further example implementation based on the set 290, the method can further include: (1) displaying, on the display, a third U/I screen including a USC including an indicator of the first system of the identified vehicle, and (2) displaying a fourth U/I screen instead of the third U/I screen in response to a selection of the USC indicating the indicator of the first system of the identified vehicle. The fourth U/I screen includes a USC including an indicator of the first scan tool function for the first system of the identified vehicle and does not include any USC for selecting a scan tool function for a system of the identified vehicle other than the first system of the identified vehicle.

In a third further example implementation based on the set 290, the method can further include displaying, on the display, a third U/I screen including one or more USCs. Each of the one or more USCs includes an indicator of a respective system of the identified vehicle. The first U/I screen including the USC including the indicator of the first scanner job performable on the identified vehicle is displayed in response to a selection of a USC among the one or more USCs. Moreover, in accordance with at least some of these further implementations, the USC among the one or more USCs includes an indicator of a scanner job being available upon selection of the USC among the one or more USCs.

In a fourth further example implementation based on the set 290, the method can further include displaying, on the display, a third U/I screen including multiple USCs. Each of the multiple USCs includes an indicator of a respective scanner job performable on the identified vehicle. One of the multiple USCs includes a USC including an indicator of the first scanner job. The first U/I screen including the USC including the indicator of the first scanner job performable on the identified vehicle is displayed in response to a selection of the USC including the indicator of the first scanner job.

In a fifth further example implementation based on the set 290, the first U/I screen includes a USC including an indicator of a second scanner job performable on the identified vehicle. The method of this implementation includes displaying a third U/I screen instead of the first U/I screen in response to a selection of the USC including the indicator of the second scanner job. The third U/I screen includes guidance for performing the second scanner job. As an example, the second scanner job can include a change engine oil job and the guidance for performing the second scanner job can include guidance on how to reset an engine oil life setting within an ECU in the identified vehicle without using the diagnostic tool to send a VDM to the ECU.

An example implementation based on the set 280 includes performing the function of one or more of block 281, 282, 283, and 284. For instance, an implementation based on the set 280 includes performing the functions of blocks 281, 282, 283, and 284. An example implementation based on the set 290 includes performing the function of one or more of block 291, 292, and 293. For instance, an implementation based on the set 290 includes performing the functions of blocks 291, 292, and 293.

VI. Example User-Interface (U/I) Screens

Next, FIG. 11 to FIG. 47 shows example U/I screens in accordance with example implementations. A display of a diagnostic tool, such as the diagnostic tool 10, 70, can display a U/I screen shown in FIG. 11 to FIG. 47 or some portion of a U/I screen shown in one or more of the U/I screens shown in FIG. 11 to FIG. 47. One or more of the U/I screens shown in FIG. 11 to FIG. 47 pertain to a vehicle. Those U/I screen(s) will be described with respect to the vehicle 12, 30, 50, but are applicable to other vehicle(s) as well. The server 150 can provide a U/I screen shown in FIG. 11 to FIG. 47 to the diagnostic tool 70 or some portion of the content shown on a U/I screen in FIG. 11 to FIG. 47 to the diagnostic tool 70.

The diagnostic tool 70 is configured to operate in different modes. Each of the example U/I screens represents one of the different operating modes of the diagnostic tool 70. As an example and in general, the operating modes can include displaying a U/I screen that includes a USC selectable to select a characteristic of a vehicle to identify a vehicle. As another example and in general, the operating modes can include displaying a U/I screen that includes a USC selectable to select a scanner job for an identified vehicle. As another example and in general, the operating modes can include displaying a U/I screen that includes a USC selectable to cause the VCT 76 to transmit a VDM to the identified vehicle. A set of USCs, such as one or more USCs, can be referred to as a menu of USCs, or more simply a menu.

Figure 11:
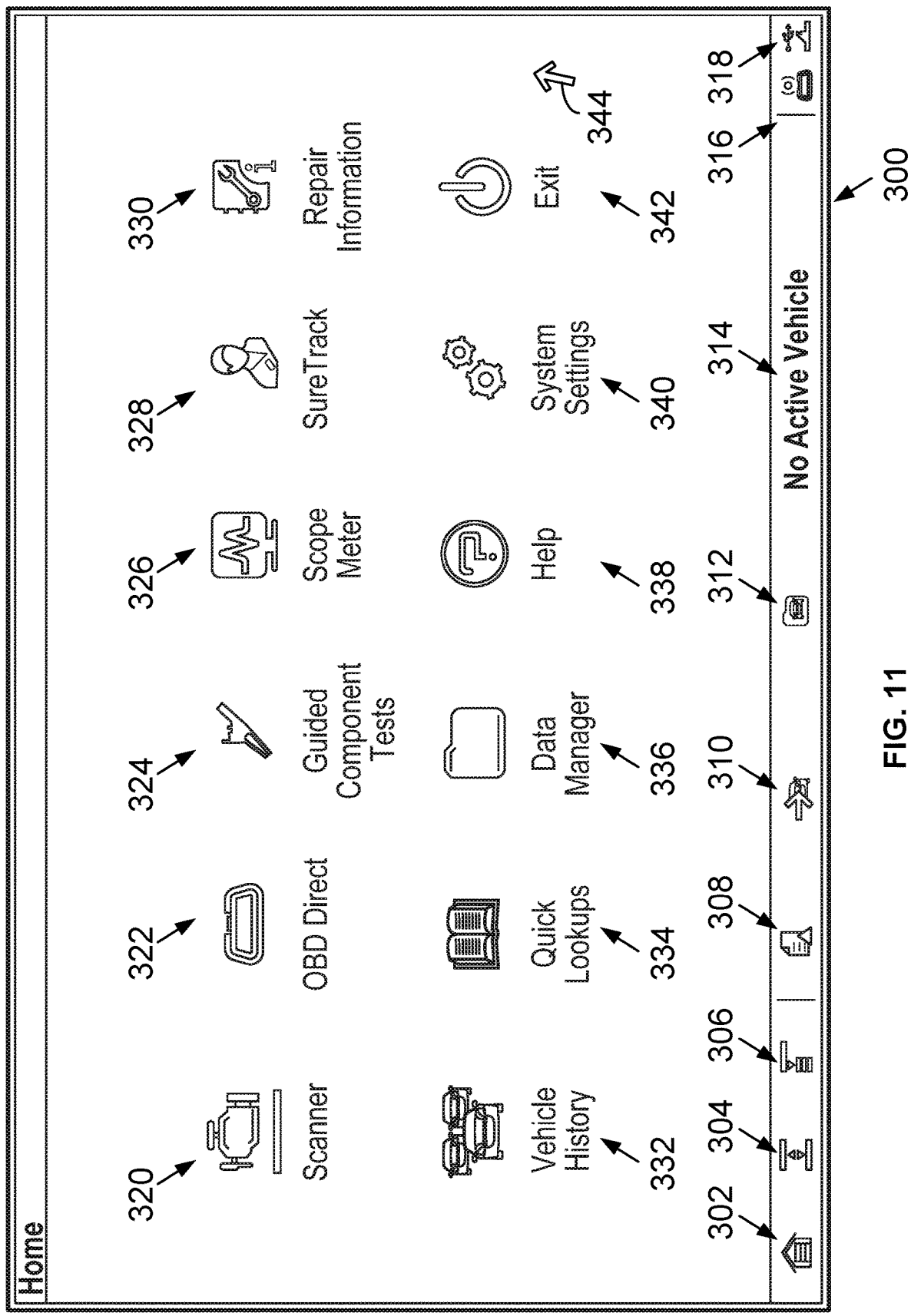

In particular, FIG. 11 shows a U/I screen 300 in accordance with an example implementation. The U/I screen 300 can be arranged as a home screen that is shown on the display 84. A home screen, such as the U/I screen 300, can be displayed in response to the diagnostic tool 10, 70 powering on from the off state. The home screen, such as the U/I screen 300, can be displayed in response to selection of a home screen USC displayed on a U/I screen, such as a home screen USC 302. The home screen, such as the U/I screen 300, can be displayed in response to selection of a back icon displayed on a U/I screen, such as the back USC 356 shown in FIG. 12 or any other U/I screen (having the back USC 356) displayed in response to selecting a USC on the U/I screen 300. The back USC 356 can include an indicator indicative of the function performed upon and/or in response to selection of the back USC 356. As an example, the indicator can include text, such as "Back" or "Exit", or a symbol such as an arrow.

The U/I screen 300, as well as other U/I screens displayable on the display 84, such as the U/I screens shown in FIG. 12 to FIG. 47, can include USC(s) for changing from the display screen displaying those control(s) to a different U/I screen and/or to overlaying a U/I screen upon the currently displayed U/I screen. As an example, those controls can include a desktop USC 304, a menu USC 306, and/or a change vehicle USC 310. The change vehicle USC 310 is selectable to display a U/I screen for entering one or more identifiers of a vehicle. In an implementation in which the processor 72 is not executing and/or does not include CRPI of an operating system including a desktop, the desktop USC 304 can be grayed-out to indicate the desktop USC 304 is not selectable. Furthermore, the U/I screen 300, as well as other U/I screens displayable on the display 84, such as the U/I screens shown in FIG. 12 to FIG. 47, can include a cursor 344 movable to point to a USC or other item displayed on the display 84.

The U/I screen 300, as well as other U/I screens displayable on the display 84, such as the U/I screens shown in FIG. 12 to FIG. 47, can include a TSB USC 308 and/or a view record USC 312. In some implementations, the TSB USC 308 can be un-selectable if no vehicle has been identified and/or if no TSB regarding the identified vehicle is available. In some implementations, the view record USC 312 can be un-selectable if no vehicle has been identified and/or if no record regarding the identified vehicle is available. The record regarding an identified vehicle can indicate information regarding prior instances of servicing a particular instance of the identified vehicle. The processor 72 may need identifiers beyond a year, make, and mode of a vehicle to identify the particular instance of the identified vehicle. As an example, the additional identifiers can include a customer name, a complete VIN, a license plate number, among others.

The U/I screen 300, as well as other U/I screens displayable on the display 84, such as the U/I screens shown in FIG. 12 to FIG. 47, can include a vehicle indicator 314 that indicates whether a vehicle has been identified for a current diagnostic session or whether an identified vehicle is currently connected to the diagnostic tool 10, 70 for the diagnostic session.

The U/I screen 300, as well as other U/I screens displayable on the display 84, such as the U/I screens shown in FIG. 12 to FIG. 47, can include indicators 316, 318 that indicate a hardware status pertaining to the diagnostic tool 10, 70. As an example, the indicator 316 can indicate whether or not the network transceiver 74 is connected to a wireless communication network of the communication network 14. As another example, the indicator 318 can indicate whether or not the network transceiver 74 is connected to a wired communication network of the communication network 14.

The U/I screen 300 includes a set of USCs 320 to 340 representing different selectable operating modes of the diagnostic tool 10, 70 and an exit mode USC 342. Selection of the exit mode USC 342 can cause the diagnostic tool 10, 70 to power off from the on state (e.g., change from the on state to the off state). Each of the USCs 320 to 342 can include an icon and/or text representative of the selectable mode. The USCs 320 to 340 include the following USCs: a scanner mode USC 320, an on-board diagnostic mode USC 322, a guided component tests mode USC 324, a scope meter mode USC 326, a repair tip mode USC 328, a repair information mode USC 330, a vehicle history mode USC 332, a quick lookups mode USC 334, a data manager mode USC 336, a help mode USC 338, and a system setting mode USC 340. Selection of a USC from the USCs 320 to 340 can cause the diagnostic tool 10, 70 to display a U/I screen associated with the selected USC and an associated operating mode and to cause the diagnostic tool 10, 70 to operate in the selected operating mode.

Figure 12:
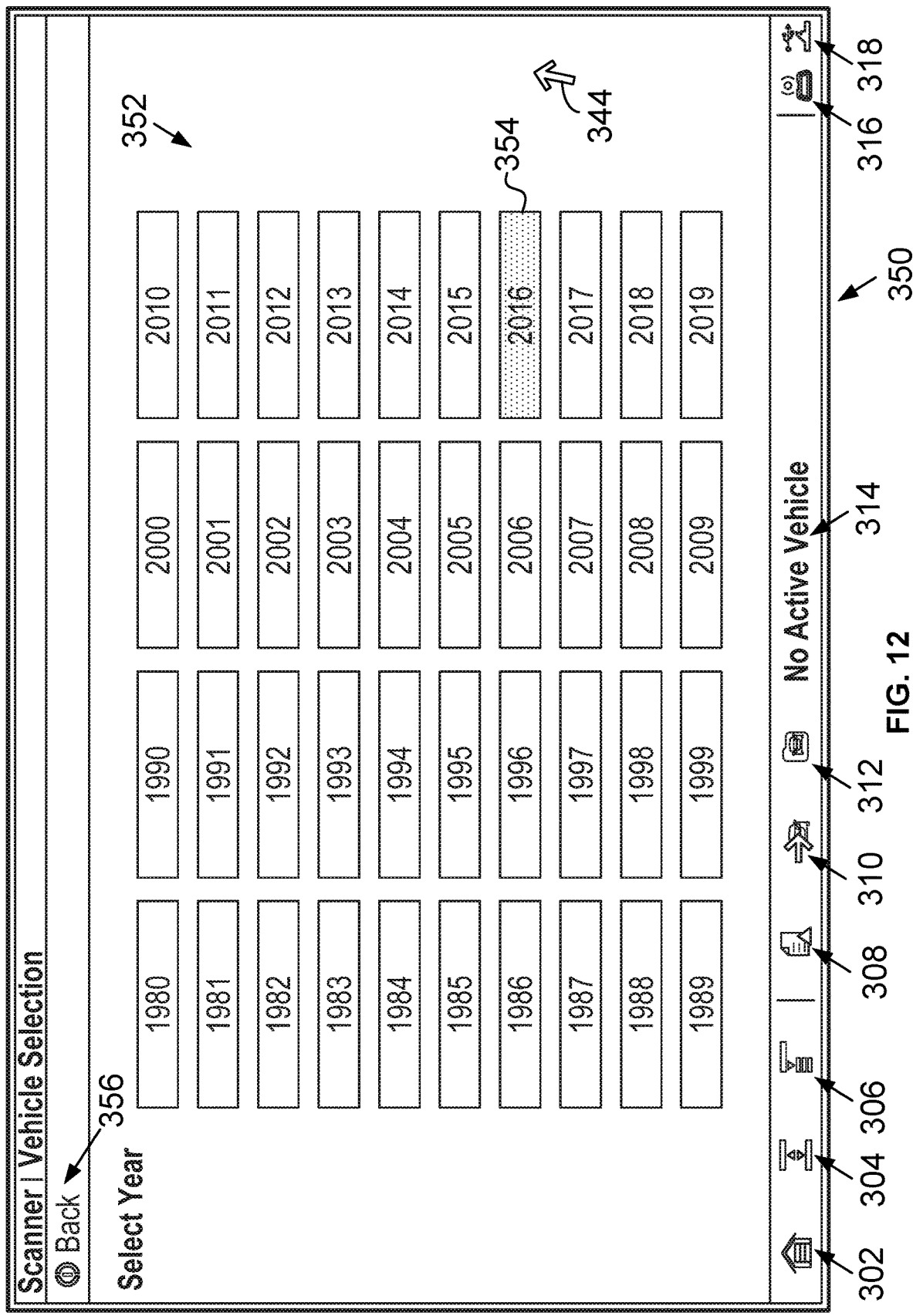

Next, FIG. 12 shows a U/I screen 350 configured for selecting a portion of a vehicle identifier for the scanner mode. In an implementation based on FIG. 12, a vehicle model year of the vehicle 12, 30, 50 can be selected from a set of model year USCs 352. In some implementations, the set of model year USCs 352 include model year USCs ranging from the vehicle model year 1980 to a most-current vehicle model year. In other implementations, the set of model year USCs 352 can cover a different range of model years. FIG. 12 shows a vehicle model year USC 354 for the model year 2016 as being selected and/or as having been selected. Selecting the back USC 356 from the U/I screen 350 can cause the display 84 to display a U/I screen displayed just prior to displaying the U/I screen 350. As an example, the U/I screen 350 can be displayed in response to selection of the scanner mode USC 320 while the U/I screen 300 is displayed on the display 84 or in response to selecting the back USC 356 from the U/I screen 370 shown in FIG. 13.

Figure 13:
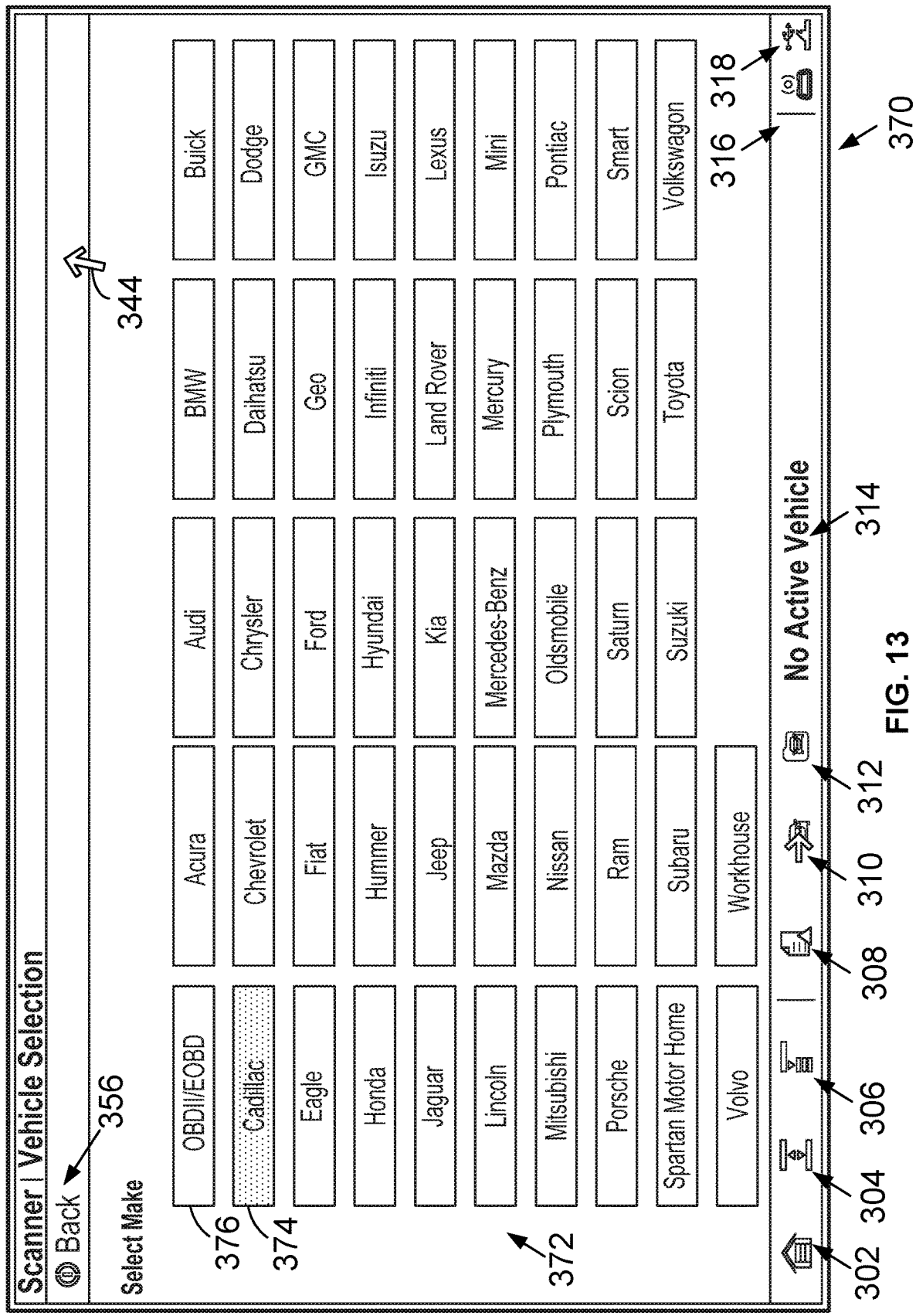

Next, FIG. 13 shows a U/I screen 370 configured for selecting a portion of a vehicle identifier for the scanner mode. In an implementation based on FIG. 13, a vehicle make of the vehicle 12, 30, 50 can be selected from a set of vehicle make USCs 372. In some implementations, the set of vehicle make USCs 372 include vehicle make USCs for vehicles made in multiple countries and/or by multiple vehicle manufacturers. In other implementations, the set of vehicle make USCs 372 includes vehicle make USCs for vehicles made in a single country and/or by a single vehicle manufacturer. For purposes of this description, the country in which a vehicle is made can be considered to be the country in which most of the vehicle is assembled and/or from which the greatest percentage of components are manufactured. FIG. 13 shows a vehicle make USC 374 for CADILLAC® vehicle make being selected and/or as having been selected. As an example, the U/I screen 370 can be displayed in response to selection of the change vehicle USC 310 while the U/I screen 350 is displayed on the display 84, in response to selection of the vehicle model year USC 354 while the U/I screen 350 is displayed on the display 84, or in response to selecting the back USC 356 from the U/I screen 390 shown in FIG. 14. The U/I screen 370 can include a generic diagnostics USC 376 selectable to cause the diagnostic tool 70 to enter a mode in which the diagnostic tool 70 displays a U/I screen with USCs selectable to cause the diagnostic tool 70 to transmit VDM according to a generic VDM protocol. The generic VDM protocol can include a protocol to send VDM according to the SAE® J1979 standard for OBD II. The generic VDM protocol can be applicable to multiple vehicle manufacturers, such as vehicle manufacturers supplying cars to a given country or region, such as the United States, P.R. of China, or the European Union.

Figure 14:
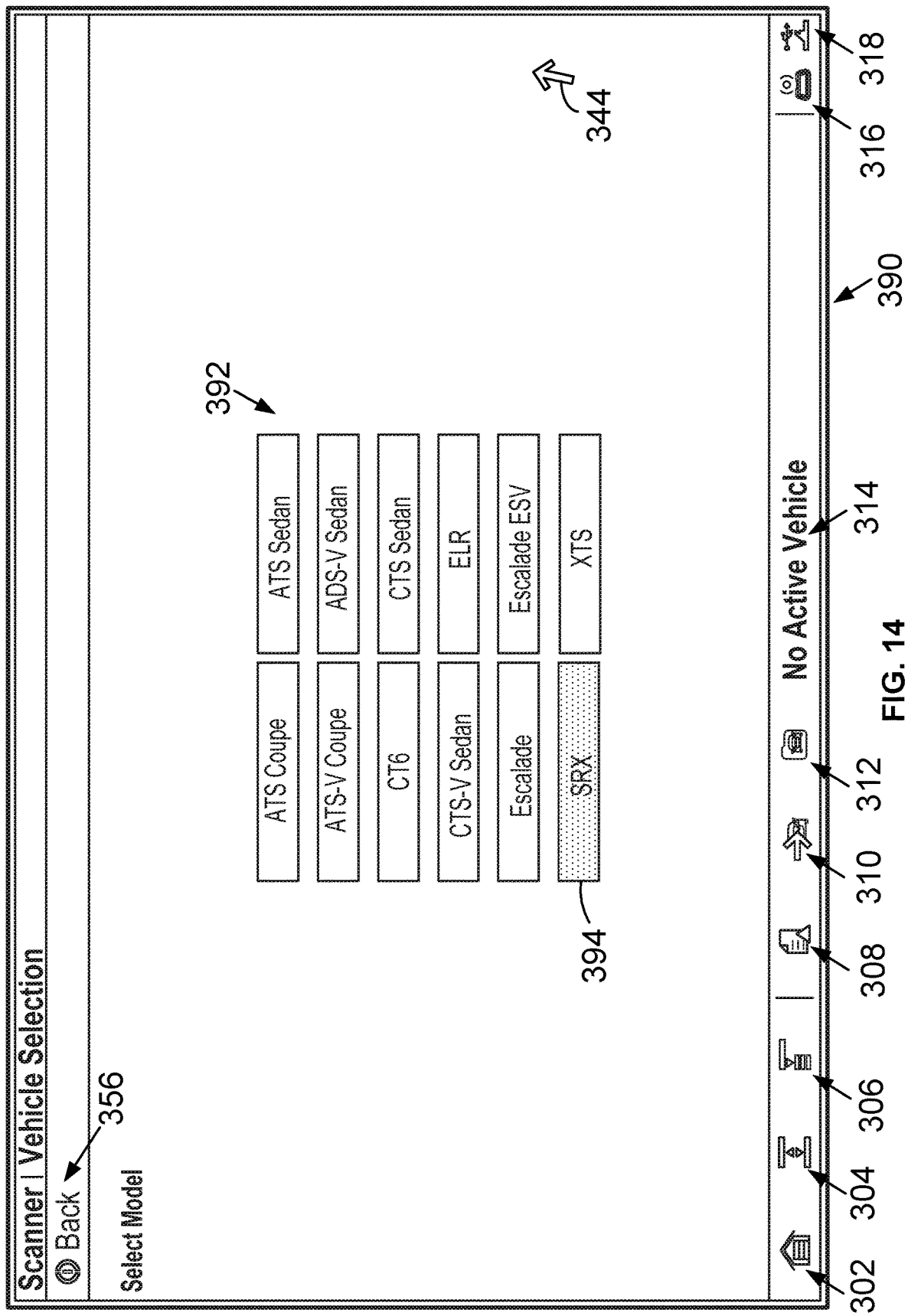

Next, FIG. 14 shows a U/I screen 390 configured for selecting a portion of a vehicle identifier for the scanner mode. In an implementation based on FIG. 14, a vehicle model of the vehicle 12, 30, 50 can be selected from a set of vehicle model USCs 392. In some implementations, the set of vehicle model USCs 392 include vehicle models applicable to a previously-selected vehicle model year and a previously selected vehicle make. As an example, the set of vehicle model USCs 392 includes USCs for vehicle models built for the CADILLAC® vehicle make for the model year 2016. FIG. 14 shows a vehicle model USC 394 for the SRX vehicle model as being selected and/or as having been selected. As an example, the U/I screen 390 can be displayed in response to selection of the change vehicle USC 310 while the U/I screen 370 is displayed on the display 84, in response to selection of the vehicle make USC 374 while the U/I screen 370 is displayed on the display 84, or in response to selecting the back USC 356 from the U/I screen 400 shown in FIG. 15.

In another implementation, the set of vehicle model USCs 392 can include a USC that further distinguishes vehicle models from one another by including a vehicle option identifier at and/or in the USC. For instance, the set of vehicle model USCs 392 can include a USC including a vehicle option identifier pertaining to an engine displacement of an engine available in the vehicle model. For example, instead of a single vehicle model USC for the SRX® vehicle model, the set of vehicle model USCs 392 can include the vehicle model USCs with the following text "SRX—2.8 L", "SRX—3.0 L," and "SRX—3.6 L," in which the number indicated in those USCs indicates an engine displacement. Other types of vehicle option identifiers can be included in a USC of a U/I screen configured for selecting a vehicle for the scanner mode.

Next, FIG. 15 shows a U/I screen 400 configured for selecting a vehicle identified for the scanner mode. The U/I screen 400 includes a prompt 402 showing a vehicle identifier 404 based on prior selections of various identifiers of a vehicle, such as a vehicle year, vehicle make, and vehicle model, entered via one or more other U/I screen. The U/I screen 400 includes the continue USC 406 to approve selecting the vehicle identified by the vehicle identifier 404, and a cancel USC 408 to cancel selecting the vehicle identified by the vehicle identifier 404. The continue USC 406 can include text, such as "Ok," "Continue," "Save," "Yes," or some other text or symbol to indicate performance of a function associated with the continue USC 408 will not be performed if the cancel USC 408 is selected. The cancel USC 408 can include text, such as "Cancel," "Exit," "No," or some other text or symbol to indicate performance of a function associated with the cancel USC 408 will not be performed if the cancel USC 408 is selected. In some implementations, selecting the cancel USC 408 can cause the display 84 to display a U/I screen displayed just prior to displaying the U/I screen 400. Alternatively, selecting the cancel USC 408 can cause the display 84 to display the U/I screen 300 or the U/I screen 350.

Figure 16:
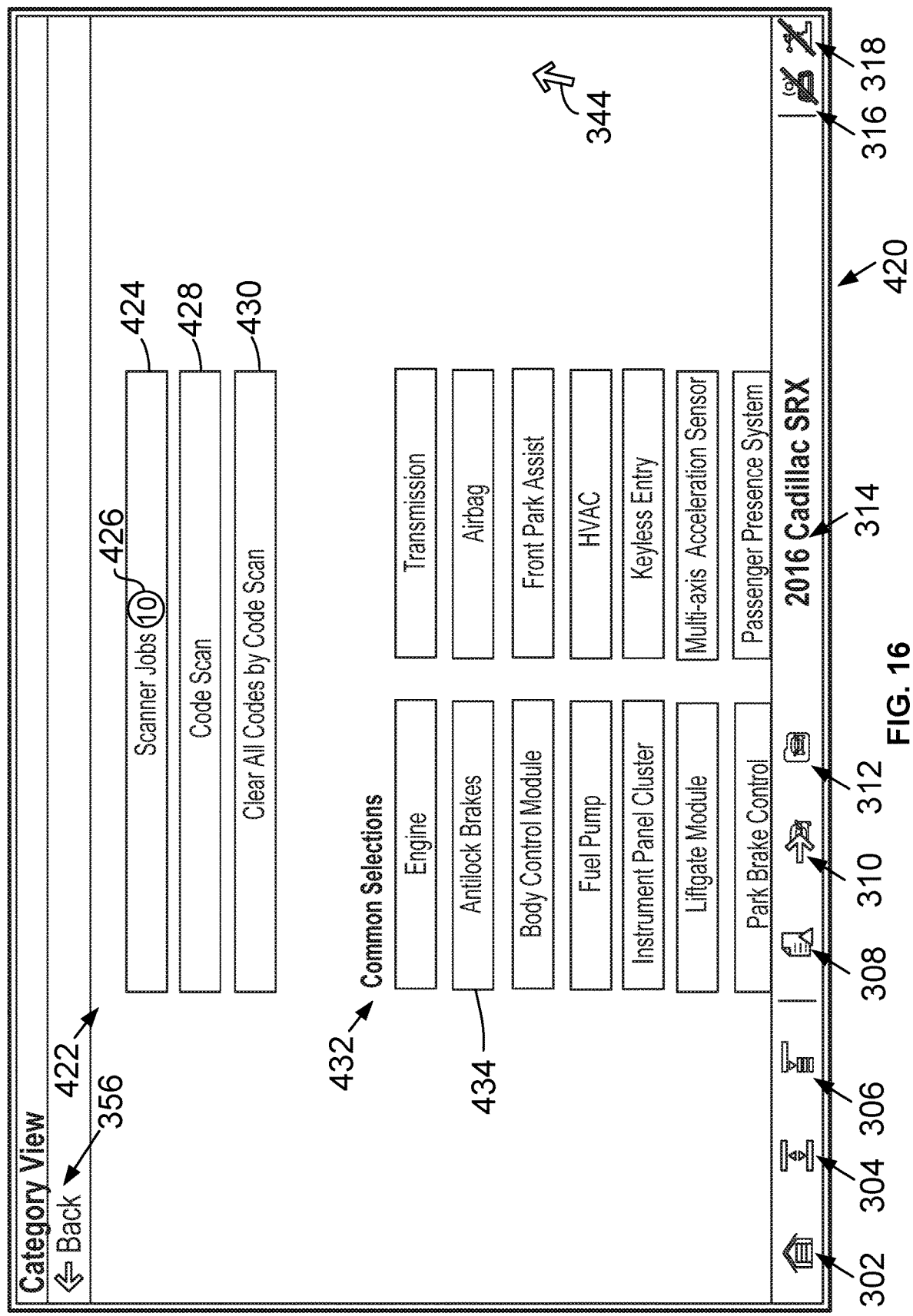
Figure 17:
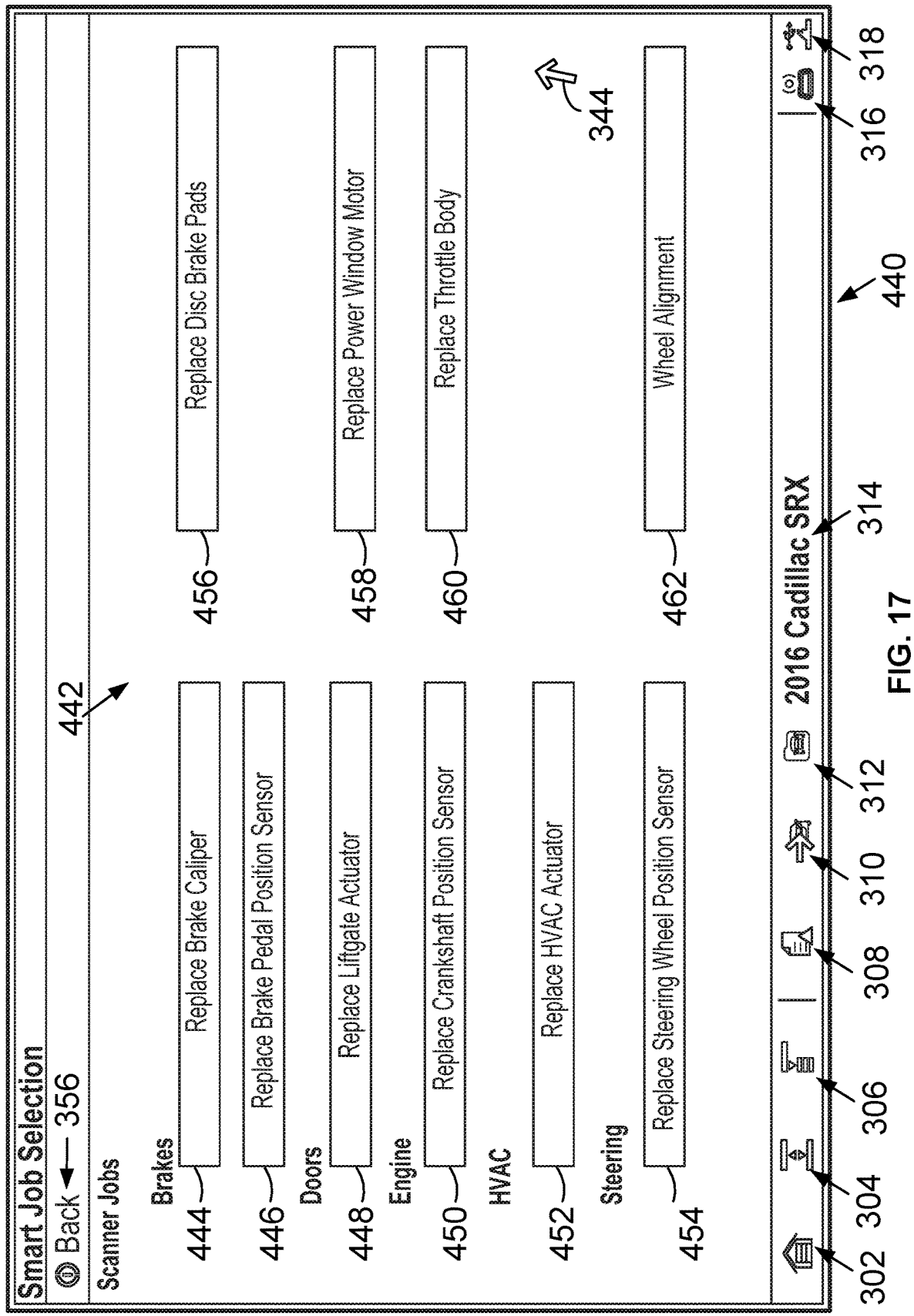

Next, FIG. 16 shows a U/I screen 420 including a category view 422 of different USCs pertaining to different operating modes of the diagnostic tool 10, 70. In particular, the U/I screen 420 includes a scanner jobs USC 424, a code scan USC 428, and a clear all codes by code scan USC 430. The code(s) referred to by the code scan USC 428 and the clear all codes by code scan USC 430 can be DTC(s) set by an ECU. The scanner jobs USC 424 includes a scanner job quantity indicator 426 indicative of how many scanner jobs on the diagnostic tool are selectable for the identified vehicle. The processor 72 can determine a quantity of scanner jobs for the identified vehicle by searching the scanner jobs 85 based on the vehicle identifier. In FIG. 16, the scanner job quantity indicator 426 indicates ten, which matches the quantity of different scanner jobs shown in the table 100 shown in FIG. 5.

The U/I screen 420 also includes a set of common selection USCs 432. A USC among the set of common selection USCs 432 can include a USC configured to select a system of the identified vehicle so as to cause the display 84 to display a U/I screen with one or more scan tool function USCs for the identified system. In accordance with an implementation, the display 84 does not display any guidance on that U/I screen or in response to selecting a scan tool function USC on that U/I screen. The common selection USCs 432 include an antilock brakes USC 434 among others.

As an example, the U/I screen 420 can be displayed in response to selection of the continue USC 406 while the U/I screen 400 is displayed on the display 84, or in response to selecting the back USC 356 from the U/I screen 440 shown in FIG. 17.

Next, FIG. 17 shows a U/I screen 440 including a set of scanner job USCs 442. The scanner job USCs 442 include scanner job USC 444, 446, 448, 450, 452, 454, 456, 458, 460, 462. As an example, the scanner job USC 444, 446, 448, 450, 452, 454, 456, 458, 460, 462 is selectable to select a scanner job regarding: (1) replacing a brake caliper on the identified vehicle, (2) replacing a brake pedal position sensor on the identified vehicle, (3) replacing a liftgate actuator, (4) replacing a crankshaft position sensor on the identified vehicle, (5) replacing an HVAC actuator on the identified vehicle, (6) replacing a steering wheel position sensor on the identified vehicle, (7) replacing disc brake pads on the identified vehicle, (8) replacing a power window motor on the identified vehicle, (9) replacing a throttle body on the identified vehicle, and (10) performing a wheel alignment, respectively. A person skilled in the art will understand that the above-referenced scanner job USCs are examples only.

The processor 72 can determine which scanner jobs pertain to the identified vehicle by searching the scanner jobs 85 based on the identified vehicle (e.g., the vehicle identifier associated with the identified vehicle). In accordance with that implementation, the scanner jobs 85 can include data indicative of the scanner jobs available for the identified vehicle, such as the data shown in Table 100 in FIG. 5. In an example implementation, the processor 72 can output the U/I screen 440 to the display 84 in response to determining that the scanner jobs USC 424 is selected while the U/I screen 420 (shown in FIG. 16) is displayed on the display 84, or in response to selecting the back USC 356 from the U/I screen 440 shown in FIG. 17 or from the U/I screen 470 shown in FIG. 31.

Next, FIG. 18 shows a U/I screen 401 including content regarding the replace liftgate actuator scanner job. In accordance with example implementations, the processor 72 can output the U/I screen 401 in response to determining the scanner job USC 448 associated with the replace liftgate actuator scanner job has been selected while the U/I screen 440 is displayed on the display 84. In an example implementation, in response to determining the scanner job USC 448 is selected, the processor 72 can request a web-service from the server 150. That request can, but need not necessarily, include a vehicle identifier indicating the identified vehicle and an identifier of scanner job selected by selection of the scanner job USC 448.

The content of the U/I screen 401 includes top repairs user-selectable data 403, a service information USC 405, a vehicle interface USC 407, a scanner mode USC 409, and a repair information mode USC 411. The top repairs user-selectable data 403 shows quantities of repairs made to instances of the identified vehicle and the mileage on the vehicle to which each repair was made. The service information USC 405 is selectable to cause the processor 72 to determine a list of service information items pertaining to the replace liftgate actuator scanner job and output a U/I screen showing a list of service information items, such as the list of service items 543 shown in FIG. 27. In an example implementation, the processor 72 can determine the list of service information items in a response to the request for web-service discussed in the previous paragraph.

In some implementations, the service information USC 405 includes a quantity indicator 413 indicative of how many service information items are contained in the list of service information items. The vehicle interface USC 407 is selectable to cause the processor 72 to output a U/I screen showing USCs selectable to cause the diagnostic tool to perform a scan tool function associated with the replace liftgate actuator scanner job. The scanner mode USC 409 is selectable to cause the processor 72 to transition from a mode in which scan tool functions are selectable based on a scanner job to a mode in which scan tool functions are selectable based on another arrangement of scan tool function selectors, such as an arrangement in which the scan tool function selectors are based on a selected YMMS. The repair information mode USC 411 is selectable to cause the processor 72 to transition from a mode in which repair information is presented based on a scanner job to a mode in repair information is presented based on another arrangement, such as an arrangement in which the repair information is presented based on a selected YMMS.

In at least some implementations, each of the service information USC 405, the vehicle interface USC 407, the scanner mode USC 409, and the repair information mode USC 411 is associated with a respective spatial portion of the display 84, and the processor 72 is configured to determine the service information USC 405, the vehicle interface USC 407, the scanner mode USC 409, or the repair information mode USC 411 is selected if the respective portion of the display 84 is being touched by a user.

Next, FIG. 19 shows a U/I screen 417 including content regarding the replace liftgate actuator scanner job. In accordance with at least some implementations, the processor 72 can output the U/I screen 417 in response to determining the vehicle interface USC 407 has been selected while the U/I screen 401 is displayed on the display 84. In accordance with at least some other implementations, the processor 72 can output the U/I screen 417 in response to determining the scanner job USC 448 associated with the replace liftgate actuator scanner job has been selected while the U/I screen 440 is displayed on the display 84.

The content of the U/I screen 417 includes the top repairs user-selectable data 403, the service information USC 405, the scanner mode USC 409, the repair information mode USC 411, and a scan tool function USC 419. In the implementation shown in FIG. 19, only one scan tool function USC is displayed. In other implementations, a U/I screen displayed in response to selection of a vehicle interface USC, such as the vehicle interface USC 407, can include multiple scan tool function USCs. The scan tool function USC 419 is selectable to cause the processor 72 to display a U/I screen pertaining to a particular scan tool function associated with the scan tool function USC 419, such as the U/I screen 423 shown in FIG. 20, the U/I screen 429 shown in FIG. 21, or the U/I screen 435 shown in FIG. 22.

Next, FIG. 20 shows the U/I screen 423. The U/I screen 423 includes the continue USC 406, the cancel USC 408, and instructions 425 regarding performance of a scan tool function. In the implementation in which the scan tool function is the liftgate maximum open position learn scan tool function, the instructions 425 pertain to that scan tool function. A U/I screen with instructions regarding performance of a different scan tool function can include instruction regarding performance of that different scan tool function. The processor 72 can output a U/I screen with instructions regarding performance of a scan tool function after selection of the scan tool function but before performance of the scan tool function. The continue USC 406 within the U/I screen 423 is selectable to display another U/I screen pertaining to performance of the liftgate maximum open position learn scan tool function such as the U/I screen 429 shown in FIG. 21 or the U/I screen 435 shown in FIG. 22.

Next, FIG. 21 shows the U/I screen 429. The U/I screen 429 includes the continue USC 406, the cancel USC 408, and a warning 431 regarding performance of a scan tool function. In the implementation in which the scan tool function is the liftgate maximum open position learn scan tool function, the warning 431 pertains to that scan tool function. A U/I screen with a warning regarding performance of a different scan tool function can include a warning regarding performance of that different scan tool function. The processor 72 can output a U/I screen with a warning regarding performance of a scan tool function after selection of the scan tool function but before performance of the scan tool function. The continue USC 406 within the U/I screen 429 is selectable to display another U/I screen pertaining to performance of the liftgate maximum open position learn scan tool function such as the U/I screen 435 shown in FIG. 22.

Figure 22:
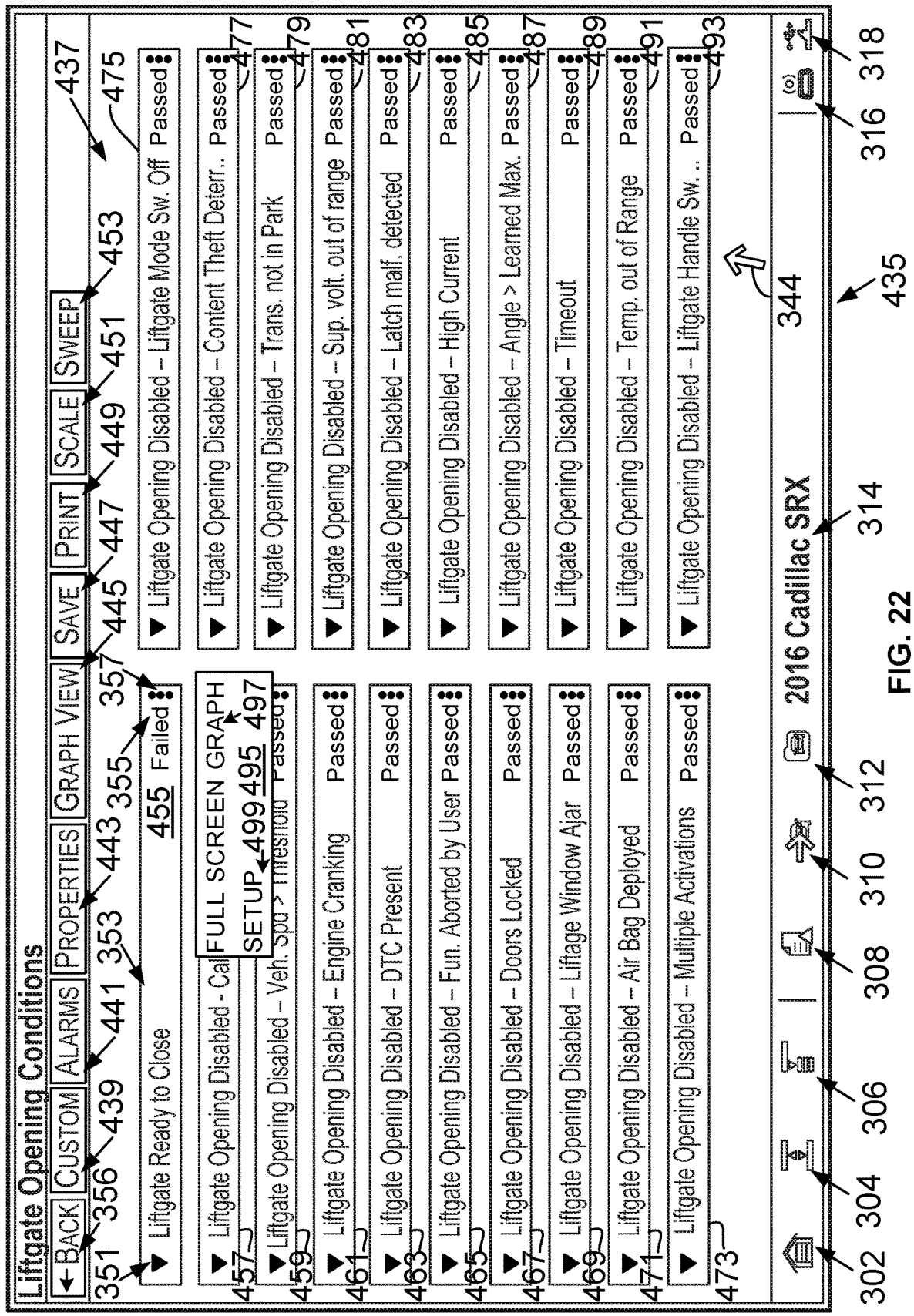

Next, FIG. 22 shows the U/I screen 435. The U/I screen 435 includes a set of PID cards 437 associated with a scan tool function and the scanner job that includes performing the scan tool function. The U/I screen 435 also includes the back USC 356, a custom USC 439, an alarms USC 441, a properties USC 443, a graph view USC 445, a save USC 447, a print USC 449, a scale USC 451, and a sweep USC 453. The back USC 356 is selectable to cause the processor 72 to display a previously-displayed U/I screen, such as the U/I screen 429 shown in FIG. 21. The custom USC 439 is selectable to cause the processor 72 to initiate creation of a custom list of PID cards within the memory 80 and/or at the server 16, 150.

The set of PID cards 437 includes PID card 455, 457, 459, 461, 463, 465, 467, 469, 471, 473, 475, 477, 479, 481, 483, 485, 487, 489, 491, 493. In at least some implementations, a PID card includes a PID card size USC 351, a PID card identifier 353, a PID parameter value 355, and/or a PID card menu USC 357. The processor 72 is configured to change a size of a PID card from a first size to a second size in response to selection of the PID card size USC 351 while the PID card is displayed using the first size, and to change the size of the PID card from the second size to the first size in response to selection of the PID card size USC 351 while the PID card is displayed using the second size. In at least some implementations, the first size covers a smaller area of the display 84 than the second size. The PID parameter value 355 for each PID card can indicate a current and/or most-recent parameter value of a PID indicated by the PID card identifier 353. As an example, PID parameter values can be a state value, such as passed, failed, on, off, or a numeric value with units such as volts, millivolts, amps, milliamps, revolutions per minute, kilometers per hour, miles per hour, pound per square inch, kilopascals, degrees Celsius, degrees Fahrenheit, among others.

FIG. 22 also shows a menu window 495 that can be displayed on the display 84, overlaid upon the U/I screen 435, in response to the processor 72 determining the PID card menu USC 357 was selected. As an example the PID card menu USC 357 can be selected by moving the cursor 344 above the PID card menu USC 357 or selecting the display 84, in proximity to the PID card menu USC 357, by hand. The menu window 495 includes a full screen graph USC 497 and a setup USC 499. Moving the cursor off of the PID card menu USC 357 and/or outside of the menu window 495 can cause the processor 72 to stop displaying the menu window 495 while the U/I screen 435 is displayed. Selection of the full screen graph USC 497 can cause the processor 72 to output the U/I screen 525 shown in FIG. 25 to the display 84. Selection of the setup USC 499 can cause the processor 72 to output the U/I screen 511 shown in FIG. 24 to the display 84.

Figure 23:
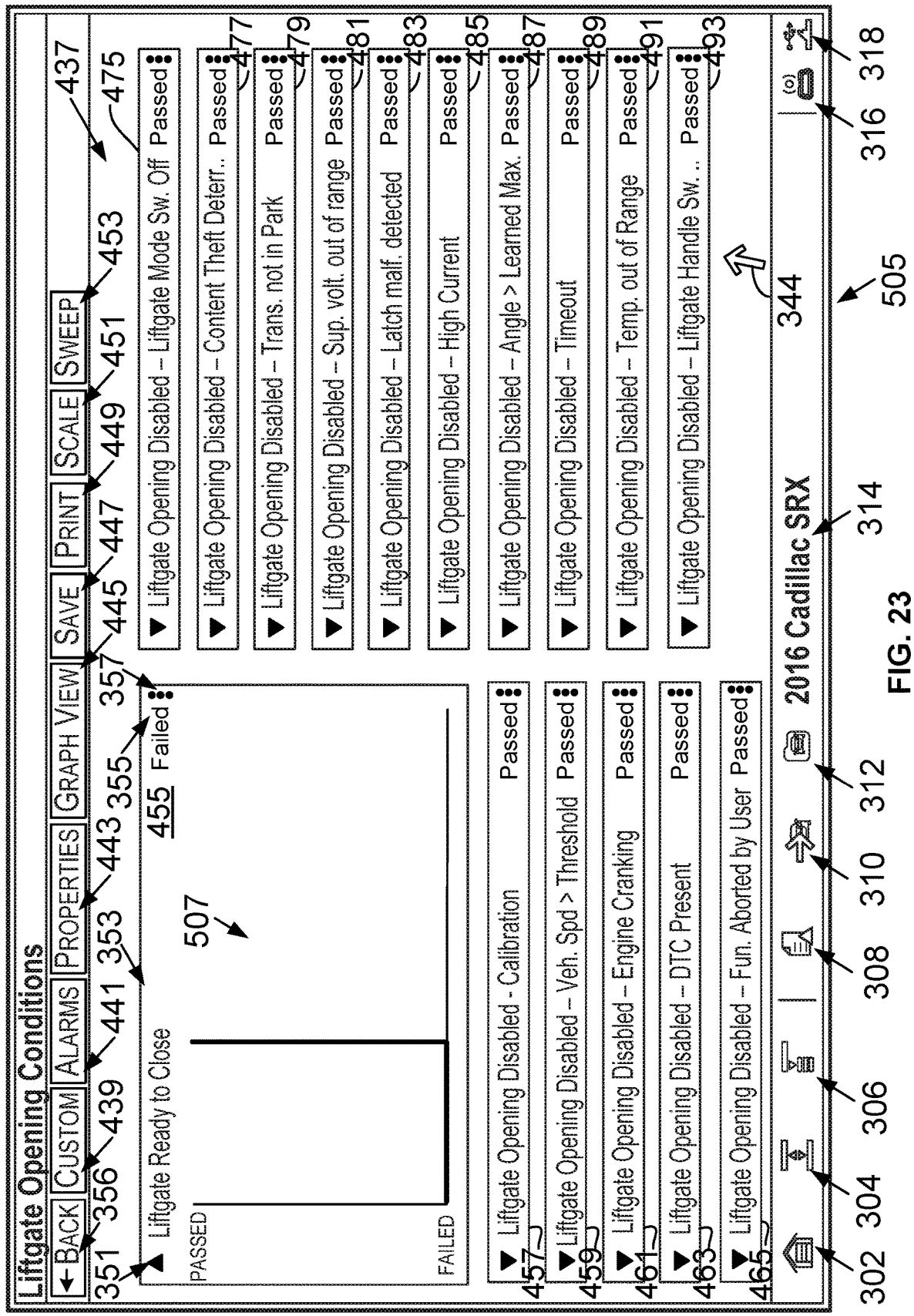

Next, FIG. 23 shows a U/I screen 505. The U/I screen 505 includes a portion of the set of PID cards 437. In particular, that portion includes PID cards 455 to 465 and 475 to 493. Moreover, the U/I screen 505 shows the PID card 455 in an intermediate expanded state. The intermediate expanded state of a PID card exists when a size of the PID card is greater than a minimum size of the PID card and less than a maximum size of the PID card. In an example implementation, displaying the PID card using the maximum size of the PID card includes displaying the PID card such that the PID card covers an entirety of a screen of the display 84. In another example implementation, displaying the PID card using the maximum size of the PID card includes displaying the PID card such that the PID card covers a majority of the entirety of the screen of the display without displaying any other PID card. Furthermore, the PID card 455 includes a graph 507 of the parameter value represented by the PID card 455.

In an example implementation, the U/I screen 505 is displayed in response to the processor 72 determining that the PID card size USC 351 in the PID card 455 is selected while the U/I screen 435 (shown in FIG. 22) is displayed. As shown in FIG. 23 as compared to FIG. 22, the PID card size USC 351 in the PID card 455 is shown as having been rotated one hundred eighty degrees. In an example implementation, the U/I screen 435 shown in FIG. 22 is displayed in response to the processor 72 determining that the PID card size USC 351 in the PID card 455 is selected while the U/I screen 505 is displayed.

Figure 24:
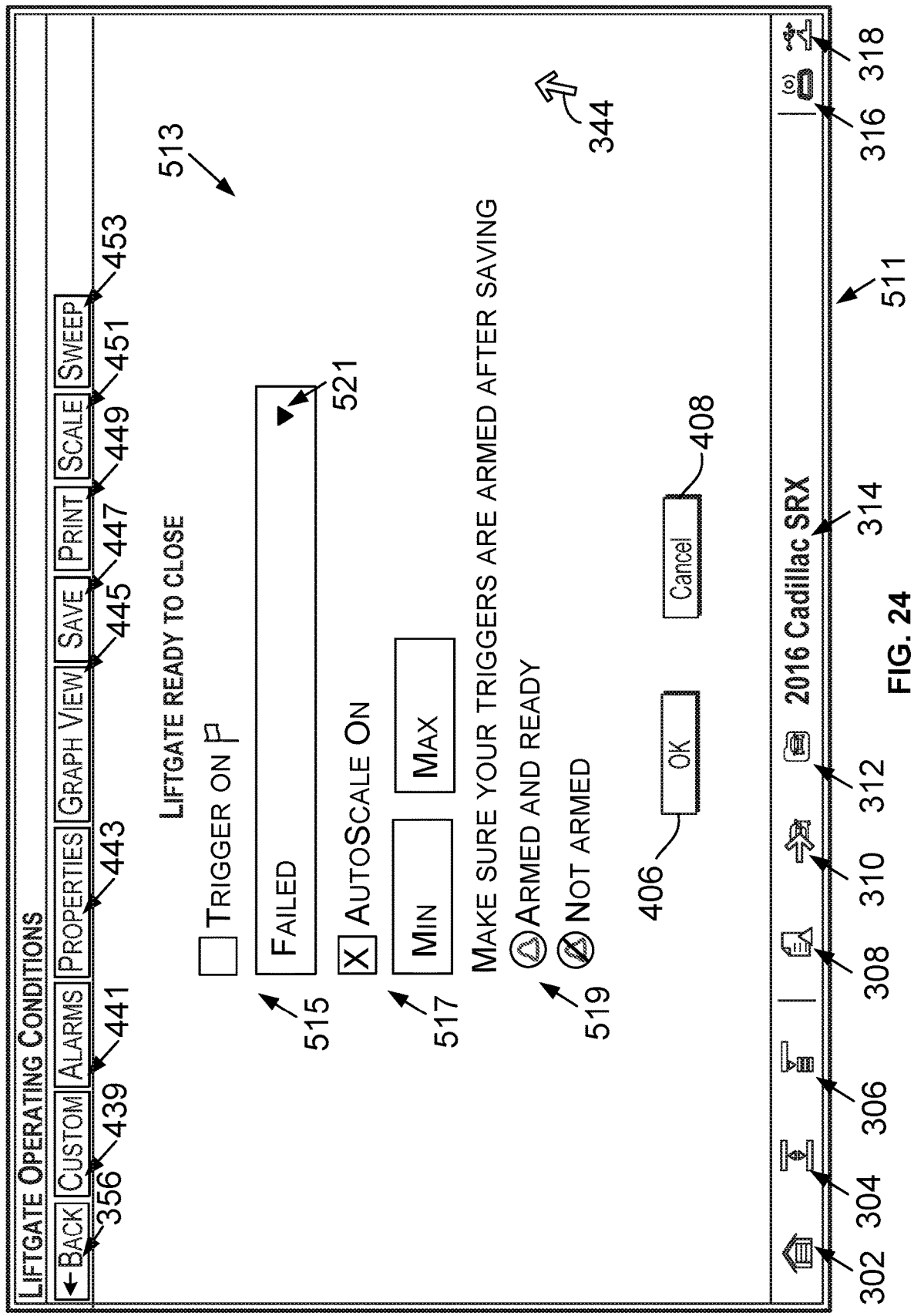

Next, FIG. 24 shows the U/I screen 511. The U/I screen 511 includes PID card setup USCs 513. The PID card setup USCs 513 include a trigger USC 515, a scale USC 517, and trigger indicators 519. The trigger USC 515 can include a dropdown menu USC 521 selectable to cause the display 84 to display multiple selectable triggers. In accordance with the example implementations, a trigger associated with a PID can include a trigger value that upon being reached causes the processor 72 to store parameter values associated with the PID. The stored parameter values can include parameter values that were received prior to detection of the trigger value being reached, the parameter value(s) upon which the determination the trigger value was reached is based, and/or parameter values were received after detection of the trigger value being reached. The U/I screen 511 can be displayed in response to the processor 72 determining the setup USC 499 shown in FIG. 22 was selected. In at least some implementations, selection of the continue USC 406 or the cancel USC 408 causes the processor 72 to output the U/I screen 435 to the display 84.

Figure 25:
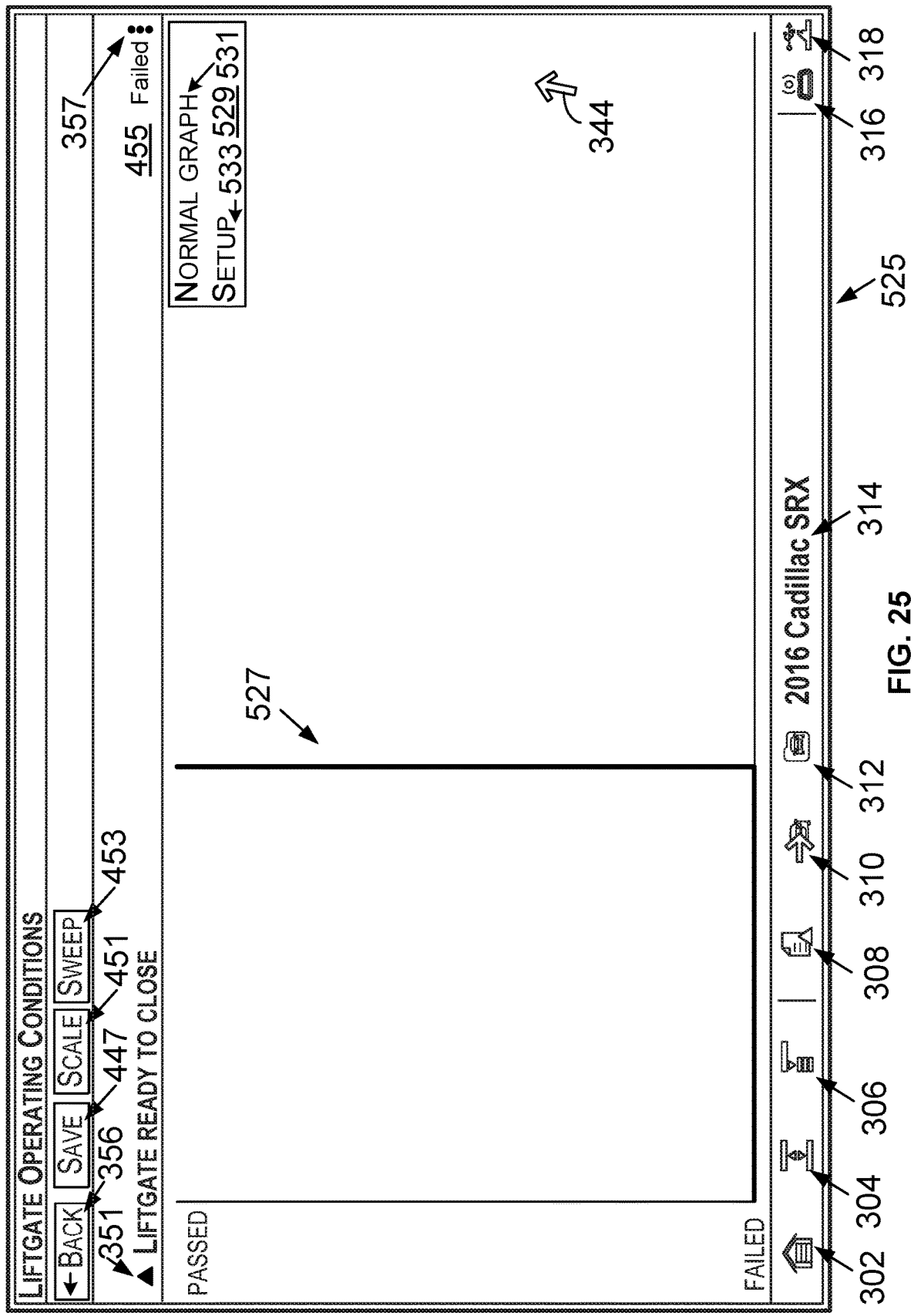

Next, FIG. 25 shows the U/I screen 525. The U/I screen 525 includes the PID card 455 displayed in an intermediate expanded state or a maximum size expanded state. The PID card 455 includes a graph 527 of the parameter value represented by the PID card 455.

FIG. 25 also shows a menu window 529 that can be displayed on the display 84, overlaid upon the U/I screen 525, in response to the processor 72 determining the PID card menu USC 357 was selected. As an example the PID card menu USC 357 can be selected by moving the cursor 344 above the PID card menu USC 357 or selecting the display 84, in proximity to the PID card menu USC 357, by hand. The menu window 529 includes a normal graph USC 531 and a setup USC 533. Moving the cursor off of the PID card menu USC 357 and/or outside of the menu window 529 can cause the processor 72 to stop displaying the menu window 529 while the U/I screen 525 is displayed. Selection of the normal graph USC 531 can cause the processor 72 to output the U/I screen 555 shown in FIG. 23 to the display 84. Selection of the setup USC 533 can cause the processor 72 to output the U/I screen 511 shown in FIG. 24 to the display 84.

Figure 26:
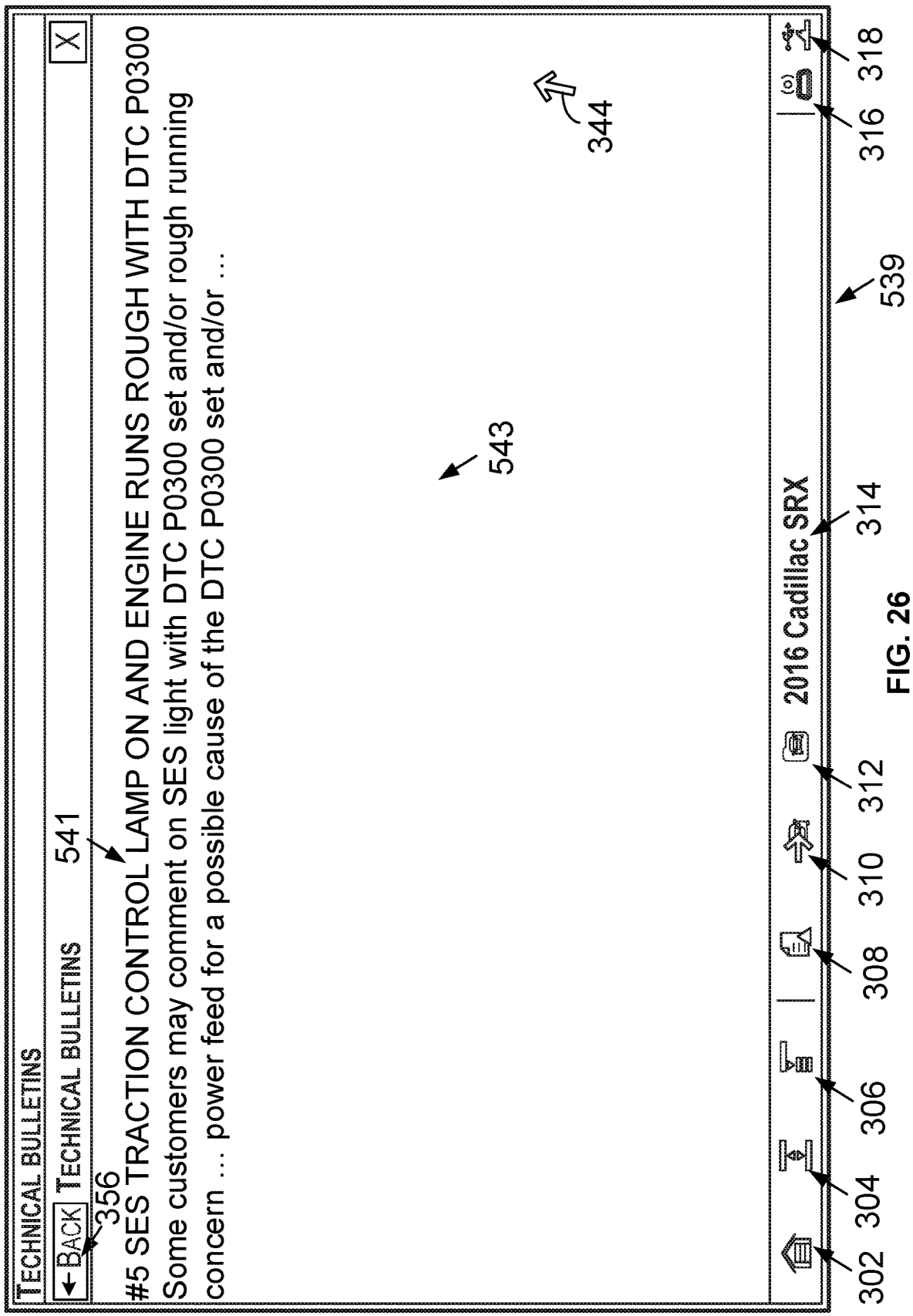

Next, FIG. 26 shows a U/I screen 539. The U/I screen 539 includes a TSB USC 541. In accordance with at least some implementations, the TSB USC 541 includes an identifier of a TSB. As an example, the identifier of the TSB can include a title of the TSB. The title can indicate the subject matter of the TSB. As another example, the identifier of TSB can include a numerical identifier that includes one or more numbers indicative of a calendar year or a model year of a vehicle, and one or more alphanumeric characters indicative of a sequence number pertaining to when the TSB was published. As yet another example, the identifier of the TSB can include a textual portion of the TSB.

The U/I screen 539 includes a single TSB USB representative of a single TSB. This corresponds to the quantity indicator 413 displayed on the service information USC 405 shown in FIG. 19. In implementations in which a quantity indicator in a service information USC indicates a quantity greater than one, a U/I screen including a TSB USC for one of the multiple TSBs represented by quantity indicator can include a respective TSB USB for each of multiple TSBs.

In accordance with at least some implementations, the U/I screen 539 is displayed on the display 84 in response to a selection of the service information USC 405 shown in FIG. 18, FIG. 19. In accordance with those or other implementations, the U/I screen 539 is displayed on the display 84 in response to selection of the back USC 356 while a U/I screen 547 (shown in FIG. 27) is displayed on the display 84.

Figure 27:
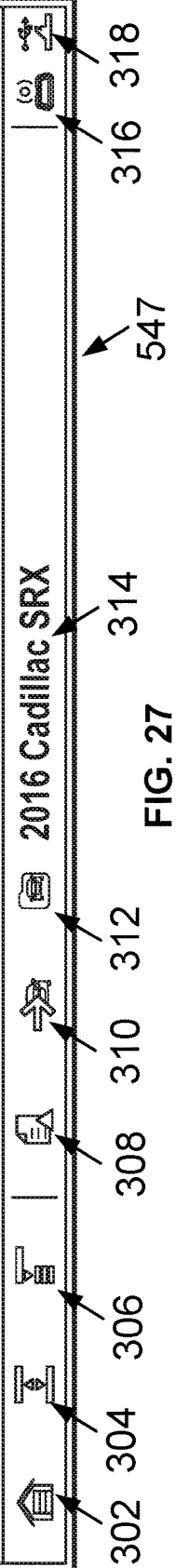

Next, FIG. 27 shows the U/I screen 547. The U/I screen 547 includes a TSB 549. A TSB, such as the TSB 549, can include text and/or an image pertaining to the subject of the TSB. The U/I screen 547 can be displayed in response to a selection of the TSB USC 541 shown in FIG. 26.

Next, FIG. 28 shows a U/I screen 555. The U/I screen 555 can include repair information 567 discovered during a search for repair information. The search can be carried out based on search criteria, such as "liftgate actuator," entered into a search field 557. In accordance with at least some implementations, the repair information 567 includes search results 559 that indicate repair information terms including the search criteria. Moreover, in accordance with those implementations or other implementations, the repair information 567 includes repair information 561 discovered based on one or more keywords associated with the search criteria, and/or repair information 563 related to the search criteria. In still further implementations, the U/I screen 555 includes a quantity indicator 565 for each respective type of repair information shown on the U/I screen 555. The quantity indicator 565 can indicate how many different pieces of repair information were discovered for that type of repair information. In at least some implementations, the U/I screen 555 can be displayed in response to a selection of the repair information mode USC 411 shown in FIG. 18, FIG. 19.

Figure 29:
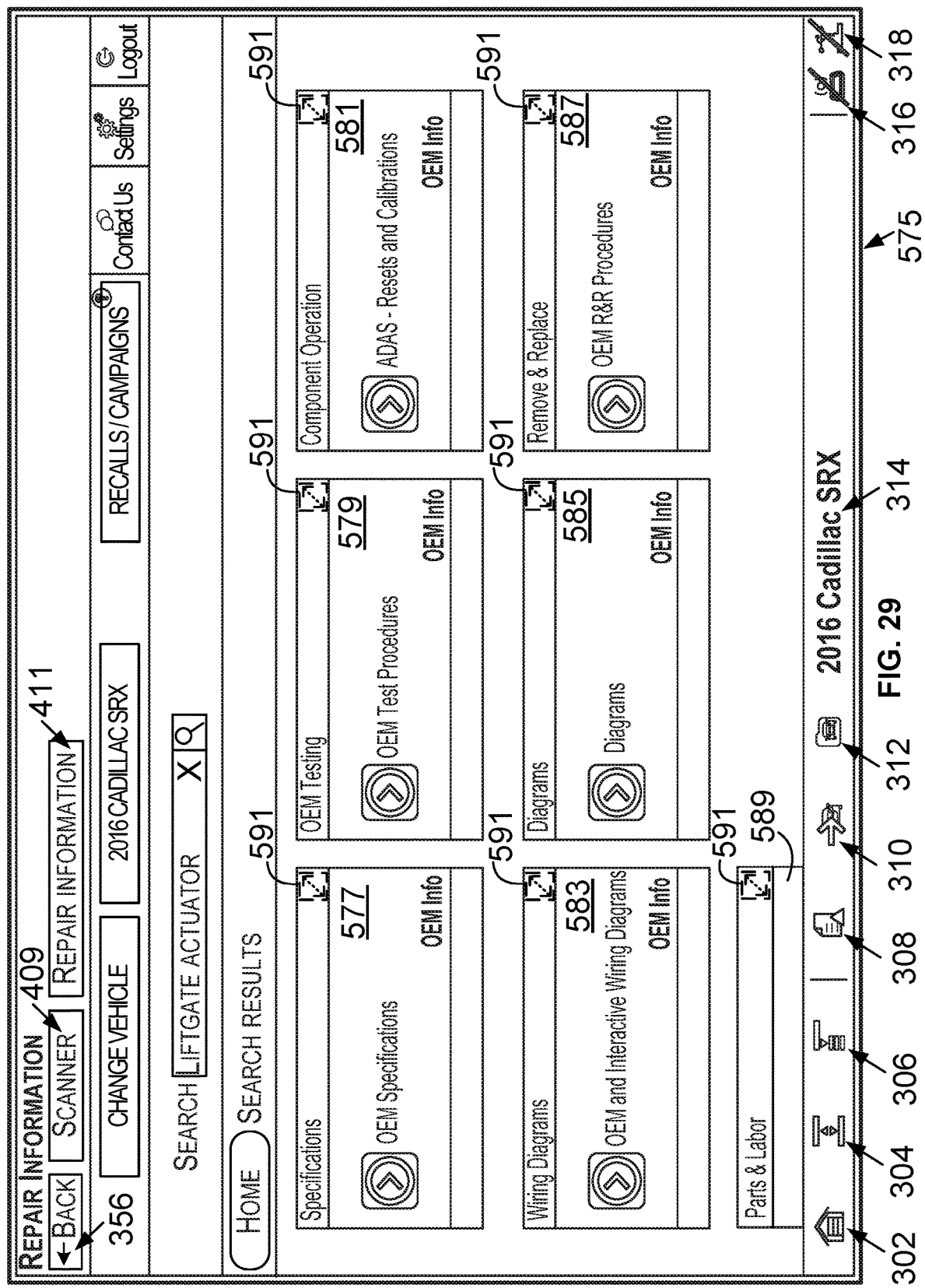

Next, FIG. 29 shows a U/I screen 575. The U/I screen 575 includes repair information USC 577, 579, 581, 583, 585, 587, 589 selectable to cause the processor 72 to output repair information associated with the selected repair information USC. As shown in FIG. 29, each of the repair information USC 577, 579, 581, 583, 585, 587, 589 includes a textual identifier of the type of repair information that can be displayed in response to selection of the repair information USC 577, 579, 581, 583, 585, 587, 589, and further includes an expander USC 591. In accordance with an example implementation, the repair information can be output in response to the processor 72 determining the repair information USC 577, 579, 581, 583, 585, 587, 589 is selected. In accordance with those or other implementations, the repair information associated with one of the repair information USC 577, 579, 581, 583, 585, 587, 589 can be output in response to the processor 72 determining the expander USC 591 with the one of the repair information USC 577, 579, 581, 583, 585, 587, 589 is selected.

In accordance with at least some example implementations, the U/I screen 575 can be displayed in response to a selection of the repair information mode USC 411 shown in FIG. 18, FIG. 19. In accordance with those other implementations, the U/I screen 575 can be displayed in response to one of the search results 559, such as the search result indicative of liftgate actuator, shown in FIG. 28.

Next, FIG. 30 shows the U/I screen 575 with a popup U/I 601 overlaid thereon. In accordance with the example implementations, the popup U/I 601 can be displayed in response to selection of an expander USC 591, such as the expander USC 591 within the repair information USC 587 shown in FIG. 29. In accordance with those implementations or others, the popup U/I 601 can be displayed in response to selection of the repair information USC 587.

The popup U/I 601 includes repair information 603 pertaining to removing and replacing a liftgate actuator on a vehicle identified by the vehicle indicator 314, and repair information 604 pertaining to removing and replacing an anti-theft/lock system on that same vehicle. The repair information 605 could be presented along with the repair information 603 in response to selecting the repair information USC 587 pertaining to a liftgate actuator because the anti-theft/lock system has to be removed before removing the liftgate actuator and then replaced after the liftgate actuator has been replaced or for some other reason.

The popup U/I 601 includes expander USC 609, 611. As shown in FIG. 30, the expander USC 609 is in a state in which the repair information 603 includes an indicator 617 that indicates the repair information 603 pertains to a liftgate actuator, but does not show any additional repair information. In contrast, the expander USC 611 is in a state in which the repair information 605 includes an indicator 619 that indicates the repair information 605 pertains to the anti-theft/lock system and repair information 607 pertaining to the anti-theft/lock system.

The popup U/I 601 includes a back USC 613, 615 selectable to cause the processor 72 to stop displaying the popup U/I 601 such that the portion of the U/I screen 575 underneath the popup U/I 601 is visible on the display 84.

Figure 31:
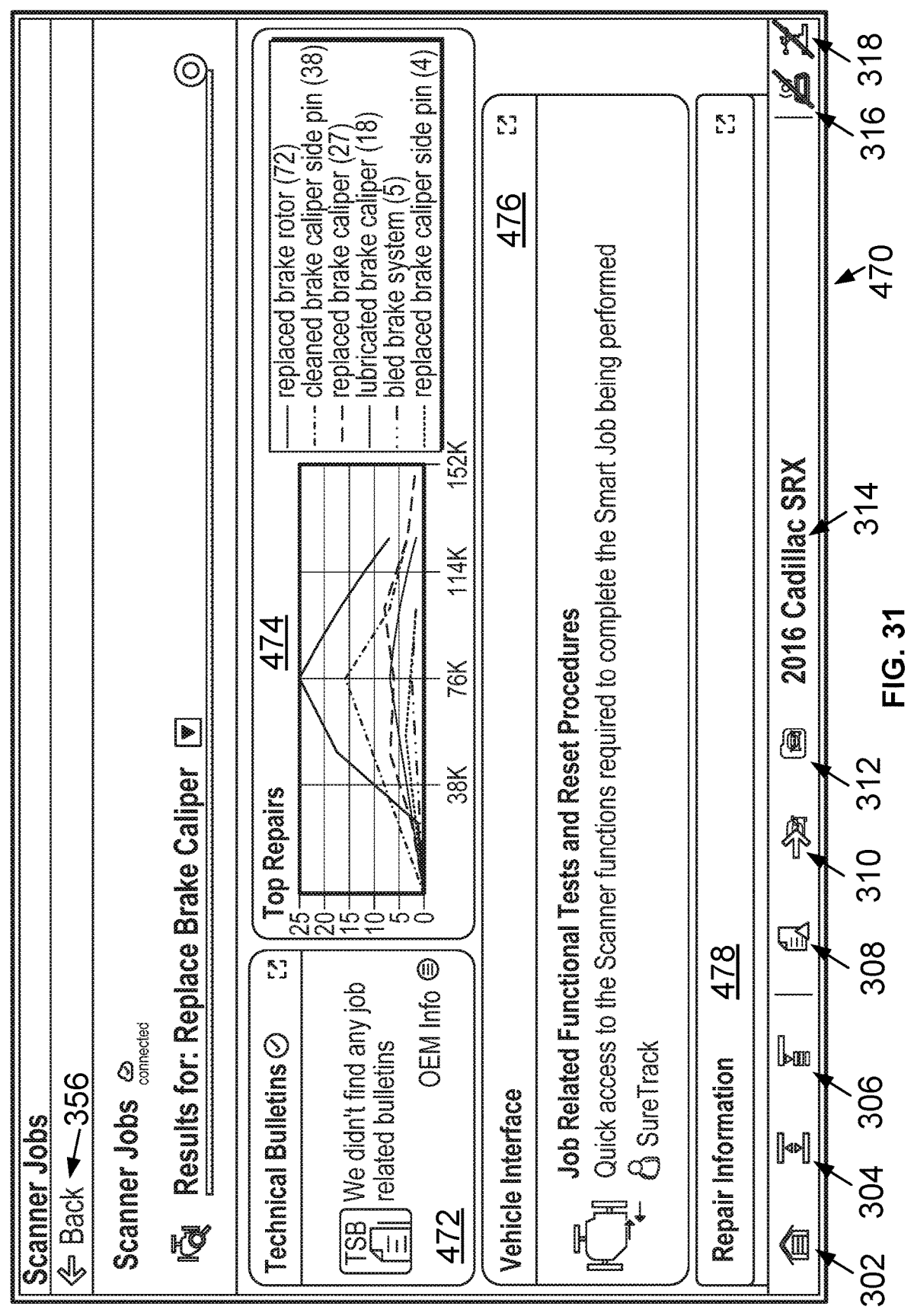

Next, FIG. 31 to FIG. 36 show U/I screens pertaining to a scanner job for replacing a brake caliper that can be displayed. FIG. 31 shows a U/I screen 470 including content regarding the scanner job replace brake caliper. The content of the U/I screen 470 includes a technical bulletins USC 472, top repairs user-selectable data 474, a vehicle interface USC 476, and a repair information USC 478. The technical bulletins USC 472 is selectable to cause the processor 72 to display a TSB pertaining to the identified vehicle. The top repairs user-selectable data 474 shows quantities of repairs made to instances of the identified vehicle and the mileage on the vehicle to which each repair was made. The vehicle interface USC 476 is selectable to display a U/I screen showing USCs for scan tool functions associated with the scanner job replace brake caliper. The repair information USC 478 is selectable to display repair information on the display 84, such as displaying repair information in a U/I window 512 shown in FIG. 34 and/or displaying a U/I screen showing one or more additional repair information USC, such as U/I screen 510 shown in FIG. 34. In an example implementation, the processor 72 can output the U/I screen 470 to the display 84 in response to determining that the scanner job USC 444 is selected while the U/I screen 440 (shown in FIG. 17) is displayed on the display 84, or in response to selecting the back USC 356 from a U/I screen shown in response to selecting a USC displayed on the U/I screen 470. A person skilled in the art will understand that the processor 72 can output a U/I screen like the U/I screen 470 except that the USCs and/or data is related to a different vehicle component on the identified vehicle.

Figure 32:
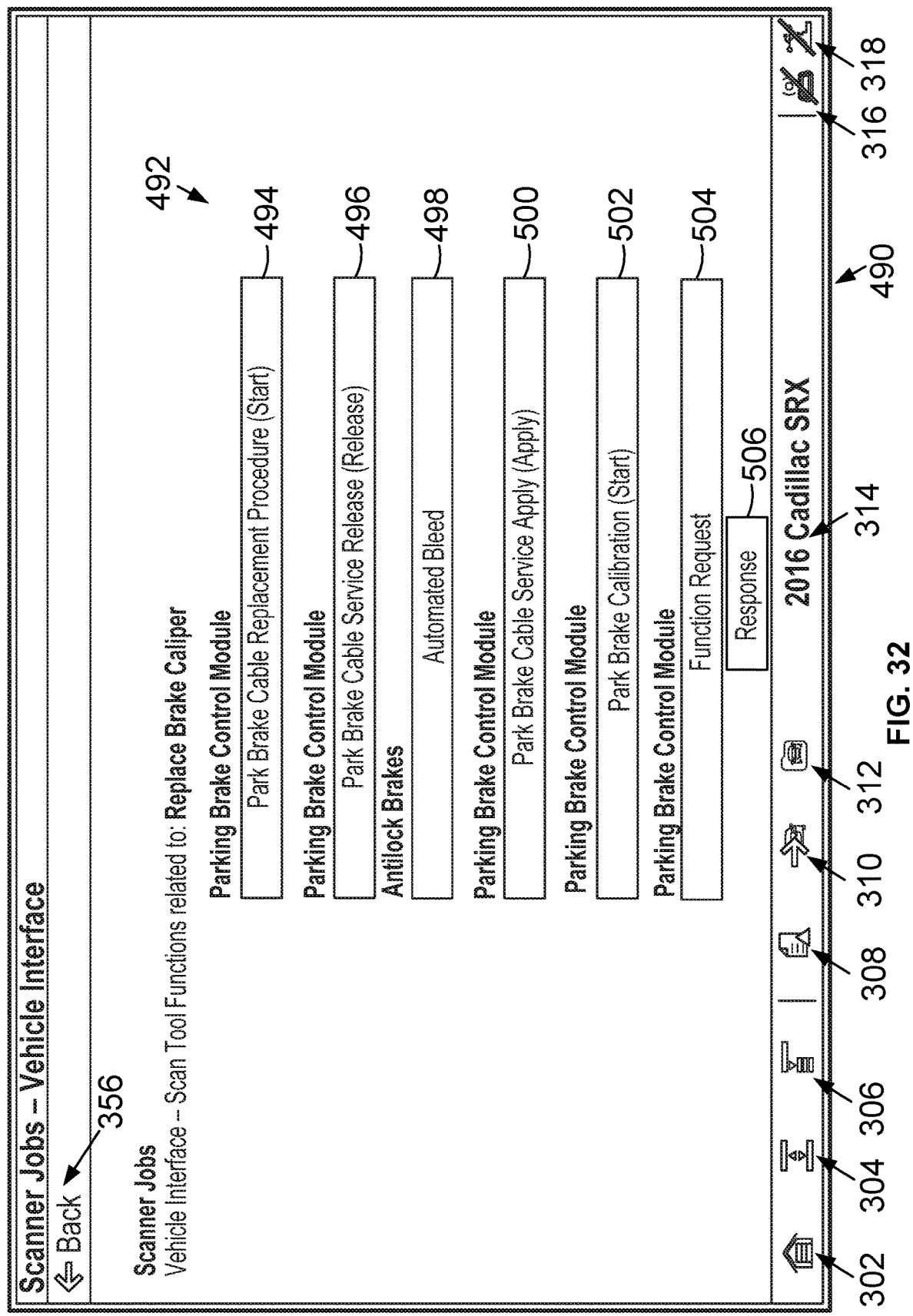

Next, FIG. 32 shows a U/I screen 490 including scanner job USCs 492. The scanner job USCs 492 include scanner job USC 494, 496, 498, 500, 502, 504 for selecting a scan tool function associated with a selected scanner job. In an example implementation, selecting a USC for selecting a scan tool function causes the display 84 to display a different U/I screen that includes a U/I screen with a USC selectable to cause the VCT 76 to transmit a VDM to the identified vehicle. In another example implementation, selecting a USC for selecting a scan tool function causes the VCT 76 to transmit a VDM to the identified vehicle.

As example, the scanner job USC 494 is selectable to select a scan tool function regarding replacing a park brake cable on the identified vehicle. As yet another example, the scanner job USC 496 is selectable to select a scan tool function regarding releasing a park brake cable on the identified vehicle. Performance of that scan tool function can include the parking brake control module releasing tension on a brake cable so that brake pads can be removed from the vehicle. As yet another example, the scanner job USC 498 is selectable to select a scan tool function regarding automatically bleeding brakes on the identified vehicle. As yet another example, the scanner job USC 500 is selectable to select a scan tool function regarding applying a park brake cable on the identified vehicle. As still yet another example, the scanner job USC 502 is selectable to select a scan tool function regarding calibrating a park brake on the identified vehicle.

In an example implementation, the scanner job USCs 492, or a portion thereof (such as the scanner job USC 494 to the scanner job USC 502), can be arranged in an order in which scan tool functions for the scanner job of replacing the brake caliper are to be performed. For instance, the scanner job USC 494 can be associated with an initial scan tool function for the scanner job and the scanner job USC 502 can be associated with a final scan tool function for the scanner job.

In an example implementation, the USC 504 can be selectable to cause the VCT 76 to send a VDM to the identified vehicle. As an example, the VDM sent in response to selection of the USC 504 can include a parameter request that includes a PID pertaining to the identified scanner job. In response to transmitting the VDM, the VCT 76 can receive a response including a PID data value pertaining to the identified scanner job and cause that PID data value to be displayed in a response segment 506 of the U/I screen 490. As another example, the VDM sent in response to selection of the USC 504 can include VDM to perform a scan tool function in the control category, such as a scan tool function to read or clear DTC in the parking brake control module of the identified vehicle. In response to transmitting the VDM, the VCT 76 can receive a response indicating a status of the parking brake control module, such as a status indicating which DTC are set in the vehicle or a status indicating the DTC were successfully cleared.

In accordance with an example implementation, selecting a USC among the scanner job USC 494 to the scanner job USC 502 can cause the processor 72 to transmit a request to the server 16, 150 using the network transceiver 74. As an example, the request can include data indicative of the identified vehicle, the selected scanner job, and the scan tool function associated with the selected USC. The processor 72 can receive a response to the request from the server 16, 150. As an example, the response can include guidance to display in proximity to a USC configured to cause transmission of a VDM to perform the scan tool function. The guidance can be related to the scan tool function. As another example, the response can indicate a status of whether a diagnostic tool in a distributed diagnostic tool implementation is available to transmit the VDM.

The processor 72 can determine which scan tool functions pertain to the scanner job selected for the identified vehicle by searching the scanner jobs 85 based on the identified vehicle (e.g., the vehicle identifier associated with the identified vehicle) and the selected scanner job. As an example, the processor 72 can search the scanner jobs 85, such as the table 100 shown in FIG. 5, to determine that the five scan tool functions at the top of the table 100 are associated with the scanner job for replace brake caliper on a 2016 CADILLAC® SRX. In an example implementation, the processor 72 can retrieve a U/I screen template for five scan tool functions from the U/I screens 89 and populate the U/I screen template with the data regarding the five scan tool functions from the scanner jobs 85.

In an example implementation, the processor 72 can output the U/I screen 490 to the display 84 in response to determining that the scanner job USC 444 is selected while the U/I screen 440 is displayed on the display 84, in response to selecting the vehicle interface USC 476 while the U/I screen 470 is displayed, or in response to selecting the back USC 356 from a U/I screen shown in response to selecting a USC displayed on the U/I screen 490.

Next, FIG. 33 shows a U/I screen 380 that the processor 72 can output to the display 84 in response to determining that the scanner job USC 494 was selected while the U/I screen 490 is displayed. The U/I screen 380 includes an indicator 388 showing a descriptor of the scanner job selected by selection of the scanner job USC 494. The U/I screen 380 includes guidance 382 for performing the scanner job indicated by the indicator 388. The U/I screen 380 includes continue USC 406 selectable to cause the VCT 76 to transmit a VDM to the identified vehicle in order to perform the scanner job and/or to display another U/I screen pertaining to transmitting the VDM to perform the scanner job. The U/I screen 380 includes a cancel USC 408 to cause the processor 72 to exit a mode in which the display 84 is displaying the U/I screen 380 and responsively display a different U/I screen, such as the prior displayed U/I screen 490. Likewise, selecting the scanner job USC 496, 498, 500, 502, 504 can cause the processor 72 to output a U/I screen like the U/I screen 490 except that the indicator 388 and the guidance 382 pertain to the scanner job selectable using the scanner job USC 496, 498, 500, 502, 504, respectively, instead of the scanner job USC 494.

Figure 34:
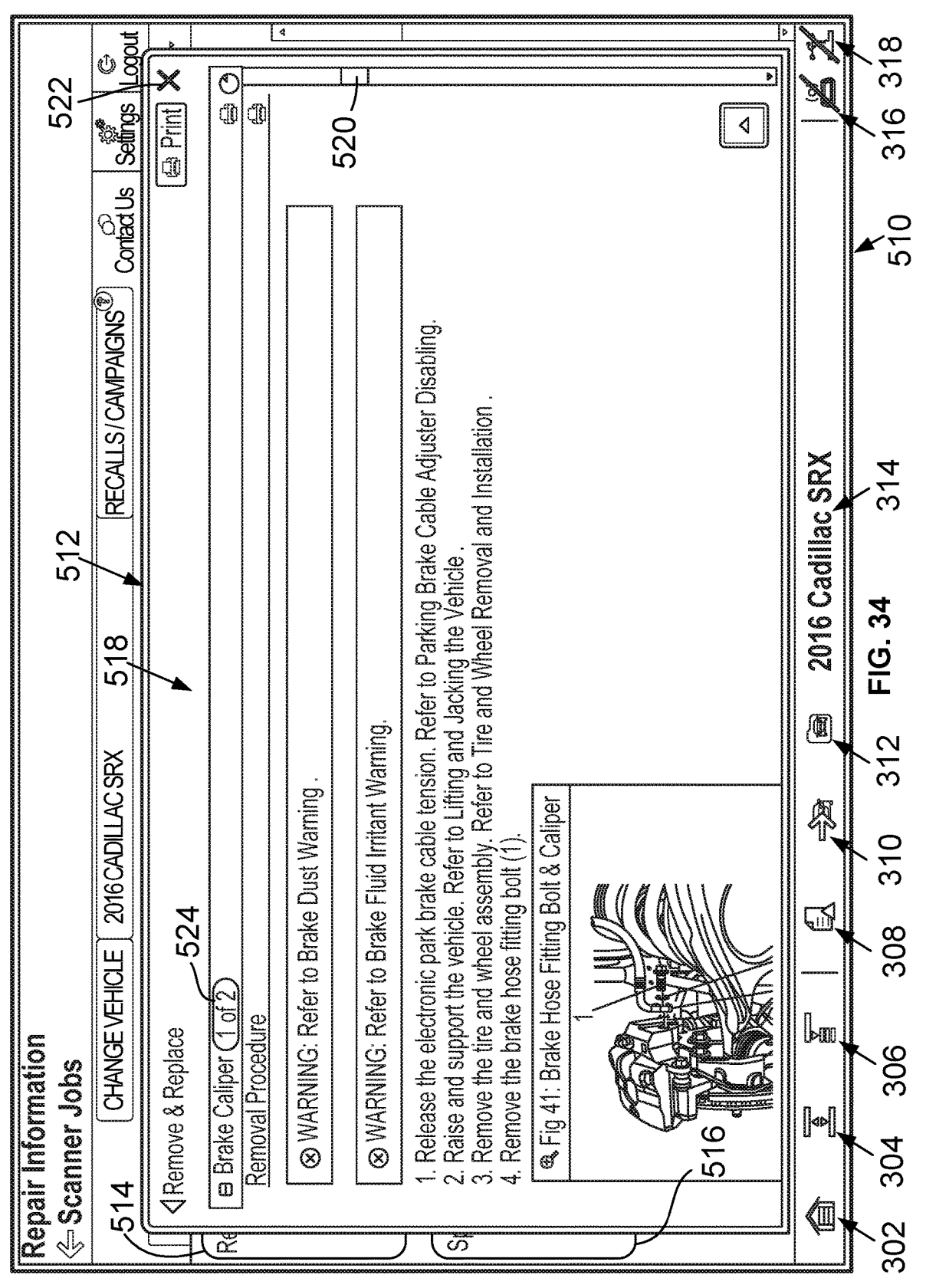

Next, FIG. 34 shows a U/I screen 510 in which a U/I window 512 is overlaid upon the U/I screen 510. The U/I screen 510 is an example of a U/I screen that can be displayed in response to selection of a repair information USC, such as the repair information USC 478 shown in FIG. 31. The U/I screen 510 includes one or more repair information USC selectable to display a particular portion of repair information regarding the selected scanner job. As an example, the USCs of the U/I screen 510 can include repair information USC 514 regarding remove and replace guidance, and a repair information USC 516 regarding specification guidance. The U/I window 512 can be displayed in response to selection of the repair information USC 514. The U/I window 512 includes guidance 518 that pertains to the scanner job regarding replacing a brake caliper on the identified vehicle. The U/I window 512 includes a vertical slider 520 selectable to display additional portion(s) of the guidance 518 above or below the guidance shown in FIG. 34. The U/I window 512 can include a horizontal slider to show additional portions of the guidance 518 to the left or right of the guidance shown in FIG. 34. The U/I window 512 include a selector 522 selectable to close the U/I window 512 so that the index of the U/I screen 510 is not obstructed by the U/I window 512.

The U/I window 512 includes a guidance portion selector 524 indicating "1 of 2." The indication "1 of 2" indicates at least a portion of a first of two portions of the guidance is displayed on the U/I screen. As an example, the first portion of the guidance can be guidance specific to a component of interest and/or the identified vehicle, whereas the second portion of the guidance can be guidance regarding multiple components similar to the component of interest and/or the identified vehicle. For instance, the first portion of guidance 518 can include guidance regarding the particular brake caliper installed on the identified vehicle, whereas the second portion of the guidance 518 can include guidance regarding brake calipers in general. In another implementation, the last number of the guidance portion selector 524 can be a number other than two (2) to indicate a different number of portions of guidance are available. The processor 72 can cause the display 84 to display a different portion of the guidance indicated by the guidance portion selector 524 in response to determining selection of guidance portion selector 524 has occurred.

In an example implementation, the one or more repair information USC on the U/I screen 510, the U/I screen 510, and/or the guidance 518 can be obtained directly from the memory 80 without having to request content of the one or more repair information USC, the U/I screen 510, and/or the guidance 518 from a server, such as the server 16, 150. In another example implementation, the processor 72 can cause the network transceiver 74 to transmit to the server 16, 150 a request for at least a portion of the one or more repair information USC, the U/I screen 510, and/or the guidance 518. The network transceiver 74 can receive from the server 16, 150 a response including at least a portion of the one or more repair information USC, the U/I screen 510, and/or the guidance 518 for storing in the memory 80 and/or displaying on the display 84. As an example, the request sent to the server 16, 150 can include the vehicle identifier and one or more of: an identifier of a component of interest and an identifier of a scanner job.

Figure 35:
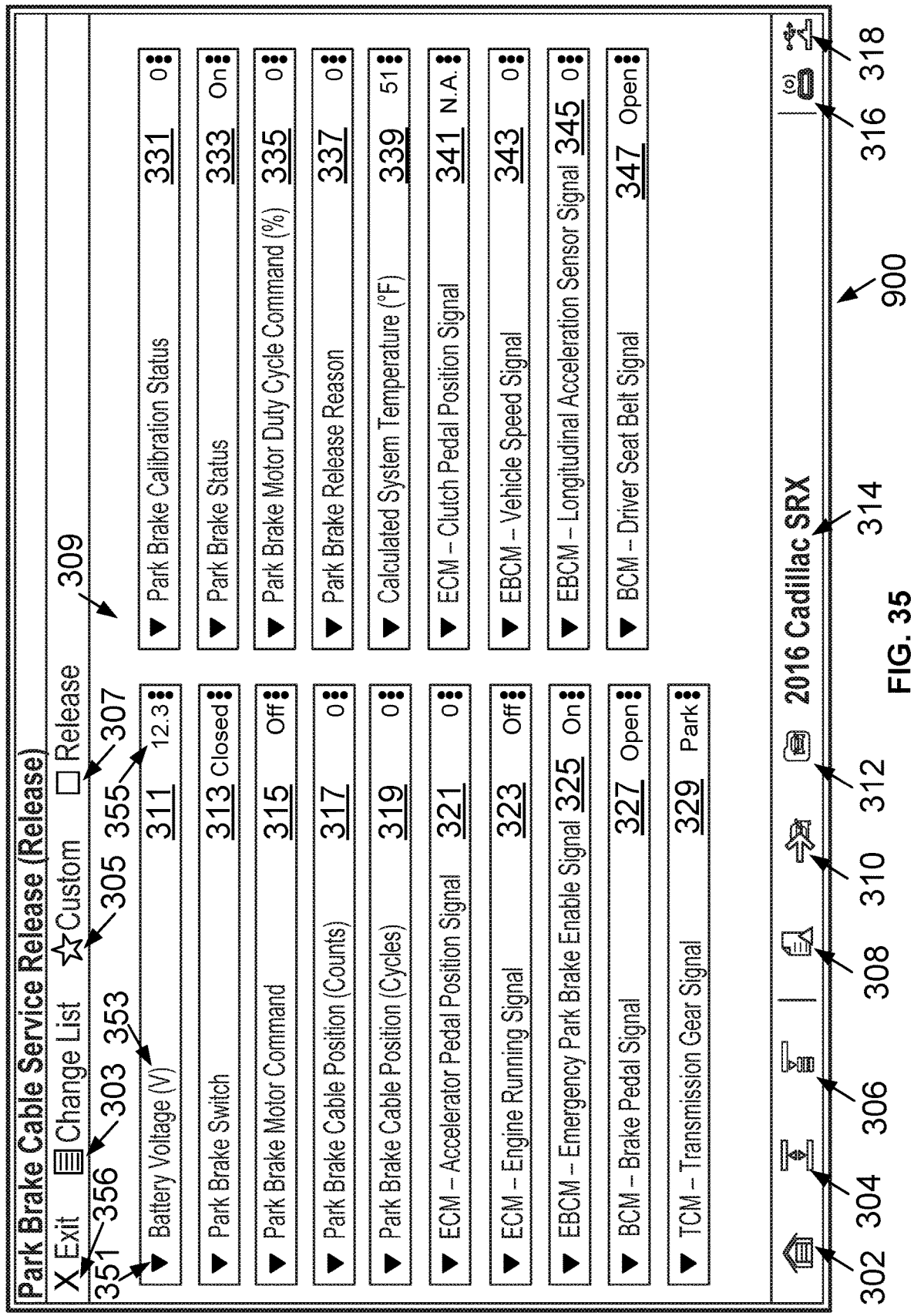
Figure 36:
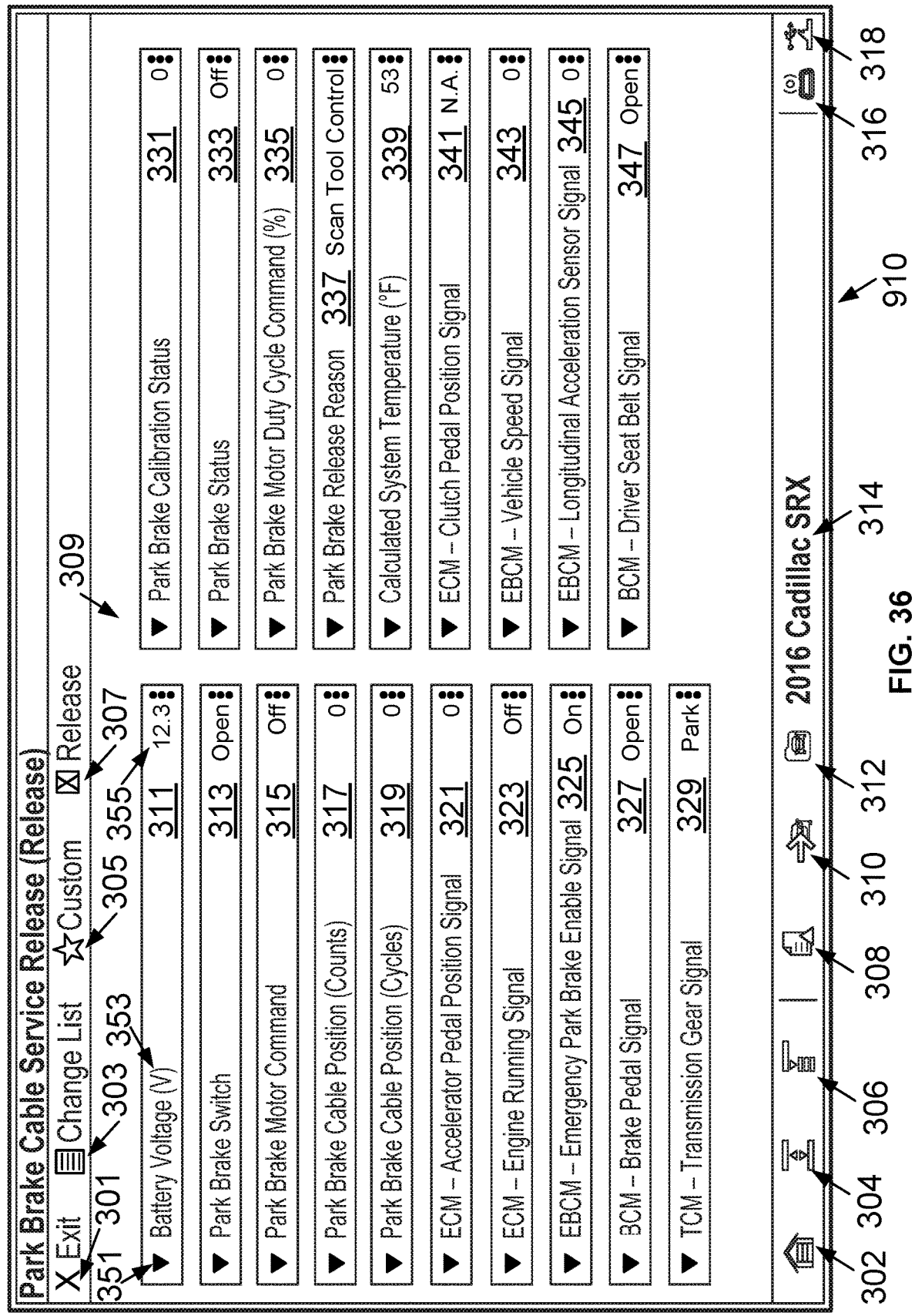

Next, FIG. 35 shows a U/I screen 900 and FIG. 36 shows a U/I screen 910. Both of the U/I screens 900, 910 pertain to the scan tool function for releasing the park brake cable on the identified vehicle and the scanner job pertaining to replacing the brake caliper on the identified vehicle. The U/I screens 900, 910 include a back USC 356 selectable to cause the processor 72 to display a previously-displayed U/I screen, such as the U/I screen 490 shown in FIG. 32. The U/I screens 900, 910 include PID data for a set of PID cards 309, a USC 303 to initiate changing which PID cards are shown in the set of PID cards 309, a USC 305 to cause the processor 72 to save a custom list of PID cards within the memory 80 and/or at the server 16, 150, and a release USC 307 selectable to cause the VCT 76 to transmit a VDM to cause the park brake control module to release the park brake cable if the park brake cable is not currently released (e.g., retracted) or to cause the VCT 76 to transmit a VDM to cause the park brake control module to retract the park brake cable if the park brake cable is currently released.

As an example, the set of PID cards 309 includes PID card 311, 313, 315, 317, 319, 321, 323, 325, 327, 329, 331, 333, 335, 337, 339, 341, 343, 345, 347. As an example, each PID card can include a PID card size USC 351, a PID card identifier 353, and a PID parameter value 355. The PID card size USC 351 can be selectable to increase the size of PID card including the PID card size USC 351 when the PID card is displayed in its decreased size and selectable to decrease the size of the PID card when the PID card is displayed in its increased size. A PID card can display further information, such as a graph of the PID parameter value 355, while the PID card is displayed in the increased size.

One difference between the U/I screens 900, 910 is that the release USC 307 on the U/I screen 900 does not include an "X" whereas the USC 307 on the U/I screen 910 includes an "X". As an example, an "X" in the USC 307 can indicate that the park brake cable is released. In an example implementation, the U/I screen 900 is displayed on the display 84 in response to the processor 72 determining the scanner job USC 496 of the U/I screen 490 was selected and/or in response to selecting the release USC 307 while the park brake cable is not released. In an alternative implementation, the U/I screen 910 is displayed on the display 84 in response to the processor 72 determining the scanner job USC 496 of the U/I screen 490 shown in FIG. 32 was selected and/or in response to selecting the release USC 307 while the park brake cable is released.

Another difference between the U/I screens 900, 910 is different PID parameter values shown in the PID cards 313, 333, 337, 339. The differences in the PID parameter values shown in the PID cards 313, 333, 337 can occur as a result of selection of the release USC 307. The difference in the PID parameter value shown in the PID card 339 can occur as a result of the engine coolant temperature increasing.

Figure 37:
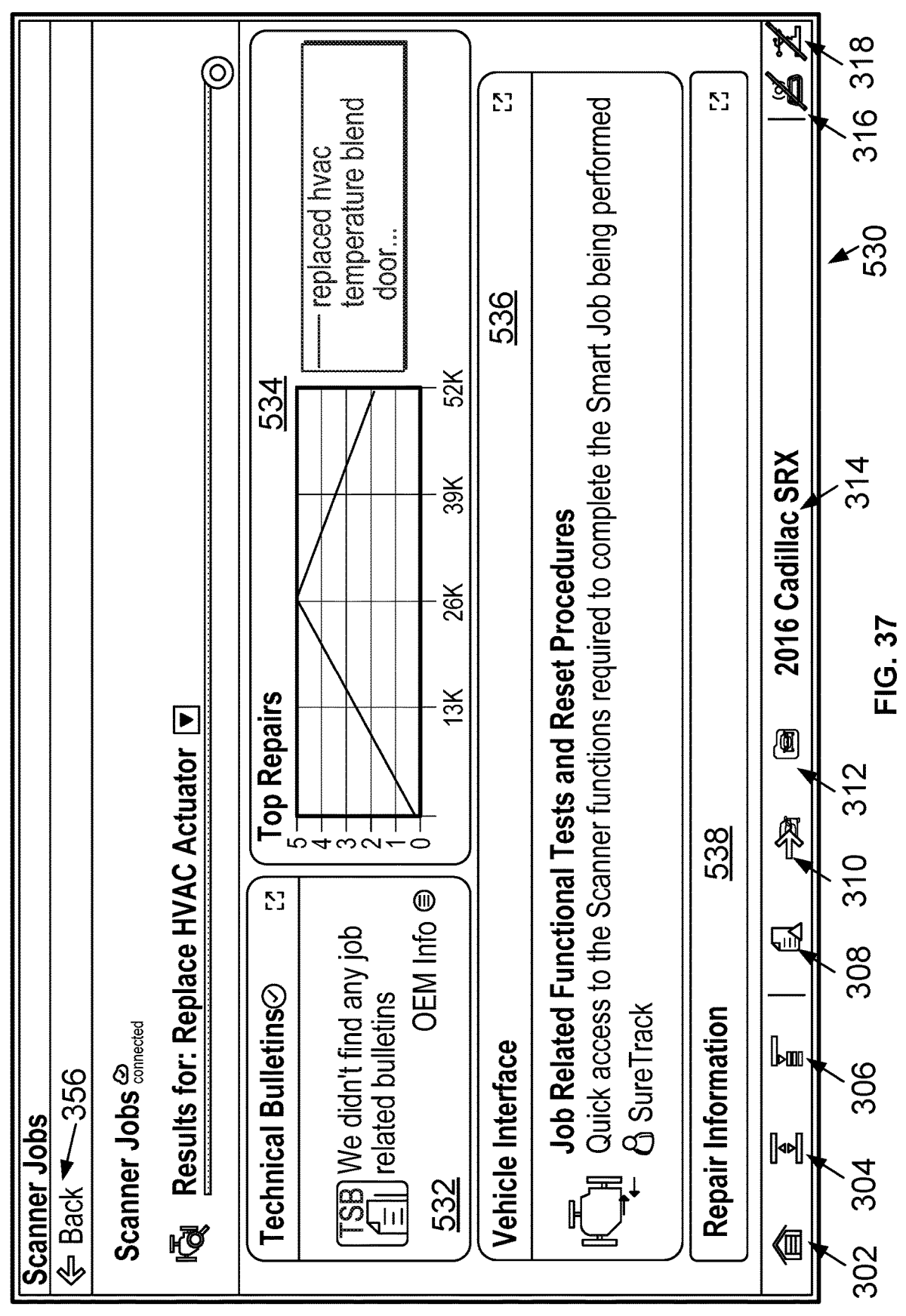
Figure 38:
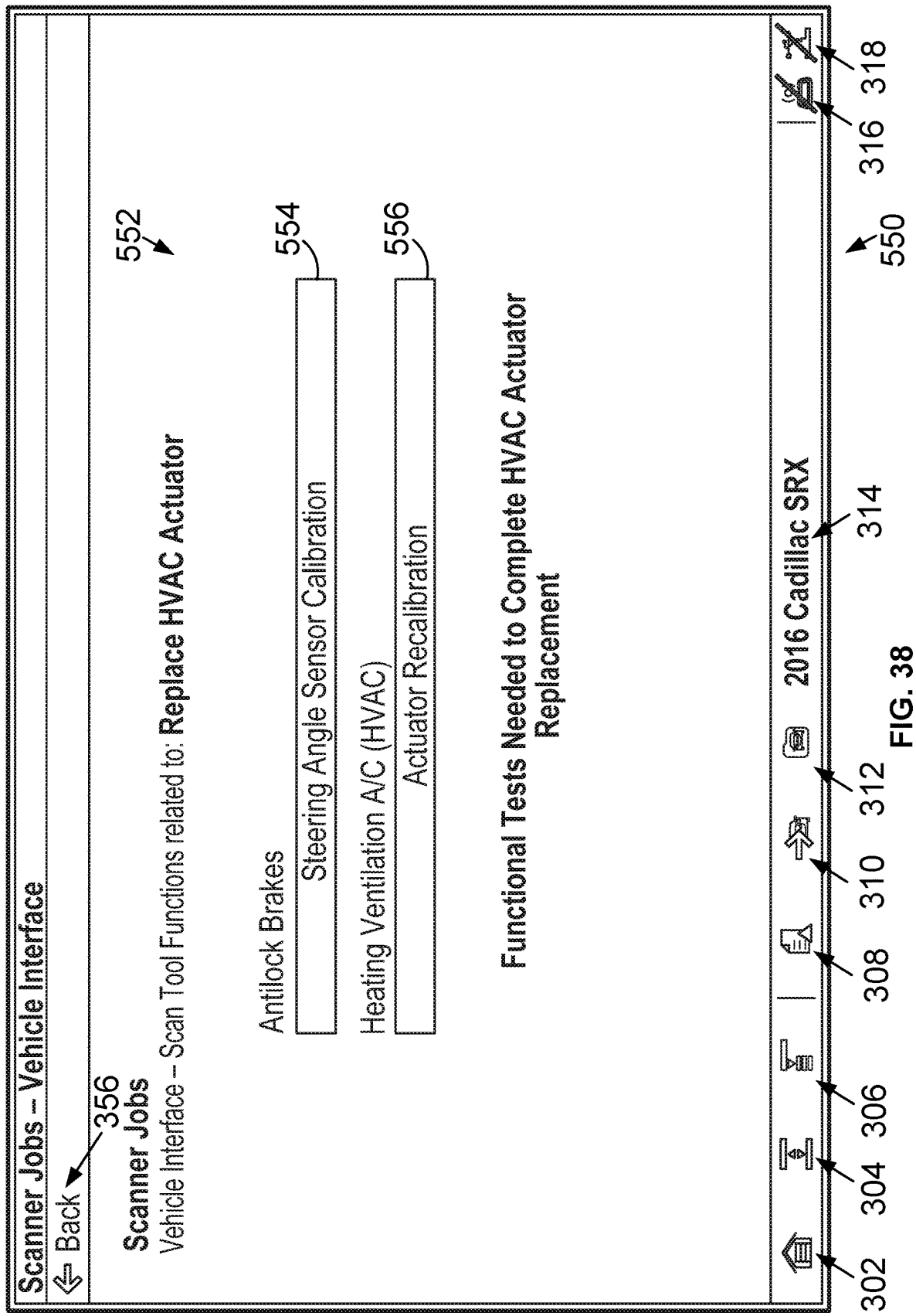

Next, FIG. 37 to FIG. 39 show U/I screens pertaining to a scanner job for replacing an HVAC actuator that can be displayed. In particular, FIG. 37 shows a U/I screen 530 including content regarding the scanner job replace HVAC actuator. The content of the U/I screen 530 includes a technical bulletins USC 532, a top repairs user-selectable data 534, a vehicle interface USC 536, and a repair information USC 538. The technical bulletins USC 532 is selectable to cause the processor 72 to display a TSB pertaining to the identified vehicle. The top repairs user-selectable data 534 shows quantities of repairs made to instances of the identified vehicle and the mileage on the vehicle to which each repair was made. The vehicle interface USC 536 is selectable to display a U/I screen showing scan tool functions associated with the scanner job replace HVAC actuator. The repair information USC 538 is selectable to display repair information on the display 84. In an example implementation, the processor 72 can output the U/I screen 530 to the display 84 in response to determining that the scanner job USC 452 is selected while the U/I screen 440 (shown in FIG. 17) is displayed on the display 84, or in response to selecting the back USC 356 from a U/I screen shown in response to selecting a USC displayed on the U/I screen 530.

Next, FIG. 38 shows a U/I screen 550 including a set of scan tool function USCs 552. The set of scan tool function USCs 552 include scan tool function USC 554, 556. As an example, the scan tool function USC 554 is selectable to select a functional test and reset procedure regarding calibrating a steering angle sensor on the identified vehicle. As another example, the scan tool function USC 556 is selectable to select a functional test and reset procedure regarding recalibrating an actuator, such as an HVAC actuator, on the identified vehicle.

The processor 72 can determine which one or more scan tool functions pertain to the scanner job selected for the identified vehicle by searching the scanner jobs 85 based on the identified vehicle (e.g., the vehicle identifier associated with the identified vehicle) and the selected scanner job. As an example, the processor 72 can search the scanner jobs 85, such as the table 100 shown in FIG. 5, to determine that the two scan tool functions listed in the seventh and eighth row of the table 100 including the row with headers are for replacing an HVAC actuator on a 2016 CADILLAC® SRX. In an example implementation, the processor 72 can retrieve a U/I screen template for two scan tool functions from the U/I screens 89 and populate the U/I screen template with the data regarding the two scan tool functions from the scanner jobs 85. In an example implementation, the processor 72 can output the U/I screen 550 to the display 84 in response to determining that the scanner job USC 450 is selected while the U/I screen 440 is displayed on the display 84, in response to determining that the vehicle interface USC 536 is selected while the U/I screen 510 is displayed on the display 84, or in response to selecting the back USC 356 from a U/I screen shown in response to selecting a USC displayed on the U/I screen 550.

Next, FIG. 39 shows a U/I screen 570 on which a U/I window 572 is overlaid. The U/I screen 570 is an example of a U/I screen that can be displayed in response to selection of a repair information USC, such as the repair information USC 538 shown in FIG. 37. The U/I screen 570 includes one or more repair information USC selectable to display a particular portion of the repair information regarding the selected scanner job. As an example, the one or more repair information USC can include a repair information USC 574 regarding remove and replace guidance, and a repair information USC 576 regarding specification guidance. The U/I window 572 can be displayed in response to selection of the repair information USC 574. The U/I window 572 includes guidance 578 that pertains to the scanner job regarding replacing an HVAC actuator on the identified vehicle. The U/I window 572 includes a vertical slider 580 selectable to display additional portion(s) of the guidance 578 above or below the guidance shown in FIG. 39. The U/I window 572 can include a horizontal slider to show additional portions of the guidance 578 to the left or right of the guidance shown in FIG. 39. The U/I window 572 include a selector 582 selectable to close the U/I window 572 so that the set of repair information USC of the U/I screen 570 is visible. The U/I window 572 includes a guidance portion selector 584 that can be arranged to similar to the guidance portion selector 524 except that the applicable guidance pertains to the scanner job for replacing an HVAC actuator.

Next, FIG. 40 shows a U/I screen 610 configured for making a selection for the scanner mode of the diagnostic tool 10, 70 after the processor 72 has identified a vehicle (e.g., the vehicle 12, 30). As an example, the processor 72 can output the U/I screen 610 in response to determining the continue USC 406 (shown in FIG. 15) is selected after the attributes of the identified vehicle have been entered to identify the vehicle. The U/I screen 610 includes the vehicle indicator 314 to show that a 2016 CADILLAC® SRX vehicle has been identified. The processor 72 can determine systems of the identified vehicle and system(s) of the identified vehicle that are associated with a scanner job. Upon making that determination, the diagnostic tool 10, 70 can operate in a mode in which the diagnostic tool 10, 70 outputs a U/I screen, such as the U/I screen 610, that includes one or more from among: (1) a system USC selectable to select a system of the identified vehicle that is not associated with a scanner job, (2) a system USC selectable to select a system of the identified vehicle that is associated with a scanner job, (3) a scanner job USC selectable to select a scanner job associated with the identified vehicle, and (4) a repair information USC selectable to select vehicle guidance pertaining to the identified vehicle.

As an example, the U/I screen 610 includes the following scanner job USC: a scanner job USC 616 configured for selecting a scanner job pertaining to an ADAS (advanced drivers assistance system), a system USC 618 configured for selecting a scanner job pertaining to a brake system, a scanner job USC 620 configured for selecting a scanner job pertaining to a body system, a scanner job USC 622 configured for selecting a scanner job pertaining to a wheel alignment, a scanner job USC 624 configured for selecting a scanner job pertaining to an engine system, a scanner job USC 626 configured for selecting a scanner job pertaining to a transmission system, and a scanner job USC 628 configured for selecting a scanner job pertaining to a suspension system. Each one of those USC can be associated with one or more scan tool functions associated with a system represented by the USC. Those scanner job USC on the U/I screen 610 include a scanner job indicator 630 to indicate that the diagnostic tool 10, 70 includes a scanner job associated with the system selectable via those scanner job USC.

As another example, a repair information USC selectable to select vehicle guidance pertaining to the identified vehicle on the U/I screen 610 can include a repair information USC 612 selectable to show TSB pertaining to the identified vehicle, and a repair information USC 614 selectable to show oil specifications and resets pertaining to the identified vehicle. As an example, the repair information USC 612 can be selectable to cause the display 84 to display an identifier and/or content of one or more TSB related the identified vehicle. As another example, the repair information USC 614 can be selectable to cause the display 84 to display oil specifications (e.g., an engine oil type, and a quantity of oil specified for an engine) pertaining to the identified vehicle and/or a reset pertaining to engine oil (e.g., a reset for oil change interval).

In accordance with an example implementation, the processor 72 can determine the USCs to include on the U/I screen 610 by searching the memory 80 based on the vehicle identifier determined for the identified vehicle. In accordance with that example implementation, the processor 72 can determine whether a scanner job should be indicated on each USC on the U/I screen 610 by requesting and receiving from the server 16, 150 data regarding the scanner jobs. In accordance with another example implementation, the processor 72 can determine the USCs to include on the U/I screen 610 and whether a scanner job should be indicated on each USC on the U/I screen 610 by requesting and receiving from the server 16, 150 data regarding the scanner jobs.

Figure 41:
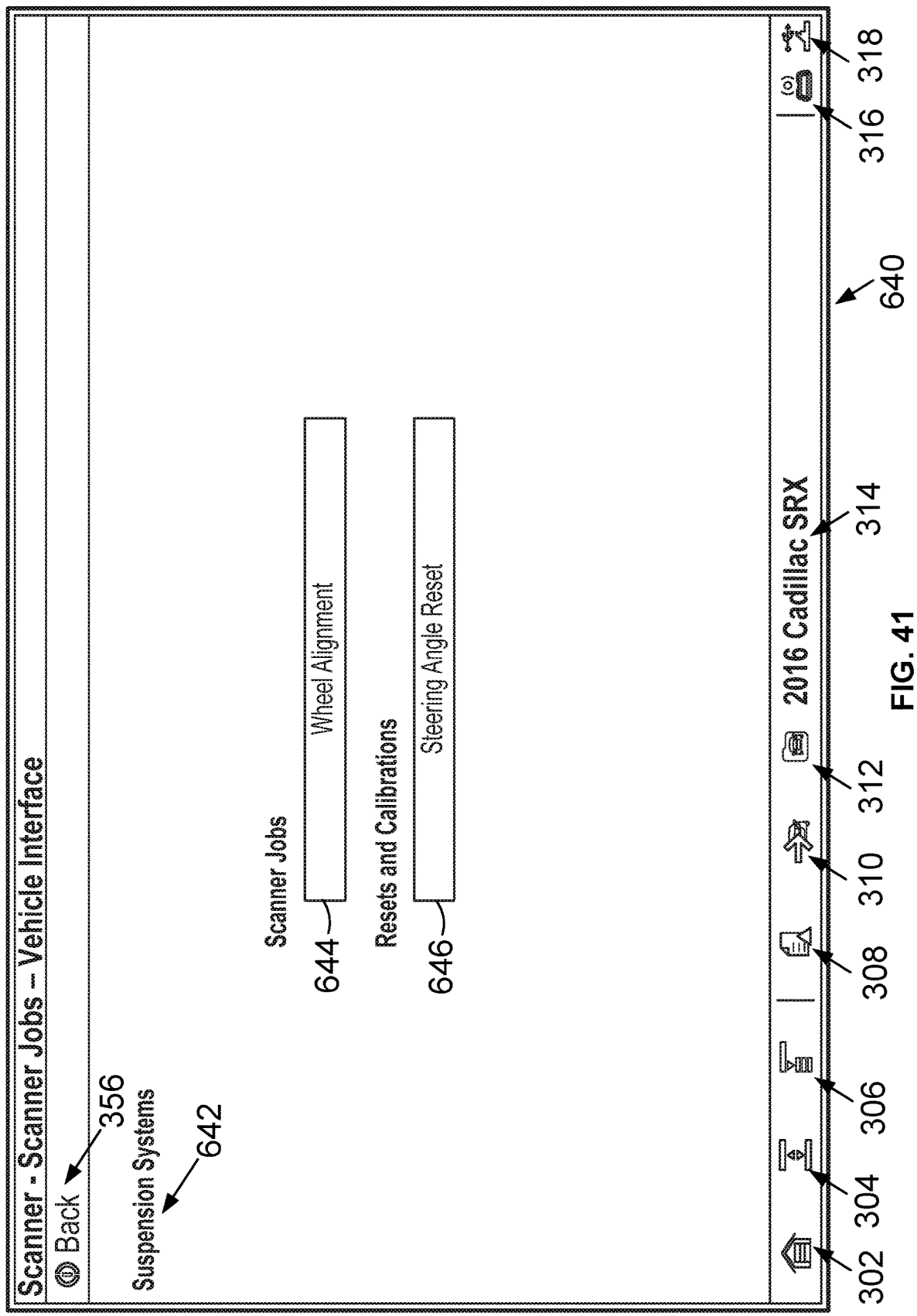

Next, FIG. 41 shows a U/I screen 640 configured for selecting a scanner job or a scan tool function of the diagnostic tool 10, 70 after a vehicle and a system have been selected. As an example, the processor 72 can output the U/I screen 640 in response to determining the scanner job USC 622 (shown in FIG. 40) is selected from the U/I screen 610. As shown in FIG. 41, the vehicle indicator 314 indicates a 2016 CADILLAC® SRX vehicle has been selected and a system indicator 642 indicates the suspension system of the identified vehicle has been selected. The U/I screen 640 includes a scanner job USC 644 and a vehicle interface USC 646. The scanner job USC 644 is selectable to select a scanner job, such as a scanner job pertaining to a wheel alignment of the identified vehicle, and to cause the processor 72 to initiate performance of the selected scanner job and/or to display a U/I screen pertaining to the selected scanner job, such as a U/I screen 670 shown in FIG. 42. The vehicle interface USC 646 is selectable to cause the processor 72 to output a U/I screen showing USCs selectable to cause the diagnostic tool to perform a scan tool function associated with resetting a steering angle reset on the identified vehicle, and/or to cause the processor 72 to transmit a VDM to the identifier vehicle to reset the steering angle reset on the identified vehicle.

Figure 42:
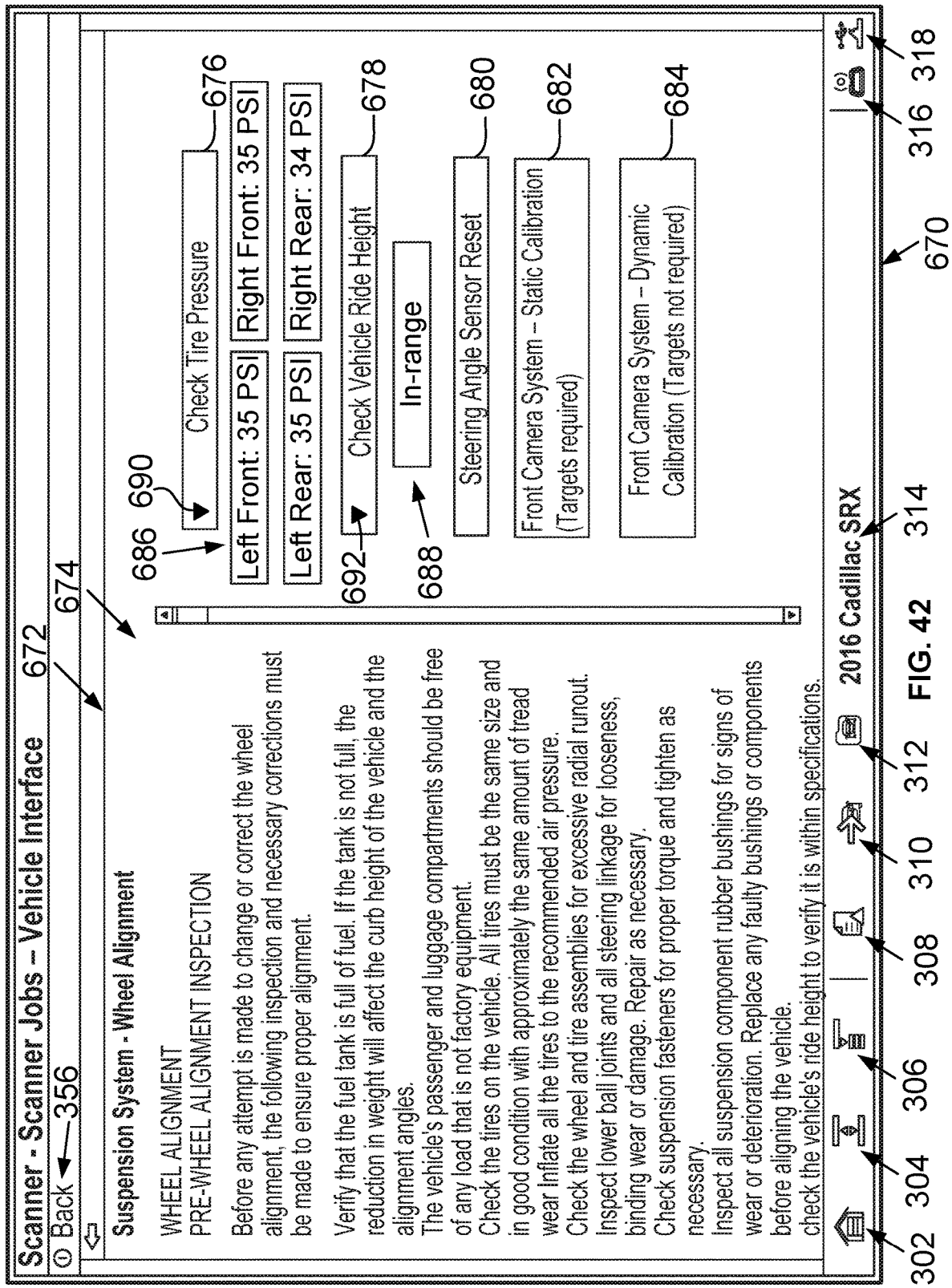

Next, FIG. 42 shows a U/I screen 670 showing content of a scanner job 672 for aligning the wheels of the identified vehicle. The content of a scanner job can include guidance and/or a USC, among other content. For the U/I screen 670, the content of the scanner job 672 includes guidance 674, and a scan tool function USC 676, 678, 680, 682, 684. The guidance of a scanner job, such as the guidance 674, can include text instructions regarding the scanner job and/or some graphical image pertaining to the scanner job, such as an image of a vehicle component or a graph regarding a vehicle component or system. The guidance of a scanner job can include OEM content and/or aftermarket content. As shown in FIG. 42, the guidance 674 includes text describing a pre-wheel alignment inspection.

In an example implementation, the processor 72 can output the U/I screen 670 to the display 84 in response to determining that the scanner job USC 644 is selected while the U/I screen 640 is displayed on the display 84. In that or another example implementation, the processor 72 can output the U/I screen 670 to the display 84 in response to determining the back USC 356 is selected from a U/I screen 800, 820, 840 shown in FIG. 43, FIG. 44, FIG. 45, respectively.

A scanner job can include a single scan tool function USC or multiple scan tool function USCs. In some implementations of a scanner job having multiple scan tool function USCs, each scan tool function USC for the scanner job is associated with a scan tool function for the same system of an identified vehicle. In other implementations of a scanner job having multiple scan tool function USCs, at least two of the scan tool functions are associated with different systems of the identified vehicle.

The scan tool function USC 676 is selectable to check pressure in tires of the identified vehicle. In an example implementation, selection of the scan tool function USC 676 causes the processor 72 to initiate the scan tool function(s) to request tire pressure measurements from a tire pressure monitoring system on the identified vehicle. In accordance with a described implementation based at least in part on the scan tool functions shown in FIG. 4C, the processor 72 can perform the scan tool functions at the memory addresses $F2, $F3, $F4, and $F5 to determine tire pressure measurements for tires mounted on the left front, right front, left rear, and right rear wheel hubs on the identified vehicle. In some implementations, in response to requesting and/or determining the tire pressure measurements, the processor 72 can modify the U/I screen 670 to display the tire pressure measurements. In other implementations, the processor 72 can provide the display 84 with a different U/I screen to display the tire pressure measurements in response to requesting and/or determining the tire pressure measurements. FIG. 42 shows the tire pressure measurements 686 displayed on the U/I screen 670. The U/I screen 670 can include a selector 690 selectable to modify the U/I screen 670 such that the U/I screen 670 no longer displays the tire pressure measurements 686. While the U/I screen 670 is not displaying the tire pressure measurements 686, selection of the selector 690 can cause the U/I screen 670 to display the tire pressure measurements 686.

The scan tool function USC 678 is selectable to check a vehicle ride height of the identified vehicle. In an example implementation, selection of the scan tool function USC 678 causes the processor 72 to initiate the scan tool function(s) to request a ride height status from a suspension system on the identified vehicle. In accordance with a described implementation based at least in part on the scan tool functions shown in FIG. 4C, the processor 72 can perform the scan tool function at the memory address $ED to determine the status of the ride height of the identified vehicle. Upon determining the status of the ride height, the processor 72 can modify the U/I screen 670 to display the ride height status. FIG. 42 shows, in accordance with some implementations, the ride height status 688 displayed on the U/I screen 670. In other implementations, the processor 72 can provide the display 84 with a different U/I screen to display the ride height status in response to requesting and/or determining the ride height status. The U/I screen 670 can include a selector 692 selectable to modify the U/I screen 670 such that the U/I screen 670 no longer displays the ride height status 688. While the U/I screen 670 is not displaying the ride height status 688, selection of the selector 692 can cause the U/I screen 670 to display the ride height status 688.

The scan tool function USC 680 is selectable to perform or initiate performing a scan tool function to reset a steering angle sensor. In accordance with a described implementation based at least in part on the scan tool functions shown in FIG. 4B, the processor 72 can perform the scan tool function at the memory address $98 to reset the steering angle sensor. The scan tool function USC 682, 684 is selectable to perform or initiate calibrating a front camera system on the identified vehicle. In accordance with a described implementation based at least in part on the scan tool functions shown in FIG. 4B, the processor 72 can perform the scan tool function at the memory address $B4 to calibrate the front camera system. The U/I screen 670 provides two options for calibrating the front camera system as the scan tool function USC 682 is selectable for calibrating the front camera system dynamically, and the scan tool function USC 684 is selectable for calibrating the front camera system statically via the use of targets.

In one respect, a scan tool function USC is selectable to cause the VCT 76 to transmit a VDM for performing a scan tool function associated with the scan tool function USC. In another respect, a first scan tool function USC is selectable to cause the processor 72 to output a U/I screen including a second scan tool function USC that is selectable to cause the VCT 76 to transmit a VDM for performing a scan tool function associated with the first scan tool function USC and the second scan tool function USC.

In an alternative implementation, in response to selecting a scanner job USC, such as the scanner job USC 644, the processor 72 can output to the display a U/I screen like the U/I screen 670 that shows content of a scanner job, such as the content of the scanner job 672, except that the content of the scanner job includes guidance on a first side of the display 84 (e.g., a left side of the display 84) and one or more PID cards showing parameter values for PIDs associated with the scanner job on a second side of the display 84 (e.g., the right side of the display 84) instead of a scan tool function USC like the scan tool function USC 676 to 684 shown in FIG. 42. Those PID cards can be configured like the PID card 455 shown in FIG. 22. In accordance with this implementation, the processor 72 can send a VDM to request the PID parameters to be displayed in the PID cards shown on the second side of the display 84.

Figure 43:
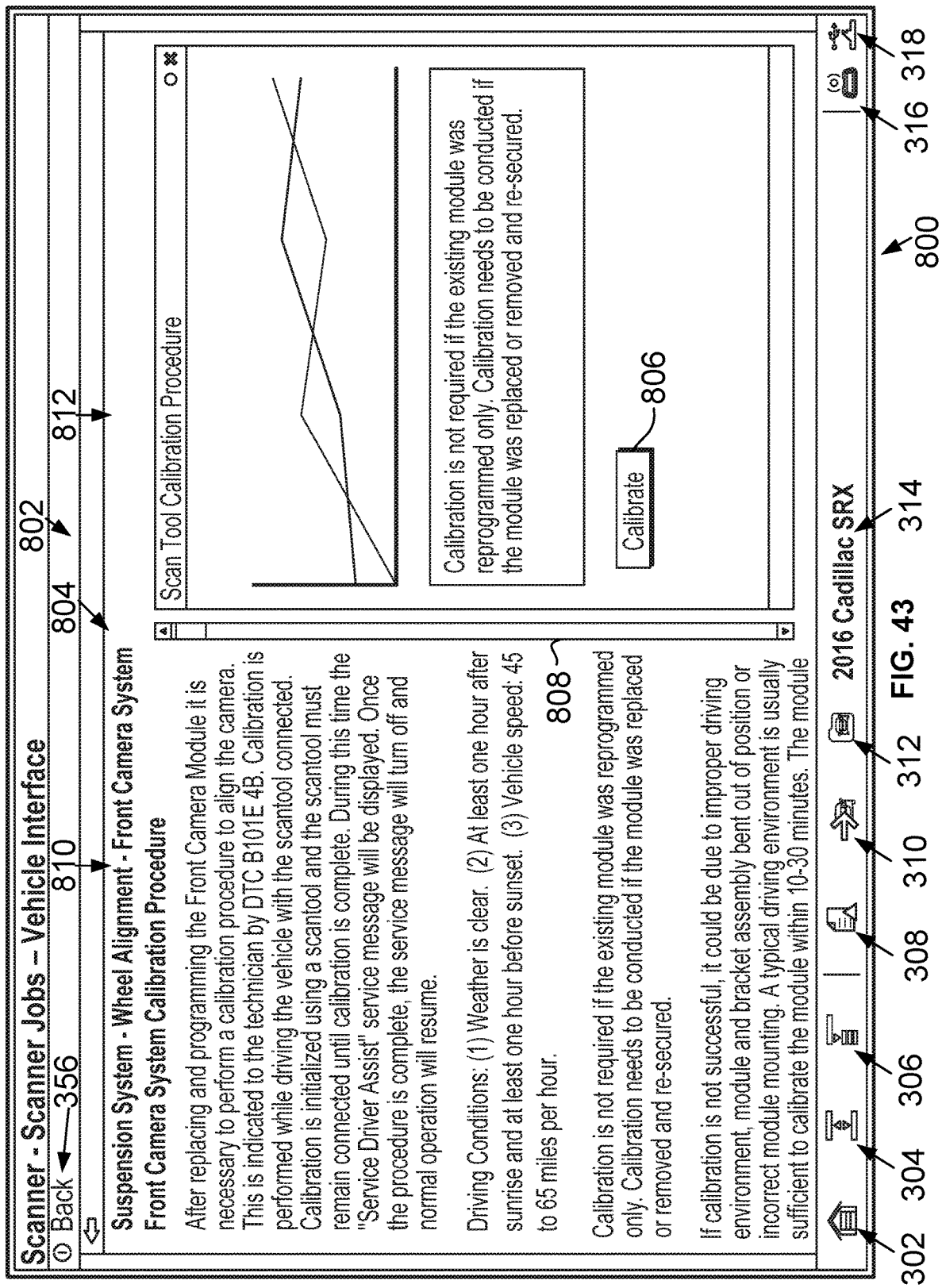
Figure 44:
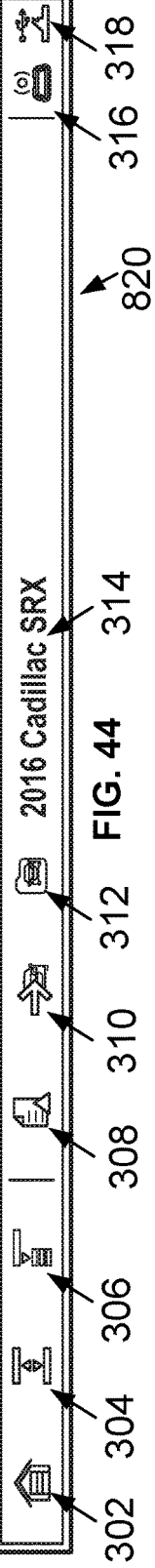
Figure 45:
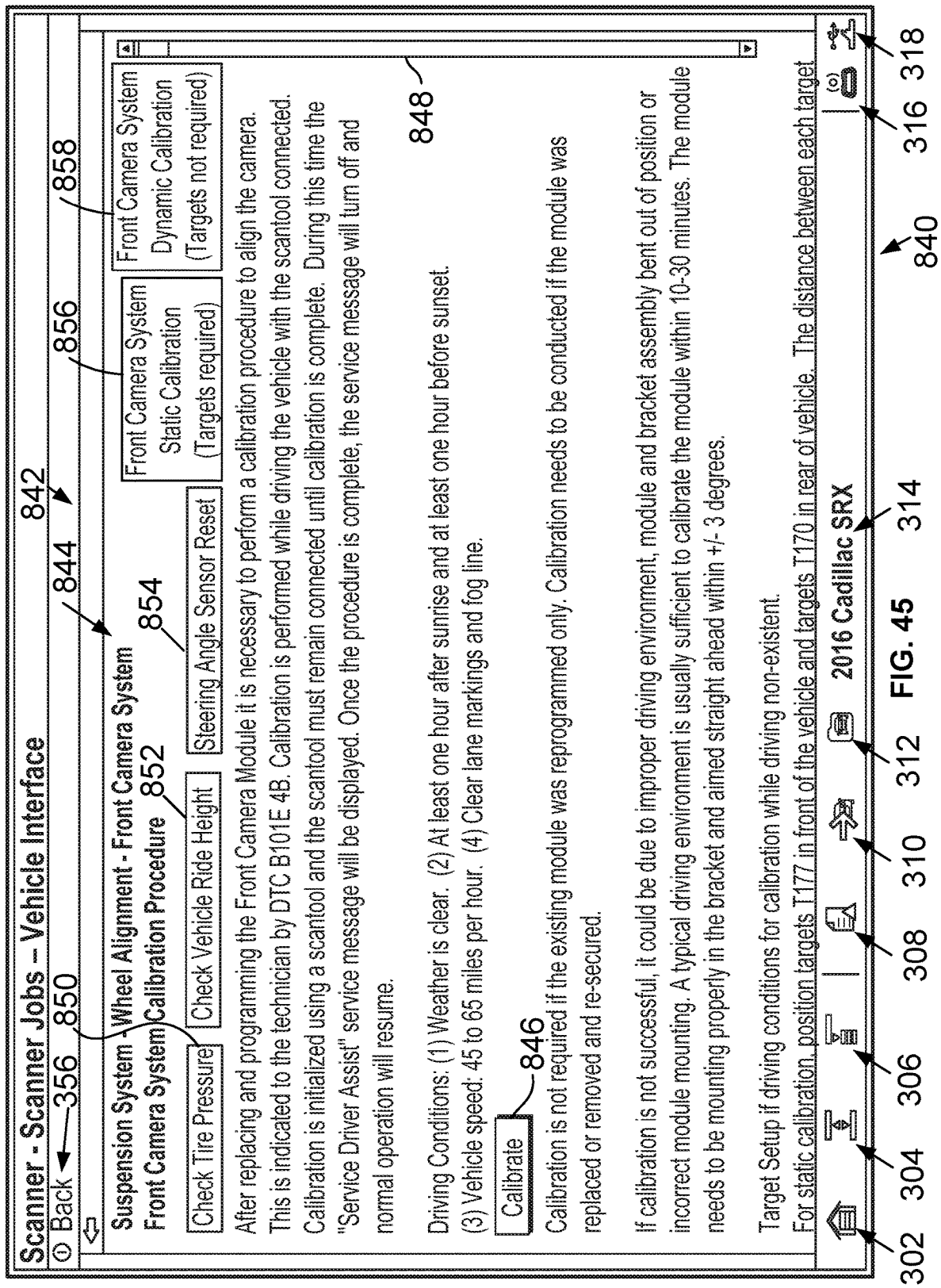

Next, FIG. 43, FIG. 44, and FIG. 45 show U/I screens 800, 820, and 840, respectively. The U/I screens 800, 820, 840 depict different ways of displaying a scan tool function USC for a scanner job. In one respect, the processor 72 can be configured to display the U/I screen 800, the U/I screen 820, or the U/I screen 840 in response to determining the scan tool function USC 682, 684 is selected from the U/I screen 670.

The U/I screen 800 shown in FIG. 43 includes additional content 802 of the scanner job 672 regarding aligning wheels of the identified vehicle. The U/I screen 800 and/or the additional content 802 is displayable on the display 84 in response to one of the scan tool function USC 682, 684 being selected while displayed on the U/I screen 670. The additional content 802 includes guidance 804 and a scan tool function USC 806 to perform and/or initiate performing the scan tool function at the memory address $B4 to calibrate the front camera system. The U/I screen 800 includes a vertical scroll bar 808.

The U/I screen 800 is configured as a split U/I screen including a first U/I screen portion 810 and a second U/I screen portion 812. In accordance with an example implementation (as shown in FIG. 43), the first U/I screen portion 810 and the second U/I screen portion 812 are on opposite sides of a vertical divider, such as the vertical scroll bar 808. In accordance with another example implementation, the first U/I screen portion 810 and the second U/I screen portion 812 are on opposite sides of a horizontal divider. In either or both of the two preceding implementations, the first U/I screen portion 810 and the second U/I screen portion 812 can be equal in size or different sizes. As shown in FIG. 43, the first U/I screen portion 810 includes textual guidance of the guidance 804.

The processor 72 can transmit a VDM in response to determining the scan tool function USC 806 has been selected. That VDM can include one or more VDM to calibrate the front camera system on the identified vehicle. The processor 72 can receive a VDM transmitted from the identified vehicle in response to the VDM transmitted in response to determining the scan tool function USC 806 has been selected.

The U/I screen 820 shown in FIG. 44 includes additional content 822 of the scanner job 672 regarding aligning wheels of the identified vehicle. The U/I screen 820 and/or the additional content 822 is displayable on the display 84 in response to one of the scan tool function USC 682, 684 being selected while displayed on the U/I screen 670. The additional content 822 includes guidance 824 and a scan tool function USC 826 to perform and/or initiate performing the scan tool function at the memory address $B4 to calibrate the front camera system. The U/I screen 820 includes a vertical scroll bar 828. The vertical scroll bar 828 can be used to modify the U/I screen 820 so that the U/I screen 820 displays at least a portion of other content of the additional content 822 and/or so that the U/I screen 820 stops displaying at least a portion of the additional content 822 currently displayed on the U/I screen 820.

The scanner jobs 85 can include for the scanner job 672, and/or for other scanner jobs, a mark-up language file, such as an XML file with respect to a U/I screen, such as the U/I screen 820. In an example implementation, the mark-up language file for the scanner job 672 can include the text portion of the guidance 824 and a scan tool function identifier pertaining to a scan tool function associated with the scanner job 672. Moreover, the scan tool function identifier, such as $B4 for the front camera system calibration, can be positioned within the text of the mark-up language file such to indicate that the U/I screen 820 should include the scan tool function USC 826 at a relevant location in the text. As an example, the relevant location can be a location at which the text indicates the scan tool function $B4 should be performed.

The U/I screen 840 shown in FIG. 45 includes additional content 842 of the scanner job 672 regarding aligning wheels of the identified vehicle. The U/I screen 840 and/or the additional content 842 is displayable on the display 84 in response to one of the scan tool function USC 682, 684 being selected while displayed on the U/I screen 670. The additional content 842 includes guidance 844 and a scan tool function USC 846 to perform and/or initiate performing the scan tool function at the memory address $B4 to calibrate the front camera system. The U/I screen 840 includes a vertical scroll bar 848. The vertical scroll bar 848 can be used to modify the U/I screen 840 so that the U/I screen 840 displays at least a portion of other content of the additional content 842 and/or so that the U/I screen 840 stops displaying at least a portion of the additional content 842 currently displayed on the U/I screen 840.

The scanner jobs 85 can include for the scanner job 672 a mark-up language file, such as an XML file with respect to the U/I screen 840. In an example implementation, the mark-up language file for the scanner job 672 can include the text portion of the guidance 844 and a scan tool function identifier pertaining to a scan tool function associated with the scanner job 672. Moreover, the scan tool function identifier, such as $B4 for the front camera system calibration, can be positioned within the text of the mark-up language file such to indicate that the U/I screen 840 should include the scan tool function USC 846 at a relevant location in the text. As an example, the relevant location can be a location at which the text indicates the scan tool function $B4 should be performed. The mark-up language file can also indicate scan tool functions associated with the scanner job 672 for displaying USCs associated with the indicated scan tool functions at fixed positions of the U/I screen 840 even if the vertical scroll bar 848 is used to modify the U/I screen 840 to display different portions of the additional content 842. As shown, in FIG. 45, the scan tool function USC 850, 852, 854, 856, 858, are associated with the scan tool functions to check tire pressure, check vehicle ride height, reset steering angle sensor, calibrate front camera system statically, and calibrate front camera system dynamically, respectively.

As discussed elsewhere, the diagnostic tool 70 is configured to permit a user to select a scanner job USC to initiate and/or perform a scan tool function without selecting a scan tool function USC on a U/I screen associated with a scanner job. As further discussed, the diagnostic tool 70 can include a menu having such a scanner job USC. That menu can be based on a menu arrangement, such as the menu arrangement 700 shown in FIG. 4A, FIG. 4B, and FIG. 4C.

Figure 46:
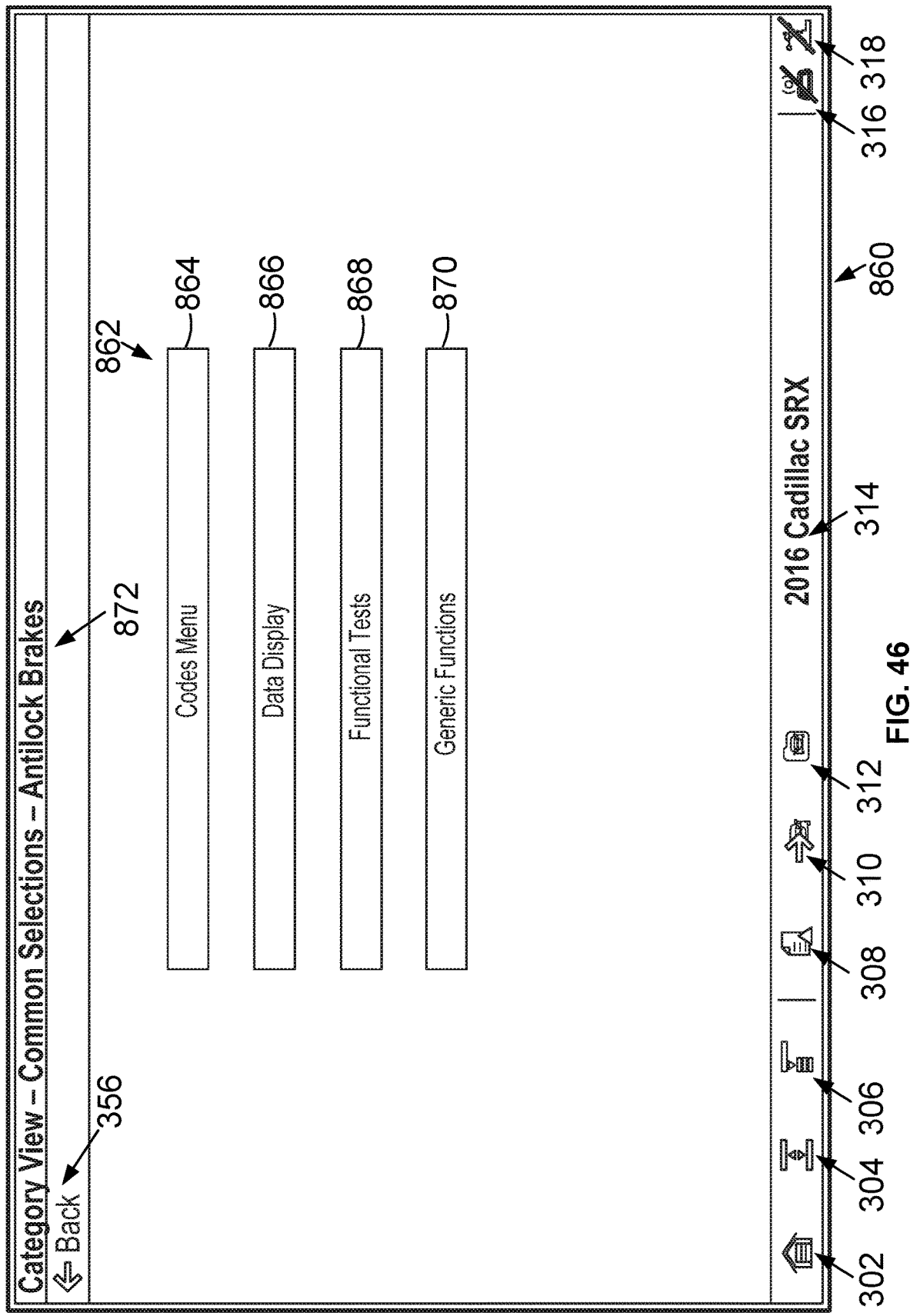

Turning to FIG. 46, this figure shows a U/I screen 860 having a set of USCs 862 including USCs 864, 866, 868, and 870 based on the menu level 707 shown in FIG. 4B. The U/I screen 860 also includes a U/I screen identifier 872 and the vehicle indicator 314. In an example implementation, the U/I screen identifier 872 indicates how navigation to the U/I screen 860 from a previously-displayed U/I screen, such as the U/I screen 420 shown in FIG. 16, occurred. For instance, the U/I screen identifier 872 indicates the antilock brakes USC 434 was selected from among the common selection USCs 432. The USCs 864, 866, 868, and 870 pertain to a codes menu, data display, functional tests, and generic functions related to the antilock brake system of the identified vehicle. Accordingly, the antilock brakes USC 434 shown in FIG. 16 can be associated with the Antilock Brake system selection 704 shown in FIG. 4B.

Figure 47:
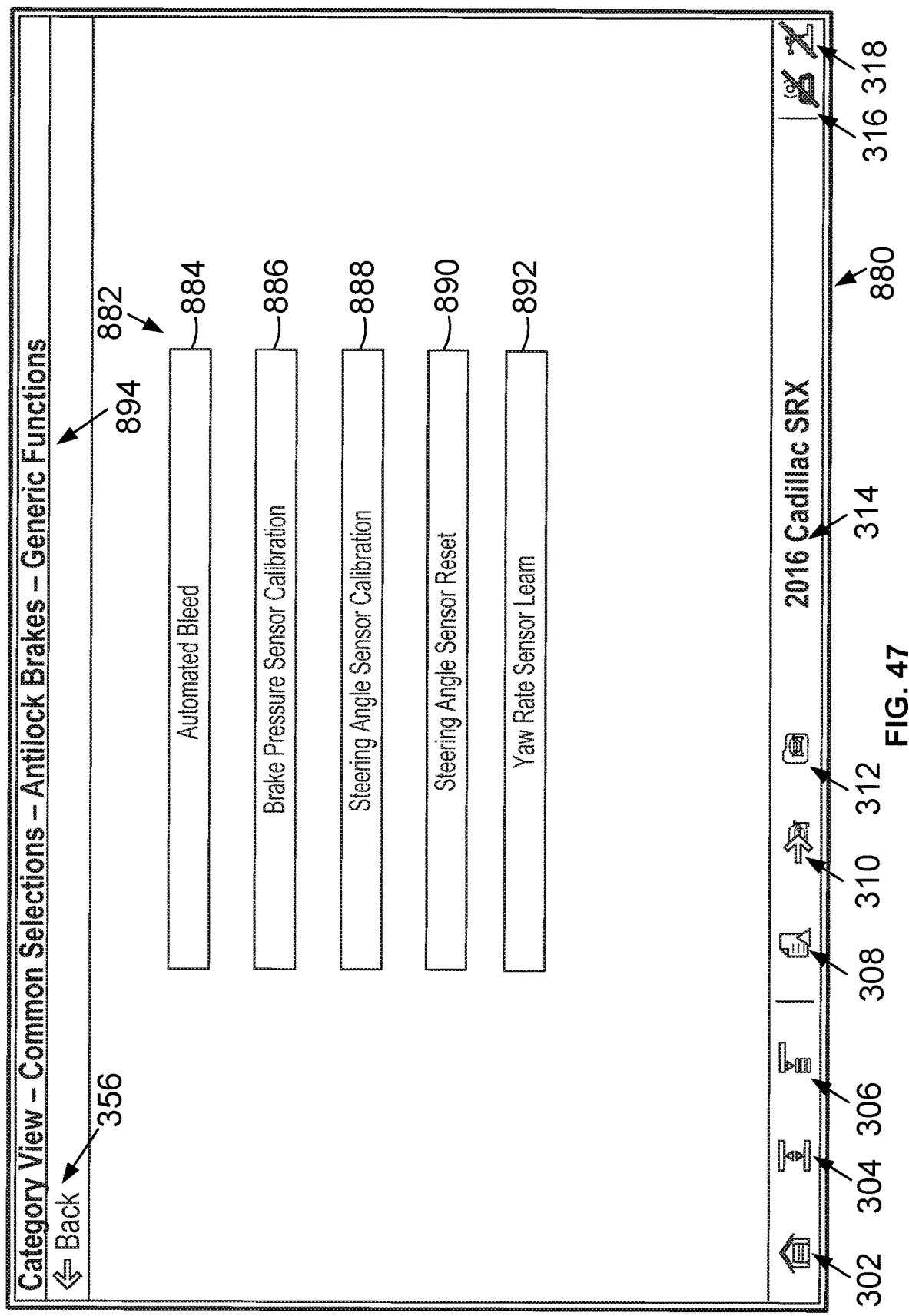

Turning to FIG. 47, this figure shows a U/I screen 880 having a set of scan tool function USCs 882 including scan tool function USC 884, 886, 888, 890, 892 based on the menu level 709 shown in FIG. 4B. The U/I screen 880 also includes a U/I screen identifier 894 and the vehicle indicator 314. In an example implementation, the U/I screen identifier 894 indicates how navigation to the U/I screen 880 from a previously-displayed U/I screen occurred. For instance, the U/I screen identifier 894 indicates the USC 870 for generic functions was selected from among the set of USCs 862 displayed on the U/I screen 860. In an example, implementation, selection of the scan tool function USC 884, 886, 888, 890, 892 causes the processor 72 to perform the scan tool functions associated with the addresses $95, $96, $97, $98, $99, respectively (as shown in FIG. 4B). In at least some of those implementations, selection of the scan tool function USC 884, 886, 888, 890, 892 can cause the processor 72 to output a U/I screen showing guidance and/or a status information regarding performance of the scan tool function.

VII. Definitions

The term "data" within this description can be used interchangeably with the term "information" or similar terms, such as "content." The data described herein can be transmitted and received via a communication. As an example, any transmission of data or a communication described herein can occur directly from a transmitting device (e.g., a transmitter) to a receiving device (e.g., a receiver). As another example, any transmission of data or a communication described herein can occur indirectly from the transmitter to a receiver via one or more intermediary network devices, such as an access point, an antenna, a base station, a hub, a modem, a relay, a router, a switch, or some other network device. The transmission of any of data or a communication described herein can include transmitting the data or communication over an air interface (e.g., using radio signals (i.e., wirelessly)). The transmission of any of data or communication described herein can include transmitting the data or communication over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of data or a communication over the conductor can occur electrically or optically.

A "DTC" is a diagnostic trouble code. A DTC can be manufacturer specific or industry specific, such as a DTC defined by the SAE® J2012 standard for Diagnostic Trouble Code Definitions, dated December 2016, or a DTC defined by the ISO® 15031-6 standard for diagnostic trouble code definitions, dated August 2015. A DTC can include a sub-code. For instance, a DTC can indicate that a sensor is out-of-range. A sub-code can indicate why the sensor is out-of-range, such as a sub-code indicating the sensor is shorted to ground, a sub-code indicating the sensor is open-circuited, or a sub-code indicating the sensor is shorted to voltage. Unless explicitly stated otherwise, any discussion in this description of a DTC can include a DTC that includes or does not include a sub-code.

In this description, the articles "a," "an," and "the" are used to introduce elements or functions of the example implementations. The intent of using those articles is that there is one or more of the introduced elements or functions. The word "next" is used to transition from paragraphs or aspects described in the description and is not intended to indicate an order of occurrence of any functions of method.

In this description, the intent of using the term "and/or" within a list of at least two elements or functions and the intent of using the terms "at least one of," "at least one of the following," "one or more of," or "one or more of the following" immediately preceding a list of at least two components or functions is to cover each implementation including a listed component or function independently and each implementation including a combination of the listed components or functions. For example, an implementation described as including A, B, and/or C, or at least one of A, B, or C, or at least one of the following: A, B or C, or one or more of A, B, or C, or one or more of the following: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

VIII. Conclusions and Enumerated Example Implementations

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing CRPI or by a combination of hardware, firmware, and/or software. For purposes of this description, execution of CRPI contained in a memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

Embodiments of the present disclosure may thus relate to one of the enumerated example embodiments (EEEs) listed below. EEEs to be added after comments on draft application received.

EEE 1 is a diagnostic tool comprising: one or more processors; a display operatively connected to the one or more processors; and one or more computer-readable mediums operatively coupled to the one or more processors, the one or more computer-readable mediums having stored thereon: (1) first program instructions executable by the one or more processors to perform scan tool functions that include the one or more processors transmitting a vehicle data message to an identified vehicle, wherein the scan tool functions include a first scan tool function for a first system of the identified vehicle and a second scan tool function for a second system of the identified vehicle, and wherein the first system is different than the second system, and (2) second program instructions executable by the one or more processors to cause the diagnostic tool to: display, on the display, a first user-interface screen including a user-selectable control including an indicator of a first scanner job performable on the identified vehicle; in response to a selection of the user-selectable control including the indicator of the first scanner job, display a second user-interface screen instead of the first user-interface screen, wherein the second user-interface screen includes a first user-selectable control including an indicator of the first scan tool function for the first system of the identified vehicle, and a second user-selectable control including an indicator of the second scan tool function for the second system of the identified vehicle; in response to a selection of the first user-selectable control from the second user-interface screen, transmit a first vehicle data message to the identified vehicle, wherein the first vehicle data message is addressed to a component of the first system of the identified vehicle; and in response to a selection of the second user-selectable control from the second user-interface screen, transmit a second vehicle data message to the identified vehicle, wherein the second vehicle data message is addressed to a component of the second system of the identified vehicle.

EEE 2 is the diagnostic tool of EEE 1, wherein the second program instructions are executable by the one or more processors to cause the diagnostic tool to: in response to the selection of the first user-selectable control from the second user-interface screen, display a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 3 is the diagnostic tool of EEE 2, wherein the second program instructions are executable by the one or more processors to cause the diagnostic tool to: determine, while the third user-interface screen is being displayed, a status of performing the first scan tool function; and display, within the third user-interface screen, an indication of the status of performing the first scan tool function.

EEE 4 is the diagnostic tool of any one of EEE 2 to 3, wherein the third user-interface screen includes a user-selectable control selectable to switch back to a prior user-interface screen; wherein the second program instructions are executable by the one or more processors to cause the diagnostic tool to: in response to a selection of the user-selectable control selectable to switch back to a prior user-interface screen from the third user-interface screen, switch from displaying the third user-interface screen on the display to displaying the second user-interface screen on the display.

EEE 5 is the diagnostic tool of EEE 1, wherein the second program instructions are executable by the one or more processors to cause the diagnostic tool to: display, on the display, a user-interface screen including a user-selectable control including an indicator of the first system of the identified vehicle and a user-selectable control including an indicator of the second system of the identified vehicle; in response to a selection of the user-selectable control indicating the indicator of the first system of the identified vehicle, display a third user-interface screen instead of the user-interface screen including the user-selectable control including the indicator of the first system of the identified vehicle and the user-selectable control including the indicator of the second system of the identified vehicle, wherein the third user-interface screen includes a user-selectable control including an indicator of the first scan tool function for the first system of the identified vehicle and does not include any user-selectable control for selecting a scan tool function for a system of the identified vehicle other than the first system of the identified vehicle; and in response to a selection of the user-selectable control indicating the indicator of the second system of the identified vehicle, display a fourth user-interface screen instead of the user-interface screen including the user-selectable control including the indicator of the first system of the identified vehicle and the user-selectable control including the indicator of the second system of the identified vehicle, wherein the fourth user-interface screen includes a user-selectable control including an indicator of the second scan tool function for the second system of the identified vehicle and does not include any user-selectable control for selecting a scan tool function for a system of the identified vehicle other than the second system of the identified vehicle.

EEE 6 is the diagnostic tool of EEE 1, wherein the second program instructions are executable by the one or more processors to cause the diagnostic tool to: display, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 7 is the diagnostic tool of EEE 6, wherein the user-selectable control among the one or more user-selectable controls includes an indicator of a scanner job being available upon selection of the user-selectable control among the one or more user-selectable controls.

EEE 8 is the diagnostic tool of EEE 1, wherein the second program instructions are executable by the one or more processors to cause the diagnostic tool to: display, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 9 is the diagnostic tool of any one of EEE 1 to 8, wherein the first user-interface screen includes diagnostic information regarding the identified vehicle.

EEE 10 is the diagnostic tool of any one of EEE 1 to 9, wherein the scan tool functions include one or more scan tool function from among the following: a vehicle component reset function, a vehicle component calibration function, a vehicle component programming function, a vehicle component read diagnostic trouble code (DTC) function, a vehicle component clear DTC function, or a vehicle component control function.

EEE 11 is the diagnostic tool of any one of EEE 1 to 10, wherein the one or more processors includes an embedded processor programmed to execute at least the first program instructions.

EEE 12 is the diagnostic tool of any one of EEE 1 to 11, wherein the display includes a touch screen display, wherein the selection of the first user-selectable control includes a user contact of the touch screen display at or in proximity to the first user-selectable control, and wherein the selection of the second user-selectable control includes a user contact of the touch screen display at or in proximity to the second user-selectable control.

EEE 13 is the diagnostic tool of any one of EEE 1 to 12, wherein the first scanner job is associated with a search term, and wherein the second program instructions are executable by the one or more processors to cause the diagnostic tool to: transmit, to a server, a request for guidance regarding the first scanner job, wherein the request includes the search term; receive, in response to the request, guidance regarding the first scanner job; and display, on the display, the guidance regarding the first scanner job.

EEE 14 is the diagnostic tool of any one of EEE 1 to 13, wherein the first user-interface screen includes a user-selectable control including an indicator of a second scanner job performable on the identified vehicle, wherein the second program instructions are executable by the one or more processors to cause the diagnostic tool to: in response to a selection of the user-selectable control including the indicator of the second scanner job, display a third user-interface screen instead of the first user-interface screen, wherein the third user-interface screen includes guidance for performing the second scanner job.

EEE 15 is the diagnostic tool of any one of EEE 1 to 14, wherein the first user-interface screen includes a user-selectable control including an indicator of a second scanner job performable on the identified vehicle, wherein the second program instructions are executable by the one or more processors to cause the diagnostic tool to: display a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, display the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 16 is the diagnostic tool of any one of EEE 1 to 15, wherein the second program instructions are executable by the one or more processors to cause the diagnostic tool to: transmit at least a third vehicle data message to the identified vehicle, wherein the at least a third vehicle data message includes a request to solicit a response from a component of the first system and from a component of the second system; and make a determination that the diagnostic tool received, in response to at least the third message, a response from the component of the first system and a response from the component of the second, wherein display of the second user-interface screen is conditioned on the one or more processors making the determination.

EEE 17 is the diagnostic tool of any one of EEE 1 to 16, wherein the second program instructions are executable by the one or more processors to cause the diagnostic tool to: display a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 18 is the diagnostic tool of any one of EEE 1 to 17, wherein the second user-interface screen includes guidance for performing a procedure of the first scanner job.

EEE 19 is a method comprising: displaying, on a display, a first user-interface screen including a user-selectable control including an indicator of a first scanner job performable on an identified vehicle, wherein the display is operatively connected to one or more processors, wherein the one or more processors are operatively coupled to one or more computer-readable mediums having stored thereon program instructions executable by the one or more processors to perform scan tool functions that include the one or more processors transmitting a vehicle data message to the identified vehicle, wherein the scan tool functions include a first scan tool function for a first system of the identified vehicle and a second scan tool function for a second system of the identified vehicle, and wherein the first system is different than the second system; in response to a selection of the user-selectable control including the indicator of the first scanner job, displaying a second user-interface screen instead of the first user-interface screen, wherein the second user-interface screen includes a first user-selectable control including an indicator of the first scan tool function for the first system of the identified vehicle, and a second user-selectable control including an indicator of the second scan tool function for the second system of the identified vehicle; in response to a selection of the first user-selectable control from the second user-interface screen, transmitting a first vehicle data message to the identified vehicle, wherein the first vehicle data message is addressed to a component of the first system of the identified vehicle; and in response to a selection of the second user-selectable control from the second user-interface screen, transmitting a second vehicle data message to the identified vehicle, wherein the second vehicle data message is addressed to a component of the second system of the identified vehicle.

EEE 20 is the method of EEE 19, wherein the method further includes: in response to the selection of the first user-selectable control from the second user-interface screen, displaying a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 21 is the method of EEE 20, wherein the method further includes: determining, while the third user-interface screen is being displayed, a status of performing the first scan tool function; and displaying, within the third user-interface screen, an indication of the status of performing the first scan tool function.

EEE 22 is the method of any one of EEE 20 to 21, wherein the third user-interface screen includes a user-selectable control selectable to switch back to a prior user-interface screen; wherein the method further includes: in response to a selection of the user-selectable control selectable to switch back to a prior user-interface screen from the third user-interface screen, switching from displaying the third user-interface screen on the display to displaying the second user-interface screen on the display.

EEE 23 is the method of EEE 19, wherein the method further includes: displaying, on the display, a user-interface screen including a user-selectable control including an indicator of the first system of the identified vehicle and a user-selectable control including an indicator of the second system of the identified vehicle; in response to a selection of the user-selectable control indicating the indicator of the first system of the identified vehicle, displaying a third user-interface screen instead of the user-interface screen including the user-selectable control including the indicator of the first system of the identified vehicle and the user-selectable control including the indicator of the second system of the identified vehicle, wherein the third user-interface screen includes a user-selectable control including an indicator of the first scan tool function for the first system of the identified vehicle and does not include any user-selectable control for selecting a scan tool function for a system of the identified vehicle other than the first system of the identified vehicle; and in response to a selection of the user-selectable control indicating the indicator of the second system of the identified vehicle, displaying a fourth user-interface screen instead of the user-interface screen including the user-selectable control including the indicator of the first system of the identified vehicle and the user-selectable control including the indicator of the second system of the identified vehicle, wherein the fourth user-interface screen includes a user-selectable control including an indicator of the second scan tool function for the second system of the identified vehicle and does not include any user-selectable control for selecting a scan tool function for a system of the identified vehicle other than the second system of the identified vehicle.

EEE 24 is the method of EEE 19, wherein the method further includes: displaying, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 25 is the method of EEE 24, wherein the user-selectable control among the one or more user-selectable controls includes an indicator of a scanner job being available upon selection of the user-selectable control among the one or more user-selectable controls.

EEE 26 is the method of EEE 19, wherein the method further includes: displaying, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 27 is the method of any one of EEE 19 to 26, wherein the first user-interface screen includes diagnostic information regarding the identified vehicle.

EEE 28 is the method of any one of EEE 19 to 27, wherein the scan tool functions include one or more scan tool function from among the following: a vehicle component reset function, a vehicle component calibration function, a vehicle component programming function, a vehicle component read diagnostic trouble code (DTC) function, a vehicle component clear DTC function, or a vehicle component control function.

EEE 29 is the method of any one of EEE 19 to 28, wherein the one or more processors includes an embedded processor programmed to execute at least the first program instructions.

EEE 30 is the method of any one of EEE 19 to 29, wherein the display includes a touch screen display, wherein the selection of the first user-selectable control includes a user contact of the touch screen display at or in proximity to the first user-selectable control, and wherein the selection of the second user-selectable control includes a user contact of the touch screen display at or in proximity to the second user-selectable control.

EEE 31 is the method of any one of EEE 19 to 30, wherein the first scanner job is associated with a search term, and wherein the method further includes: transmitting, to a server, a request for guidance regarding the first scanner job, wherein the request includes the search term; receiving, in response to the request, guidance regarding the first scanner job; and displaying, on the display, the guidance regarding the first scanner job.

EEE 32 is the method of any one of EEE 19 to 31, wherein the first user-interface screen includes a user-selectable control including an indicator of a second scanner job performable on the identified vehicle, wherein the method further includes: in response to a selection of the user-selectable control including the indicator of the second scanner job, displaying a third user-interface screen instead of the first user-interface screen, wherein the third user-interface screen includes guidance for performing the second scanner job.

EEE 33 is the method of any one of EEE 19 to 32, wherein the first user-interface screen includes a user-selectable control including an indicator of a second scanner job performable on the identified vehicle, wherein the method further includes: displaying a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, displaying the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 34 is the method of any one of EEE 19 to 33, wherein the method further includes: transmitting at least a third vehicle data message to the identified vehicle, wherein the at least a third vehicle data message includes a request to solicit a response from a component of the first system and from a component of the second system; and making a determination that the diagnostic tool received, in response to at least the third message, a response from the component of the first system and a response from the component of the second, wherein display of the second user-interface screen is conditioned on the one or more processors making the determination.

EEE 35 is the method of any one of EEE 19 to 34, wherein the method further includes: displaying a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 36 is the method of any one of EEE 19 to 35, wherein the second user-interface screen includes guidance for performing a procedure of the first scanner job.

EEE 37 is a computer-readable medium having stored thereon: (1) first program instructions executable by one or more processors to cause a computing system to perform scan tool functions that include transmitting a vehicle data message to an identified vehicle, wherein the scan tool functions include a first scan tool function for a first system of the identified vehicle and a second scan tool function for a second system of the identified vehicle, and wherein the first system is different than the second system, and (2) second program instructions executable by the one or more processors to cause the computing system to perform other functions comprising: displaying, on a display, a first user-interface screen including a user-selectable control including an indicator of a first scanner job performable on the identified vehicle; in response to a selection of the user-selectable control including the indicator of the first scanner job, displaying a second user-interface screen instead of the first user-interface screen, wherein the second user-interface screen includes a first user-selectable control including an indicator of the first scan tool function for the first system of the identified vehicle, and a second user-selectable control including an indicator of the second scan tool function for the second system of the identified vehicle; in response to a selection of the first user-selectable control from the second user-interface screen, transmitting a first vehicle data message to the identified vehicle, wherein the first vehicle data message is addressed to a component of the first system of the identified vehicle; and in response to a selection of the second user-selectable control from the second user-interface screen, transmitting a second vehicle data message to the identified vehicle, wherein the second vehicle data message is addressed to a component of the second system of the identified vehicle.

EEE 38 is the computer-readable medium of EEE 37, wherein the second program instructions are executable by the one or more processors to cause the diagnostic tool to: in response to the selection of the first user-selectable control from the second user-interface screen, display a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 39 is the computer-readable medium of EEE 38, wherein the second program instructions are executable by the one or more processors to cause the diagnostic tool to: determine, while the third user-interface screen is being displayed, a status of performing the first scan tool function; and display, within the third user-interface screen, an indication of the status of performing the first scan tool function.

EEE 40 is the computer-readable medium of any one of EEE 38 to 39, wherein the third user-interface screen includes a user-selectable control selectable to switch back to a prior user-interface screen; wherein the second program instructions are executable by the one or more processors to cause the diagnostic tool to: in response to a selection of the user-selectable control selectable to switch back to a prior user-interface screen from the third user-interface screen, switch from displaying the third user-interface screen on the display to displaying the second user-interface screen on the display.

EEE 41 is the computer-readable medium of EEE 37, wherein the second program instructions are executable by the one or more processors to cause the diagnostic tool to: display, on the display, a user-interface screen including a user-selectable control including an indicator of the first system of the identified vehicle and a user-selectable control including an indicator of the second system of the identified vehicle; in response to a selection of the user-selectable control indicating the indicator of the first system of the identified vehicle, display a third user-interface screen instead of the user-interface screen including the user-selectable control including the indicator of the first system of the identified vehicle and the user-selectable control including the indicator of the second system of the identified vehicle, wherein the third user-interface screen includes a user-selectable control including an indicator of the first scan tool function for the first system of the identified vehicle and does not include any user-selectable control for selecting a scan tool function for a system of the identified vehicle other than the first system of the identified vehicle; and in response to a selection of the user-selectable control indicating the indicator of the second system of the identified vehicle, display a fourth user-interface screen instead of the user-interface screen including the user-selectable control including the indicator of the first system of the identified vehicle and the user-selectable control including the indicator of the second system of the identified vehicle, wherein the fourth user-interface screen includes a user-selectable control including an indicator of the second scan tool function for the second system of the identified vehicle and does not include any user-selectable control for selecting a scan tool function for a system of the identified vehicle other than the second system of the identified vehicle.

EEE 42 is the computer-readable medium of EEE 37, wherein the second program instructions are executable by the one or more processors to cause the diagnostic tool to: display, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 43 is the computer-readable medium of EEE 42, wherein the user-selectable control among the one or more user-selectable controls includes an indicator of a scanner job being available upon selection of the user-selectable control among the one or more user-selectable controls.

EEE 44 is the computer-readable medium of EEE 37, wherein the second program instructions are executable by the one or more processors to cause the diagnostic tool to: display, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 45 is the computer-readable medium of EEE 37, wherein the first user-interface screen includes a user-selectable control including an indicator of a second scanner job performable on the identified vehicle, wherein the second program instructions are executable by the one or more processors to cause the diagnostic tool to: in response to a selection of the user-selectable control including the indicator of the second scanner job, display a third user-interface screen instead of the first user-interface screen, wherein the third user-interface screen includes guidance for performing the second scanner job.

EEE 46 is the computer-readable medium of EEE 37, wherein the first user-interface screen includes a user-selectable control including an indicator of a second scanner job performable on the identified vehicle, wherein the second program instructions are executable by the one or more processors to cause the diagnostic tool to: display a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, display the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 47 is the computer-readable medium of EEE 37, wherein the second program instructions are executable by the one or more processors to cause the diagnostic tool to: display a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 48 is the computer-readable medium of any one of EEE 37 to 47, wherein the second program instructions are executable by the one or more processors to cause the diagnostic tool to: transmit at least a third vehicle data message to the identified vehicle, wherein the at least a third vehicle data message includes a request to solicit a response from a component of the first system and from a component of the second system; and make a determination that the diagnostic tool received, in response to at least the third message, a response from the component of the first system and a response from the component of the second, wherein display of the second user-interface screen is conditioned on the one or more processors making the determination.

EEE 49 is the computer-readable medium of any one of EEE 37 to 48, wherein the first user-interface screen includes diagnostic information regarding the identified vehicle.

EEE 50 is the computer-readable medium of any one of EEE 37 to 49, wherein the scan tool functions include one or more scan tool function from among the following: a vehicle component reset function, a vehicle component calibration function, a vehicle component programming function, a vehicle component read diagnostic trouble code (DTC) function, a vehicle component clear DTC function, or a vehicle component control function.

EEE 51 is the computer-readable medium of any one of EEE 37 to 50, wherein the one or more processors includes an embedded processor programmed to execute at least the first program instructions.

EEE 52 is the computer-readable medium of any one of EEE 37 to 51, wherein the display includes a touch screen display, wherein the selection of the first user-selectable control includes a user contact of the touch screen display at or in proximity to the first user-selectable control, and wherein the selection of the second user-selectable control includes a user contact of the touch screen display at or in proximity to the second user-selectable control.

EEE 53 is the computer-readable medium of any one of EEE 37 to 52, wherein the first scanner job is associated with a search term, and wherein the second program instructions are executable by the one or more processors to cause the diagnostic tool to: transmit, to a server, a request for guidance regarding the first scanner job, wherein the request includes the search term; receive, in response to the request, guidance regarding the first scanner job; and display, on the display, the guidance regarding the first scanner job.

EEE 54 is the computer-readable medium of any one of EEE 37 to 53, wherein the second user-interface screen includes guidance for performing a procedure of the first scanner job.

EEE 55 is a diagnostic tool comprising: one or more processors; a display operatively connected to the one or more processors; and one or more computer-readable mediums operatively coupled to the one or more processors, the one or more computer-readable mediums having stored thereon: (1) first program instructions executable by the one or more processors to perform scan tool functions that include the one or more processors transmitting a vehicle data message to an identified vehicle, wherein the scan tool functions include a first scan tool function for a first system of the identified vehicle, and (2) second program instructions executable by the one or more processors to cause the diagnostic tool to: display, on the display, a first user-interface screen including a user-selectable control including an indicator of a first scanner job performable on the identified vehicle; in response to a selection of the user-selectable control including the indicator of the first scanner job, display a second user-interface screen instead of the first user-interface screen, wherein the second user-interface screen includes a first user-selectable control including an indicator of the first scan tool function for the first system of the identified vehicle, and guidance for performing a procedure of the first scanner job; and in response to a selection of the first user-selectable control from the second user-interface screen, transmit a first vehicle data message to the identified vehicle, wherein the first vehicle data message is addressed to a component of the first system of the identified vehicle.

EEE 56 is the diagnostic tool of EEE 55, wherein the second program instructions are executable by the one or more processors to cause the diagnostic tool to: in response to the selection of the first user-selectable control from the second user-interface screen, display a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 57 is the diagnostic tool of EEE 56, wherein the second program instructions are executable by the one or more processors to cause the diagnostic tool to: determine, while the third user-interface screen is being displayed, a status of performing the first scan tool function; and display, within the third user-interface screen, an indication of the status of performing the first scan tool function.

EEE 58 is the diagnostic tool of any one of EEE 56 to 57, wherein the third user-interface screen includes a user-selectable control selectable to switch back to a prior user-interface screen; wherein the second program instructions are executable by the one or more processors to cause the diagnostic tool to: in response to a selection of the user-selectable control selectable to switch back to a prior user-interface screen from the third user-interface screen, switch from displaying the third user-interface screen on the display to displaying the second user-interface screen on the display.

EEE 59 is the diagnostic tool of EEE 55, wherein the second program instructions are executable by the one or more processors to cause the diagnostic tool to: display, on the display, a third user-interface screen including a user-selectable control including an indicator of the first system of the identified vehicle; and in response to a selection of the user-selectable control indicating the indicator of the first system of the identified vehicle, display a fourth user-interface screen instead of the third user-interface screen, wherein the fourth user-interface screen includes a user-selectable control including an indicator of the first scan tool function for the first system of the identified vehicle and does not include any user-selectable control for selecting a scan tool function for a system of the identified vehicle other than the first system of the identified vehicle.

EEE 60 is the diagnostic tool of EEE 55, wherein the second program instructions are executable by the one or more processors to cause the diagnostic tool to: display, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 61 is the diagnostic tool of EEE 60, wherein the user-selectable control among the one or more user-selectable controls includes an indicator of a scanner job being available upon selection of the user-selectable control among the one or more user-selectable controls.

EEE 62 is the diagnostic tool of EEE 55, wherein the second program instructions are executable by the one or more processors to cause the diagnostic tool to: display, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 63 is the diagnostic tool of EEE 55, wherein the first user-interface screen includes a user-selectable control including an indicator of a second scanner job performable on the identified vehicle, wherein the second program instructions are executable by the one or more processors to cause the diagnostic tool to: in response to a selection of the user-selectable control including the indicator of the second scanner job, display a third user-interface screen instead of the first user-interface screen, wherein the third user-interface screen includes guidance for performing the second scanner job.

EEE 64 is the diagnostic tool of EEE 55, wherein the first user-interface screen includes a user-selectable control including an indicator of a second scanner job performable on the identified vehicle, wherein the second program instructions are executable by the one or more processors to cause the diagnostic tool to: display a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, display the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 65 is the diagnostic tool of EEE 55, wherein the second program instructions are executable by the one or more processors to cause the diagnostic tool to: display a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 66 is the diagnostic tool of any one of EEE 55 to 65, wherein the first scanner job is associated with a search term, and wherein the second program instructions are executable by the one or more processors to cause the diagnostic tool to: transmit, to a server, a request for guidance regarding the first scanner job, wherein the request includes the search term; and receive, in response to the request, the guidance for performing the procedure of the first scanner job.

EEE 67 is the diagnostic tool of any one of EEE 55 to 66, wherein the scan tool functions include a second scan tool function for the first system of the identified vehicle, wherein the second user-interface screen includes a second user-selectable control including an indicator of the second scan tool function for the first system of the identified vehicle, and in response to a selection of the second user-selectable control from the second user-interface screen, transmit a second vehicle data message to the identified vehicle, wherein the second vehicle data message is addressed to a component of the first system of the identified vehicle.

EEE 68 is the diagnostic tool of any one of EEE 55 to 67, wherein the first user-interface screen includes diagnostic information regarding the identified vehicle.

EEE 69 is the diagnostic tool of any one of EEE 55 to 68, wherein the scan tool functions include one or more scan tool functions among the following: a vehicle component reset function, a vehicle component calibration function, a vehicle component programming function, a vehicle component read diagnostic trouble code (DTC) function, a vehicle component clear DTC function, or a vehicle component control function.

EEE 70 is the diagnostic tool of any one of EEE 55 to 69, wherein the one or more processors includes an embedded processor programmed to execute at least the first program instructions.

EEE 71 is the diagnostic tool of any one of EEE 55 to 70, wherein the display includes a touch screen display, and wherein the selection of the first user-selectable control includes a user contact of the touch screen display at or in proximity to the first user-selectable control.

EEE 72 is a method comprising: displaying, on a display, a first user-interface screen including a user-selectable control including an indicator of a first scanner job performable on an identified vehicle, wherein the display is operatively connected to one or more processors, wherein the one or more processors are operatively coupled to one or more computer-readable mediums having stored thereon program instructions executable by the one or more processors to perform scan tool functions that include the one or more processors transmitting a vehicle data message to the identified vehicle, wherein the scan tool functions include a first scan tool function for a first system of the identified vehicle; in response to a selection of the user-selectable control including the indicator of the first scanner job, displaying a second user-interface screen instead of the first user-interface screen, wherein the second user-interface screen includes a first user-selectable control including an indicator of the first scan tool function for the first system of the identified vehicle, and guidance for performing a procedure of the first scanner job; and in response to a selection of the first user-selectable control from the second user-interface screen, transmitting a first vehicle data message to the identified vehicle, wherein the first vehicle data message is addressed to a component of the first system of the identified vehicle.

EEE 73 is the method of EEE 72, wherein the method further includes: in response to the selection of the first user-selectable control from the second user-interface screen, displaying a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 74 is the method of EEE 73, wherein the method further includes: determining, while the third user-interface screen is being displayed, a status of performing the first scan tool function; and display, within the third user-interface screen, an indication of the status of performing the first scan tool function.

EEE 75 is the method of any one of EEE 72 to 74, wherein the third user-interface screen includes a user-selectable control selectable to switch back to a prior user-interface screen; wherein the method further includes: in response to a selection of the user-selectable control selectable to switch back to a prior user-interface screen from the third user-interface screen, switching from displaying the third user-interface screen on the display to displaying the second user-interface screen on the display.

EEE 76 is the method of EEE 72, wherein the method further includes: displaying, on the display, a third user-interface screen including a user-selectable control including an indicator of the first system of the identified vehicle; and in response to a selection of the user-selectable control indicating the indicator of the first system of the identified vehicle, displaying a fourth user-interface screen instead of the third user-interface screen, wherein the fourth user-interface screen includes a user-selectable control including an indicator of the first scan tool function for the first system of the identified vehicle and does not include any user-selectable control for selecting a scan tool function for a system of the identified vehicle other than the first system of the identified vehicle.

EEE 77 is the method of EEE 72, wherein the method further includes: displaying, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 78 is the method of EEE 77, wherein the user-selectable control among the one or more user-selectable controls includes an indicator of a scanner job being available upon selection of the user-selectable control among the one or more user-selectable controls.

EEE 79 is the method of EEE 72, wherein the method further includes: displaying, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 80 is the method of EEE 72, wherein the first user-interface screen includes a user-selectable control including an indicator of a second scanner job performable on the identified vehicle, wherein the method further includes: in response to a selection of the user-selectable control including the indicator of the second scanner job, displaying a third user-interface screen instead of the first user-interface screen, wherein the third user-interface screen includes guidance for performing the second scanner job.

EEE 81 is the method of EEE 72, wherein the first user-interface screen includes a user-selectable control including an indicator of a second scanner job performable on the identified vehicle, wherein the method further includes: displaying a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, displaying the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 82 is the method of EEE 72, wherein the method further includes: displaying a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 83 is the method of any one of EEE 72 to 82, wherein the first scanner job is associated with a search term, and wherein the method further includes transmitting, to a server, a request for guidance regarding the first scanner job, wherein the request includes the search term; and receive, in response to the request, the guidance for performing the procedure of the first scanner job.

EEE 84 is the method of any one of EEE 72 to 83, wherein the scan tool functions include a second scan tool function for the first system of the identified vehicle, wherein the second user-interface screen includes a second user-selectable control including an indicator of the second scan tool function for the first system of the identified vehicle, and in response to a selection of the second user-selectable control from the second user-interface screen, transmit a second vehicle data message to the identified vehicle, wherein the second vehicle data message is addressed to a component of the first system of the identified vehicle.

EEE 85 is the method of any one of EEE 72 to 84, wherein the first user-interface screen includes diagnostic information regarding the identified vehicle.

EEE 86 is the method of any one of EEE 72 to 85, wherein the scan tool functions include one or more scan tool functions among the following: a vehicle component reset function, a vehicle component calibration function, a vehicle component programming function, a vehicle component read diagnostic trouble code (DTC) function, a vehicle component clear DTC function, or a vehicle component control function.

EEE 87 is the method of any one of EEE 72 to 86, wherein the one or more processors includes an embedded processor programmed to execute at least the first program instructions.

EEE 88 is the method of any one of EEE 72 to 87, wherein the display includes a touch screen display, and wherein the selection of the first user-selectable control includes a user contact of the touch screen display at or in proximity to the first user-selectable control.

EEE 89 is a computer-readable medium having stored thereon: (1) first program instructions executable by one or more processors to cause a computing system to perform scan tool functions that include transmitting a vehicle data message to an identified vehicle, wherein the scan tool functions include a first scan tool function for a first system of the identified vehicle, and (2) second program instructions executable by the one or more processors to cause the computing system to perform other functions comprising: displaying, on a display, a first user-interface screen including a user-selectable control including an indicator of a first scanner job performable on the identified vehicle; in response to a selection of the user-selectable control including the indicator of the first scanner job, displaying a second user-interface screen instead of the first user-interface screen, wherein the second user-interface screen includes a first user-selectable control including an indicator of the first scan tool function for the first system of the identified vehicle, and guidance for performing a procedure of the first scanner job; and in response to a selection of the first user-selectable control from the second user-interface screen, transmitting a first vehicle data message to the identified vehicle, wherein the first vehicle data message is addressed to a component of the first system of the identified vehicle.

EEE 90 is the computer-readable medium of EEE 89, wherein the second program instructions are executable by the one or more processors to cause the computing system to: in response to the selection of the first user-selectable control from the second user-interface screen, display a third user-interface screen instead of the second user-interface screen, wherein the third user-interface screen includes a user-selectable control including an indicator to proceed with performing the first scan tool function, wherein transmission of the first vehicle data message in response to selection of the second user-selectable control is conditioned on the user-selectable control including the indicator to proceed with performing the first scan tool function being selected from the third user-interface screen.

EEE 91 is the computer-readable medium of EEE 90, wherein the second program instructions are executable by the one or more processors to cause the computing system to: determine, while the third user-interface screen is being displayed, a status of performing the first scan tool function; and display, within the third user-interface screen, an indication of the status of performing the first scan tool function.

EEE 92 is the computer-readable medium of any one of EEE 90 to 91, wherein the third user-interface screen includes a user-selectable control selectable to switch back to a prior user-interface screen; wherein the second program instructions are executable by the one or more processors to cause the computing system to: in response to a selection of the user-selectable control selectable to switch back to a prior user-interface screen from the third user-interface screen, switch from displaying the third user-interface screen on the display to displaying the second user-interface screen on the display.

EEE 93 is the computer-readable medium of EEE 89, wherein the second program instructions are executable by the one or more processors to cause the computing system to: display, on the display, a third user-interface screen including a user-selectable control including an indicator of the first system of the identified vehicle; and in response to a selection of the user-selectable control indicating the indicator of the first system of the identified vehicle, display a fourth user-interface screen instead of the third user-interface screen, wherein the fourth user-interface screen includes a user-selectable control including an indicator of the first scan tool function for the first system of the identified vehicle and does not include any user-selectable control for selecting a scan tool function for a system of the identified vehicle other than the first system of the identified vehicle.

EEE 94 is the computer-readable medium of EEE 89, wherein the second program instructions are executable by the one or more processors to cause the computing system to: display, on the display, a third user-interface screen including one or more user-selectable controls, wherein each of the one or more user-selectable controls includes an indicator of a respective system of the identified vehicle, wherein the first user-interface screen including the user-selectable control including the indicator of the first scanner job performable on the identified vehicle is displayed in response to a selection of a user-selectable control among the one or more user-selectable controls.

EEE 95 is the computer-readable medium of EEE 94, wherein the user-selectable control among the one or more user-selectable controls includes an indicator of a scanner job being available upon selection of the user-selectable control among the one or more user-selectable controls.

EEE 96 is the computer-readable medium of EEE 89, wherein the second program instructions are executable by the one or more processors to cause the computing system to: display, on the display, a third user-interface screen including multiple user-selectable controls, wherein each of the multiple user-selectable controls includes an indicator of a respective scanner job performable on the identified vehicle, wherein one of the multiple user-selectable controls includes a user-selectable control including an indicator of the first scanner job, and wherein the first user-interface screen including the user-selectable control including the indicator of the first scanner job performable on the identified vehicle is displayed in response to a selection of the user-selectable control including the indicator of the first scanner job.

EEE 97 is the computer-readable medium of EEE 89, wherein the first user-interface screen includes a user-selectable control including an indicator of a second scanner job performable on the identified vehicle, wherein the second program instructions are executable by the one or more processors to cause the computing system to: in response to a selection of the user-selectable control including the indicator of the second scanner job, display a third user-interface screen instead of the first user-interface screen, wherein the third user-interface screen includes guidance for performing the second scanner job.

EEE 98 is the computer-readable medium of EEE 89, wherein the first user-interface screen includes a user-selectable control including an indicator of a second scanner job performable on the identified vehicle, wherein the second program instructions are executable by the one or more processors to cause the computing system to: display a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and in response to selection of the user-selectable control for returning directly to the first user-interface screen, display the first user-interface screen with the user-selectable control including an indicator of the first scanner job user-selectable control including an indicator of a second scanner job performable on the identified vehicle and the user-selectable control including an indicator of a second scanner job performable on the identified vehicle directly without displaying another user-interface screen.

EEE 99 is the computer-readable medium of EEE 89, wherein the second program instructions are executable by the one or more processors to cause the computing system to: display a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

EEE 100 is the computer-readable medium of any one of EEE 89 to 99, wherein the first scanner job is associated with a search term, and wherein the second program instructions are executable by the one or more processors to cause the computing system to: transmit, to a server, a request for guidance regarding the first scanner job, wherein the request includes the search term; and receive, in response to the request, the guidance for performing the procedure of the first scanner job.

EEE 101 is the computer-readable medium of any one of EEE 89 to 100, wherein the scan tool functions include a second scan tool function for the first system of the identified vehicle, wherein the second user-interface screen includes a second user-selectable control including an indicator of the second scan tool function for the first system of the identified vehicle, and in response to a selection of the second user-selectable control from the second user-interface screen, transmit a second vehicle data message to the identified vehicle, wherein the second vehicle data message is addressed to a component of the first system of the identified vehicle.

EEE 102 is the computer-readable medium of any one of EEE 89 to 101, wherein the first user-interface screen includes diagnostic information regarding the identified vehicle.

EEE 103 is the computer-readable medium of any one of EEE 89 to 102, wherein the scan tool functions include one or more scan tool functions among the following: a vehicle component reset function, a vehicle component calibration function, a vehicle component programming function, a vehicle component read diagnostic trouble code (DTC) function, a vehicle component clear DTC function, or a vehicle component control function.

EEE 104 is the computer-readable medium of any one of EEE 89 to 103, wherein the one or more processors includes an embedded processor programmed to execute at least the first program instructions.

EEE 105 is the computer-readable medium of any one of EEE 89 to 104, wherein the display includes a touch screen display, and wherein the selection of the first user-selectable control includes a user contact of the touch screen display at or in proximity to the first user-selectable control.

We claim:

1. A diagnostic tool comprising:
    one or more processors;
    a display operatively connected to the one or more processors; and
    one or more computer-readable mediums operatively coupled to the one or more processors, the one or more computer-readable mediums having stored thereon: (1) first program instructions executable by the one or more processors to perform scan tool functions that include the one or more processors transmitting a vehicle data message to an identified vehicle, wherein the scan tool functions include a first scan tool function for a first system of the identified vehicle, and (2) second program instructions executable by the one or more processors to cause the diagnostic tool to:
    display, on the display, a first user-interface screen including a user-selectable control including an indicator of a first scanner job performable on the identified vehicle;
    in response to a selection of the user-selectable control including the indicator of the first scanner job, display a second user-interface screen instead of the first user-interface screen, wherein the second user-interface screen incudes a first user-selectable control including an indicator of the first scan tool function for the first system of the identified vehicle, and guidance for performing the first scanner job; and
    in response to a selection of the first user-selectable control from the second user-interface screen, transmit a first vehicle data message to the identified vehicle, wherein the first vehicle data message is addressed to a component of the first system of the identified vehicle.

2. The diagnostic tool of claim 1,
    wherein the first scanner job is associated with a search term, and
    wherein the second program instructions are executable by the one or more processors to cause the diagnostic tool to:
    transmit, to a server, a request for guidance regarding the first scanner job, wherein the request includes the search term; and
    receive, in response to the request, the guidance for performing the first scanner job.

3. The diagnostic tool of claim 1,
    wherein the scan tool functions include a second scan tool function for the first system of the identified vehicle,
    wherein the second user-interface screen includes a second user-selectable control including an indicator of the second scan tool function for the first system of the identified vehicle, and
    in response to a selection of the second user-selectable control from the second user-interface screen, transmit a second vehicle data message to the identified vehicle, wherein the second vehicle data message is addressed to a component of the first system of the identified vehicle.

4. The diagnostic tool of claim 1,
    wherein the second program instructions are executable by the one or more processors to cause the diagnostic tool to:
    in response to the selection of the first user-selectable control from the second user-interface screen, display a third user-interface screen instead of the second user-interface screen,
    wherein the third user-interface screen includes a user-selectable control including an indicator to proceed with performing the first scan tool function,
    wherein transmission of the first vehicle data message in response to selection of the first user-selectable control is conditioned on the user-selectable control including the indicator to proceed with performing the first scan tool function being selected from the third user-interface screen.

5. The diagnostic tool of claim 4,
    wherein the second program instructions are executable by the one or more processors to cause the diagnostic tool to:
    determine, while the third user-interface screen is being displayed, a status of performing the first scan tool function; and display, within the third user-interface screen, an indication of the status of performing the first scan tool function.

6. The diagnostic tool of claim 4,
wherein the third user-interface screen includes a user-selectable control selectable to switch back to a prior user-interface screen;
wherein the second program instructions are executable by the one or more processors to cause the diagnostic tool to:
in response to a selection of the user-selectable control selectable to switch back to a prior user-interface screen from the third user-interface screen, switch from displaying the third user-interface screen on the display to displaying the second user-interface screen on the display.

7. The diagnostic tool of claim 1,
wherein the second program instructions are executable by the one or more processors to cause the diagnostic tool to:
display, on the display, a third user-interface screen including a user-selectable control including an indicator of the first system of the identified vehicle; and
in response to a selection of the user-selectable control indicating the indicator of the first system of the identified vehicle, display a fourth user-interface screen instead of the third user-interface screen, wherein the fourth user-interface screen includes a user-selectable control including an indicator of the first scan tool function for the first system of the identified vehicle and does not include any user-selectable control for selecting a scan tool function for a system of the identified vehicle other than the first system of the identified vehicle.

8. The diagnostic tool of claim 1,
wherein the second program instructions are executable by the one or more processors to cause the diagnostic tool to:
display, on the display, a third user-interface screen including one or more user-selectable controls, wherein each of the one or more user-selectable controls includes an indicator of a respective system of the identified vehicle,
wherein the first user-interface screen including the user-selectable control including the indicator of the first scanner job performable on the identified vehicle is displayed in response to a selection of a user-selectable control among the one or more user-selectable controls.

9. The diagnostic tool of claim 8, wherein the user-selectable control among the one or more user-selectable controls includes an indicator of a scanner job being available upon selection of the user-selectable control among the one or more user-selectable controls.

10. The diagnostic tool of claim 1,
wherein the second program instructions are executable by the one or more processors to cause the diagnostic tool to:
display, on the display, a third user-interface screen including multiple user-selectable controls,
wherein each of the multiple user-selectable controls includes an indicator of a respective scanner job performable on the identified vehicle,
wherein one of the multiple user-selectable controls includes a user-selectable control including an indicator of the first scanner job, and
wherein the first user-interface screen including the user-selectable control including the indicator of the first scanner job performable on the identified vehicle is displayed in response to a selection of the user-selectable control including the indicator of the first scanner job.

11. The diagnostic tool of claim 1, wherein the first user-interface screen includes diagnostic information regarding the identified vehicle.

12. The diagnostic tool of claim 1, wherein the scan tool functions include one or more scan tool functions among the following: a vehicle component reset function, a vehicle component calibration function, a vehicle component programming function, a vehicle component read diagnostic trouble code (DTC) function, a vehicle component clear DTC function, or a vehicle component control function.

13. The diagnostic tool of claim 1, wherein the one or more processors includes an embedded processor programmed to execute at least the first program instructions.

14. The diagnostic tool of claim 1,
wherein the display includes a touch screen display, and
wherein the selection of the first user-selectable control includes a user contact of the touch screen display at or in proximity to the first user-selectable control.

15. The diagnostic tool of claim 1,
wherein the first user-interface screen includes a user-selectable control including an indicator of a second scanner job performable on the identified vehicle,
wherein the second program instructions are executable by the one or more processors to cause the diagnostic tool to:
in response to a selection of the user-selectable control including the indicator of the second scanner job, display a third user-interface screen instead of the first user-interface screen, wherein the third user-interface screen includes guidance for performing the second scanner job.

16. The diagnostic tool of claim 1,
wherein the first user-interface screen includes a user-selectable control including an indicator of a second scanner job performable on the identified vehicle,
wherein the second program instructions are executable by the one or more processors to cause the diagnostic tool to:
display a third user-interface screen during a performance of the first scanner job after the first user-interface screen and the second user-interface screen are displayed during the performance of the first scanner job, wherein the third user-interface screen is different than both the first user-interface screen and second user-interface screen and is at least two user-interface screens away from the first user-interface screen using a back user-selectable control, and wherein the third user-interface screen includes a user-selectable control for returning directly to the first user-interface screen; and
in response to selection of the user-selectable control for returning directly to the first user-interface screen, display the first user-interface screen directly without displaying another user-interface screen.

17. The diagnostic tool of claim 1, wherein the second program instructions are executable by the one or more processors to cause the diagnostic tool to:
display a third user-interface screen in response to the selection of the first user-selectable control from the second user-interface screen, wherein the third user-interface screen includes a parameter identifier (PID) card configured to display a PID parameter value contained in a vehicle data message received as a response to the first vehicle data message.

18. A method comprising:
- displaying, on a display, a first user-interface screen including a user-selectable control including an indicator of a first scanner job performable on an identified vehicle, wherein the display is operatively connected to one or more processors, wherein the one or more processors are operatively coupled to one or more computer-readable mediums having stored thereon program instructions executable by the one or more processors to perform scan tool functions that include the one or more processors transmitting a vehicle data message to the identified vehicle, wherein the scan tool functions include a first scan tool function for a first system of the identified vehicle;
- in response to a selection of the user-selectable control including the indicator of the first scanner job, displaying a second user-interface screen instead of the first user-interface screen, wherein the second user-interface screen incudes a first user-selectable control including an indicator of the first scan tool function for the first system of the identified vehicle, and guidance for performing the first scanner job; and
- in response to a selection of the first user-selectable control from the second user-interface screen, transmitting a first vehicle data message to the identified vehicle, wherein the first vehicle data message is addressed to a component of the first system of the identified vehicle.

19. A computer readable medium having stored thereon: (1) first program instructions executable by one or more processors to cause a computing system to perform scan tool functions that include transmitting a vehicle data message to an identified vehicle, wherein the scan tool functions include a first scan tool function for a first system of the identified vehicle, and (2) second program instructions executable by the one or more processors to cause the computing system to perform other functions comprising:
- displaying, on a display, a first user-interface screen including a user-selectable control including an indicator of a first scanner job performable on the identified vehicle;
- in response to a selection of the user-selectable control including the indicator of the first scanner job, displaying a second user-interface screen instead of the first user-interface screen, wherein the second user-interface screen incudes a first user-selectable control including an indicator of the first scan tool function for the first system of the identified vehicle, and guidance for performing the first scanner job; and
- in response to a selection of the first user-selectable control from the second user-interface screen, transmitting a first vehicle data message to the identified vehicle, wherein the first vehicle data message is addressed to a component of the first system of the identified vehicle.

\* \* \* \* \*